United States Patent
Liska et al.

(10) Patent No.: US 12,152,092 B2
(45) Date of Patent: *Nov. 26, 2024

(54) POLYMERIZABLE MONOMERS AND METHOD OF POLYMERIZING THE SAME

(71) Applicant: Align Technology, Inc., San Jose, CA (US)

(72) Inventors: Robert Liska, Schleinbach (AT); Christian Gorsche, Vienna (AT); Markus Kury, Vienna (AT); Yan Chen, Cupertino, CA (US); Chunhua Li, Cupertino, CA (US); Srinivas Kaza, Mountain View, CA (US)

(73) Assignee: Align Technology, Inc., San Jose, CA (US)

( * ) Notice: Subject to any disclaimer, the term of this patent is extended or adjusted under 35 U.S.C. 154(b) by 516 days.

This patent is subject to a terminal disclaimer.

(21) Appl. No.: 17/027,590

(22) Filed: Sep. 21, 2020

(65) Prior Publication Data

US 2021/0002396 A1    Jan. 7, 2021

Related U.S. Application Data

(63) Continuation of application No. 16/403,435, filed on May 3, 2019, now Pat. No. 10,781,274.

(Continued)

(51) Int. Cl.
| | |
|---|---|
| *C08F 120/30* | (2006.01) |
| *B33Y 70/00* | (2020.01) |
| *G03F 7/00* | (2006.01) |
| *A61C 7/08* | (2006.01) |
| *B33Y 10/00* | (2015.01) |

(Continued)

(52) U.S. Cl.
CPC ............ *C08F 120/30* (2013.01); *B33Y 70/00* (2014.12); *G03F 7/0037* (2013.01); *A61C 7/08* (2013.01); *B33Y 10/00* (2014.12); *B33Y 80/00* (2014.12); *C08F 2/48* (2013.01); *C08F 2810/20* (2013.01)

(58) Field of Classification Search
None
See application file for complete search history.

(56) References Cited

U.S. PATENT DOCUMENTS

| | | | |
|---|---|---|---|
| 2,467,432 | A | 4/1949 | Kesling |
| 3,113,907 | A | 12/1963 | Tocker |

(Continued)

FOREIGN PATENT DOCUMENTS

| | | | |
|---|---|---|---|
| AU | 3031677 | A | 5/1979 |
| AU | 517102 | B2 | 7/1981 |

(Continued)

OTHER PUBLICATIONS

Structure Search performed by USPTO STIC, 213 pages, Jan. 25, 2023.*

(Continued)

*Primary Examiner* — Tae H Yoon
(74) *Attorney, Agent, or Firm* — Seed IP Law Group LLP

(57) ABSTRACT

Provided herein are photopolymerizable monomers, optionally for use as reactive diluents in a high temperature lithography-based photopolymerization process, a method of producing polymers using said photopolymerizable monomers, the polymers thus produced, and orthodontic appliances comprising the polymers.

31 Claims, 5 Drawing Sheets

Related U.S. Application Data

(60) Provisional application No. 62/775,762, filed on Dec. 5, 2018, provisional application No. 62/667,364, filed on May 4, 2018.

(51) Int. Cl.
*B33Y 80/00* (2015.01)
*C08F 2/48* (2006.01)

(56) References Cited

U.S. PATENT DOCUMENTS

| | | |
|---|---|---|
| 3,407,500 A | 10/1968 | Kesling |
| 3,600,808 A | 8/1971 | Reeve et al. |
| 3,660,900 A | 5/1972 | Andrews et al. |
| 3,683,502 A | 8/1972 | Wallshein et al. |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | Van Der Zel et al. |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 5,011,405 A | 4/1991 | Lemchen |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,219,896 A | 6/1993 | Coady et al. |
| 5,257,203 A | 10/1993 | Riley et al. |
| 5,260,476 A | 11/1993 | Ohno et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,545,676 A | 8/1996 | Palazzotto et al. |
| 5,549,476 A | 8/1996 | Stern et al. |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,692,894 A | 12/1997 | Schwartz et al. |
| 5,725,376 A | 3/1998 | Poirier et al. |
| 5,725,378 A | 3/1998 | Wang et al. |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson et al. |
| 5,820,368 A | 10/1998 | Wolk |
| 5,823,778 A | 10/1998 | Schmitt et al. |
| 5,848,115 A | 12/1998 | Little et al. |
| 5,857,853 A | 1/1999 | Van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,017,973 A | 1/2000 | Tamura et al. |
| 6,044,309 A | 3/2000 | Honda et al. |
| 6,049,743 A | 4/2000 | Baba |
| 6,062,861 A | 5/2000 | Andersson |
| 6,068,482 A | 5/2000 | Snow et al. |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |

(56) References Cited

U.S. PATENT DOCUMENTS

| | | |
|---|---|---|
| 6,322,359 B1 | 11/2001 | Jordan et al. |
| 6,350,120 B1 | 2/2002 | Sachdeva et al. |
| 6,382,975 B1 | 5/2002 | Poirier et al. |
| 6,386,864 B1 | 5/2002 | Kuo |
| 6,398,548 B1 | 6/2002 | Muhammad et al. |
| 6,402,707 B1 | 6/2002 | Ernst et al. |
| 6,450,807 B1 | 9/2002 | Chishti et al. |
| 6,454,565 B2 | 9/2002 | Phan et al. |
| 6,471,511 B1 | 10/2002 | Chishti et al. |
| 6,482,298 B1 | 11/2002 | Bhatnagar et al. |
| 6,524,101 B1 | 2/2003 | Phan et al. |
| 6,554,611 B2 | 4/2003 | Shishti et al. |
| 6,572,372 B1 | 6/2003 | Phan et al. |
| 6,607,382 B1 | 8/2003 | Kuo et al. |
| 6,629,840 B2 | 10/2003 | Chishti et al. |
| 6,705,863 B2 | 3/2004 | Phan et al. |
| 6,722,880 B2 | 4/2004 | Chishti et al. |
| 6,749,414 B1 | 6/2004 | Hanson et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,833,425 B1 | 12/2004 | Hecht et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,115,674 B2 | 10/2006 | Park et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,210,926 B2 | 5/2007 | Tadros et al. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,641,828 B2 | 1/2010 | DeSimone et al. |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,892,474 B2 | 2/2011 | Shkolnik et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,404,757 B2 | 3/2013 | Maruta et al. |
| 8,455,566 B2 | 6/2013 | Anton et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,765,031 B2 | 7/2014 | Li et al. |
| 8,771,149 B2 | 7/2014 | Rahman et al. |
| 8,807,999 B2 | 8/2014 | Kuo et al. |
| 8,883,065 B2 | 11/2014 | Kodama et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 8,999,221 B2 | 4/2015 | Kodama et al. |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,781,275 B2 | 9/2020 | Liska et al. |
| 10,813,720 B2 | 10/2020 | Grove et al. |
| 10,881,487 B2 | 1/2021 | Cam et al. |
| 10,912,629 B2 | 2/2021 | Tanugula et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,471,253 B2 | 10/2022 | Venkatasanthanam et al. |
| 11,534,268 B2 | 12/2022 | Li et al. |
| 11,534,974 B2 | 12/2022 | O'Leary et al. |
| 11,542,362 B2 * | 1/2023 | Liska ............... A61C 7/08 |
| 11,576,752 B2 | 2/2023 | Morton et al. |
| 2002/0006597 A1 | 1/2002 | Andreiko et al. |
| 2002/0192617 A1 | 12/2002 | Phan et al. |
| 2003/0003172 A1 | 1/2003 | Stange et al. |
| 2003/0009252 A1 | 1/2003 | Pavlovskaia et al. |
| 2003/0139834 A1 | 7/2003 | Nikolskiy et al. |
| 2003/0224311 A1 | 12/2003 | Cronauer et al. |
| 2004/0128010 A1 | 7/2004 | Pavlovskaia et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0038135 A1 | 2/2005 | Jin et al. |
| 2005/0055118 A1 | 3/2005 | Nikolskiy et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | DeSimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |

(56) References Cited

U.S. PATENT DOCUMENTS

| | | |
|---|---|---|
| 2007/0142498 A1 | 6/2007 | Brennan et al. |
| 2008/0108760 A1 | 5/2008 | Mano et al. |
| 2008/0118882 A1 | 5/2008 | Su |
| 2008/0145820 A1 | 6/2008 | Karmaker et al. |
| 2008/0160473 A1 | 7/2008 | Li et al. |
| 2008/0286716 A1 | 11/2008 | Sherwood |
| 2008/0286717 A1 | 11/2008 | Sherwood |
| 2008/0306724 A1 | 12/2008 | Kitching et al. |
| 2009/0105370 A1 | 4/2009 | Anton et al. |
| 2009/0275720 A1 | 11/2009 | Hunt et al. |
| 2009/0280450 A1 | 11/2009 | Kuo |
| 2009/0309220 A1 | 12/2009 | Katogi et al. |
| 2010/0055635 A1 | 3/2010 | Kakavand |
| 2010/0113643 A1 | 5/2010 | Dershem |
| 2010/0129763 A1 | 5/2010 | Kuo |
| 2011/0108191 A1 | 5/2011 | Sanai et al. |
| 2011/0269092 A1 | 11/2011 | Kuo et al. |
| 2012/0202909 A1 | 8/2012 | Chen |
| 2012/0231232 A1 | 9/2012 | Xu et al. |
| 2012/0296061 A1 | 11/2012 | Naruse et al. |
| 2013/0078594 A1 | 3/2013 | Leslie-Martin et al. |
| 2014/0061974 A1 | 3/2014 | Tyler |
| 2014/0067334 A1 | 3/2014 | Kuo |
| 2014/0265034 A1 | 9/2014 | Dudley |
| 2014/0302459 A1 | 10/2014 | Wang |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0159059 A1 | 6/2015 | Zhang et al. |
| 2015/0305918 A1* | 10/2015 | Chodorow ............... A61F 5/566 128/861 |
| 2015/0321497 A1 | 11/2015 | Lingier et al. |
| 2016/0193014 A1 | 7/2016 | Morton et al. |
| 2017/0007365 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0135793 A1 | 5/2017 | Webber et al. |
| 2017/0158803 A1 | 6/2017 | Amin et al. |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0046297 A1 | 2/2019 | Kopelman et al. |
| 2019/0099129 A1 | 4/2019 | Kopelman et al. |
| 2019/0125497 A1 | 5/2019 | Derakhshan et al. |
| 2019/0262101 A1 | 8/2019 | Shanjani et al. |
| 2019/0298494 A1 | 10/2019 | Webber et al. |
| 2019/0338067 A1 | 11/2019 | Liska et al. |
| 2020/0000553 A1 | 1/2020 | Makarenkova et al. |
| 2020/0040130 A1 | 2/2020 | Liska et al. |
| 2020/0155276 A1 | 5/2020 | Cam et al. |
| 2020/0188062 A1 | 6/2020 | Kopelman et al. |
| 2020/0214598 A1 | 7/2020 | Li et al. |

FOREIGN PATENT DOCUMENTS

| | | |
|---|---|---|
| AU | 5598894 A | 6/1994 |
| CA | 1121955 A | 4/1982 |
| CA | 2024482 A1 * | 3/1991 |
| CN | 1235173 A | 11/1999 |
| CN | 1976963 A | 6/2007 |
| CN | 101385687 A | 3/2009 |
| CN | 101410071 A | 4/2009 |
| CN | 101448479 A | 6/2009 |
| CN | 102770465 A | 11/2012 |
| CN | 103975014 A | 8/2014 |
| CN | 106103585 A | 11/2016 |
| CN | 107118313 A | 9/2017 |
| CN | 108698310 A | 10/2018 |
| CN | 109996773 A | 7/2019 |
| CN | 110267812 A | 9/2019 |
| DE | 2749802 A1 | 5/1978 |
| DE | 69327661 T2 | 7/2000 |
| EP | 0091876 A1 | 10/1983 |
| EP | 0142172 A2 | 5/1985 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0562826 A1 | 9/1993 |
| EP | 0667753 B1 | 1/2000 |
| EP | 0774933 B1 | 12/2000 |
| EP | 0731673 B1 | 5/2001 |
| EP | 1637926 A2 | 3/2006 |
| EP | 3813764 A2 | 5/2021 |
| EP | 4049841 A * | 8/2022 |
| ES | 463897 A1 | 1/1980 |
| FR | 2369828 A1 | 6/1978 |
| FR | 2652256 A1 | 3/1991 |
| GB | 496892 | 2/1939 |
| GB | 1550777 A | 8/1979 |
| JP | S5358191 A | 5/1978 |
| JP | S59223772 A | 12/1984 |
| JP | H0428359 A | 1/1992 |
| JP | H08508174 A | 9/1996 |
| JP | 09208525 A * | 8/1997 |
| JP | 2001302744 A | 10/2001 |
| JP | 2001310918 A | 11/2001 |
| JP | 2004514759 A | 5/2004 |
| JP | 2013112631 A | 6/2013 |
| JP | 2013116886 A | 6/2013 |
| JP | 2013121942 A | 6/2013 |
| JP | 2016146152 A | 8/2016 |
| JP | 2018512465 A | 5/2018 |
| KR | 20130044178 A | 5/2013 |
| KR | 101379612 B1 | 4/2014 |
| WO | WO-9008512 A1 | 8/1990 |
| WO | WO-9104713 A1 | 4/1991 |
| WO | WO-9410935 A1 | 5/1994 |
| WO | WO-9528431 A1 | 10/1995 |
| WO | WO-9832394 A1 | 7/1998 |
| WO | WO-9844865 A1 | 10/1998 |
| WO | WO-9858596 A1 | 12/1998 |
| WO | WO-02/42383 A1 | 5/2002 |
| WO | WO-2006071520 A2 | 7/2006 |
| WO | WO-2009134488 A1 | 11/2009 |
| WO | WO-2010064726 A2 | 6/2010 |
| WO | WO-2012151494 A2 | 11/2012 |
| WO | WO-2013052105 A1 | 4/2013 |
| WO | WO-2013171124 A1 | 11/2013 |
| WO | WO-2014020021 A2 | 2/2014 |
| WO | WO 2014/078537 A1 * | 5/2014 |
| WO | WO 2014/099317 A1 * | 6/2014 |
| WO | WO-2014098956 A1 | 6/2014 |
| WO | WO-2015028855 A1 | 3/2015 |
| WO | WO-2015075094 A1 | 5/2015 |
| WO | WO-2015200201 A1 | 12/2015 |
| WO | WO-2016078838 A1 | 5/2016 |
| WO | WO-2016187155 A1 | 11/2016 |
| WO | WO-2017007964 A1 | 1/2017 |
| WO | WO-2018032022 A1 | 2/2018 |
| WO | WO-2018047806 A1 | 3/2018 |
| WO | WO-2019213585 A1 | 11/2019 |
| WO | WO-2019213588 A1 | 11/2019 |
| WO | WO-2020/104873 A1 | 5/2020 |

OTHER PUBLICATIONS

Allnex. EBECRYL 8808: Aliphatic Urethane Diacrylate. Technical Data Sheet Sep. 11, 2013. 2 pages (2013).

Cai L., et al., "Parabolic Dependence of Material Properties and Cell Behavior On The Composition of Polymer Networks Via Simultaneously Controlling Crosslinking Density and Crystallinity", Biomaterials, Elsevier, Oct. 1, 2010, vol. 31(29), pp. 7423-7434, XP027185928.

Cavex, Cavex LC Dental Tray, Safety Data Sheet, Date of the previous issue and revision Apr. 14, 2015, 6 pages (2015).

Chaconas, et al. "The DlgiGraph Work Station, Part 1, Basic Concepts", JCO (Jun. 1990), pp. 1-20.

Kamigaito M., and Satoh K., "Stereospecific Living Radical Polymerization for Simultaneous Control of Molecular Weight and Tacticity", Journal of Polymer Science Part A: Polymer Chemistry, Sep. 2006, vol. 44(21), pp. 6147-6158.

(56) References Cited

OTHER PUBLICATIONS

Lutz J.F., et al., "Stereoblock Copolymers and Tacticity Control in Controlled/Living Radical Polymerization", Journal of the American Chemical Society, May 2003, vol. 125(23), pp. 6986-6993.
Mappes Orthodontics. Types of orthodontic appliances. (a href="http://www.mappesortho.com/types-of-appliances" title="Link: http://www.mappesortho.com/types-of-appliances" http://www.mappesortho.com/types-of-appliances/a) Apr. 17, 2016. 5 pages (Accessed on Jun. 5, 2020).
Mappes Orthodontics., "Types of Orthodontics Appliances", Retrieved on May 11, 2021, 6 pages.
Porter N.A., et al., "Chiral Auxiliary Control of Tacticity in Free Radical Polymerization", Journal of the American Chemical Society, Sep. 1992, vol. 114(20), pp. 7676-7683.
Roylance., Engineering Viscoelasticity. MIT Press, Cambridge, Oct. 2001. 37 pages.
EMMETCOSTEN: "The Stress Strain Curve | Intro To Structural Engineering," Aug. 14, 2019, pp. 1-5. Retrieved from internet URL: https://asrengineering.com/2019/08/14/the-stress-strain-curve-intro-to-structural-engineering/.
European Boards of Appeal dated May 6, 2022 issued in Patent Application No. 16739543.3.
European Patent Application No. 19172865.8 Extended European Search Report (in German) dated Sep. 23, 2019.
PCT/US2019/030687 International Search Report and Written Opinion dated Sep. 5, 2019. 12 pages.
Selvamalar et al.: Copolymerization of 4-benzyloxycarbonylphenyl methacrylate with glycidyl methacrylate: synthesis, characterization, reactivity ratios and application as adhesives. Reactive and Functional Polymers 56(2): 89-101. XP004460494 (2003).
Selvamalar et al.: Copolymers of 4-Benzyloxycarbonylphenyl Methacrylate with Methyl Methacrylate: Synthesis, Characterization, and Reactivity Ratios. Journal of Macromolecular Science, Part A—Pure and Applied Chemistry 40(10): 1019-1033. XP055621964 (2003).
Selvamalar et al.: Homopolymer and copolymers of 4-benzyloxycarbonylphenyl acrylate with glycidyl methacrylate: Synthesis, characterization, reactivity ratios, and application as adhesive for leather. J. Appl Polym Sci 91(6): 3604-3612. XP055621954 (2004).
Swetly et al.: Capabilities of Additive Manufacturing Technologies (AMT) in the validation of the automotive cockpit. RTejournal—Forum for Rapid Technology (1), urn:nbn:de:0009-2-39579,10 pages (2014).
Tumbleston et al., Continuous Liquid Interface Production of 3D Objects. Science, 347.6228 (Mar. 2015): 1349-1352.
Vijayanand et al.: Copolymerization of 4-Benzyloxycarbonylphenyl Acrylate with Methyl Methacrylate: Synthesis, Characterization, and Determination of Reactivity Ratios. Journal of Macromolecular Science, Part A—Pure and Applied Chemistry 40(2): 125-140. XP055621966 (2003).
AADR. American Association for Dental Research, Summary of Activities, Mar. 20-23, 1980, Los Angeles, CA, p. 195.
Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapter 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL http://astronomy.swin.edu.au/-pbourke/prolection/coords.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at http://www.cardinalpaint.com on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.

(56) References Cited

OTHER PUBLICATIONS

Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision,"Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004 http://reference.com/search/search?q=gingiva.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at http://www.dent-x.com/DentSim.htm, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
European Patent Application No. 19172856.7 Extended European Search Report (in German) dated Oct. 4, 2019.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet: http://wscg.zcu.cz/wscg98/papers98/Strasser 98.pdf, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," (with Certified English Translation), 5 pages total (2002).
Gottleib et al., "JCO Interviews Dr. James A. McNamura, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et al., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . .
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informationen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System. Allesee Orthodontic Appliances—Pro Lab. 1 page (1998).
JCO Interviews, "Craig Andreiko , DDS, MS on the Elan and Orthos Systems," JCO, pp. 459-468 (Aug. 1994).
JCO Interviews, "Dr. Homer W. Phillips on Computers in Orthodontic Practice, Part 2," JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.

(56) References Cited

OTHER PUBLICATIONS

Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991).
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Clin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," (with Certified English Translation), Separatdruck aus: Schweiz. Mschr. Zahnmed. 95: 1118-1129, 1985, (total of 24 pages).
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
PCT/US2019/030683 International Search Report and Written Opinion mailed Aug. 26, 2019. 13 pages.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
PROCERA Research Projects, "PROCERA Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances, http:// www.essix.com/magazine/defaulthtml Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," (with Certified English Translation), High Tech in der Zahnmedizin, 29 pages total (2004).
Sinclair, "The Readers' Corner," J. Clin. Orthod., 26(6):369-372 (Jun. 1992).
Sirona Dental Systems GmbH, CEREC 3D, Manuel utilisateur, Version 2.0X (in French with Certified English Translation), 2003, 229 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee Orthodontic Appliances-Pro Lab product information, 6 pages (2003).
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml, 5 pages (May 19, 2003).
The Choice is Clear: Red, White & Blue . . . The Simple, Affordable, No-Braces Treatment, Allesee HJ Orthodontic Appliances—Pro Lab product information for patients, (http://ormco.com/aoa/appliancesservices/RWB/patients.html), 2 pages (May 19, 2003).
The Red, White & Blue Way to Improve Your Smile!, Allesee Orthodontic Appliances—Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.

(56) References Cited

OTHER PUBLICATIONS

U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances—Pro Lab product information for patients, 2 pages (2002).
Gibson et al., "Sheet Lamination Processes," Additive Manufacturing Technologies, 2010, vol. 238, pp. 223-252.
Hao et al., "Synthesis, Crystal Structure and Biological Activity of 3-(2-Chloro-4-trifluoromethylphenoxy)benzoate," Chinese Journal of Organic Chemistry, Sep. 2013, pp. 1993-1997.
Kwei T.K., "Introduction to Physical Polymer Science," Second Edition, by L. H. Sperling, Wiley, New York, 1992.
Allnex Product Catalog (Year: 2019), 20 pages.
Fertig J., et al., "Ultraviolet Stabilizing Monomers and Polymers. I. Synthesis and Polymerization of Phenyl5-Methacryloxymethylsalicylate," Journal of applied polymer science, 1965, vol. 9, pp. 903-910.

* cited by examiner

POLYMERIZABLE MONOMERS AND METHOD OF POLYMERIZING THE SAME

CROSS REFERENCE

This application is a continuation of U.S. application Ser. No. 16/403,435, filed May 3, 2019, now U.S. Pat. No. 10,781,274, which claims the benefit of U.S. Provisional Application No. 62/667,364, filed May 4, 2018, and U.S. Provisional Application No. 62/775,762, filed Dec. 5, 2018, each of which are incorporated herein by reference in their entirety.

BACKGROUND OF THE INVENTION

Additive manufacturing (e.g., lithography-based additive manufacturing (L-AM)) techniques include a variety of techniques to fabricate objects, such as three-dimensional objects, out of photopolymerizable materials. Due to cost, ease, and other various factors, additive manufacturing techniques have long been used to produce prototypes and functional items (e.g., through "rapid prototyping") and to mass produce items. Many additive manufacturing techniques involve successively adding layers of photopolymerizable material and curing these layers by controlled light exposure. The photopolymerizable materials often include reactive components that are cured with light. Examples of photopolymerizable materials compatible with additive manufacturing include acrylates compatible with, e.g., radical polymerization and epoxides compatible with, e.g., cationic polymerization. Example viscosities of existing materials used for additive manufacturing include viscosities of between 20-40 millipascals (mPas) (see I. Gibson, D. W. Rosen, B. Stucker et al., "Additive Manufacturing Technologies", Vol. 238, Springer Verlag (2010)).

It has conventionally proven difficult to form many medical appliances through additive manufacturing techniques. One issue is that existing materials used for additive manufacturing are not biocompatible, much less appropriate for use in an intraoral environment or other part of the human body. Another issue is that existing materials used for additive manufacturing are often not viscous enough to form the precise and/or customizable features required of many appliances. Further, many current additive manufacturing techniques have relatively low curing or reaction temperatures, both for safety and cost concerns, which, for many medical appliances (including dental appliances), undermines the ability to produce a product that is stable at and/or above human body temperature.

Yet another issue is that existing materials used for additive manufacturing do not provide the physical, chemical, and/or thermomechanical properties (elongation, time stress-relaxation, modulus, durability, toughness, etc.) desired of aligners, other dental appliances, hearing aids, and/or many medical devices (see, for example, T. Swetly, J. Stampfl, G. Kempf, and R.-M. Hucke, "Capabilities of Additive Manufacturing Technologies (AMT) in the validation of the automotive cockpit", RTejournal—Forum for Rapid Technology 2014 (1)). Existing materials used for additive manufacturing lack many of the properties desired in medical devices, such as the ability to impart forces, torques, moments, and/or other movements that are accurate and consistent with a treatment plan.

Increasing the viscosity of materials may provide better thermomechanical properties for many applications by reducing crosslinking, increasing the physical interactions between chains, increasing the average weight of monomers, etc. As a result, it may be possible to additively manufacture materials with desirable thermomechanical properties and/or viscosities into dental and/or medical appliances by adding heating operations to the processes. For example, WO 2015/075094, WO 2016/078838 and WO 2018/032022 each disclose stereolithography systems that heat layers of photopolymerizable material that are to be cured in order to lower the viscosity of the materials. Those techniques can make it possible to process materials with resins with viscosities greater than otherwise possible. Many of those techniques may also expand the spectrum of monomers and/or oligomers used for additive manufacturing, and may allow the use of a greater range of resin formulations. Those techniques may also expand the range of products obtained by curing the formulations referenced therein.

To achieve such properties, often high molecular weight prepolymers, such as prepolymers having a molecular weight greater than 5,000 Da, may be processed in the above-mentioned high temperature lithography-based photopolymerization processes to increase the viscosities of the curable resins relative to their viscosities. To be able to smoothly process such resins, even at processing temperatures of, for example, 90-120° C. or, e.g., higher than 120° C., it is often desirable to add suitable reactive diluents, e.g., curable monomers which, when mixed with the resins, lower the viscosity of the formulation and become part of the resulting polymers obtained by the photopolymerization process. However, since the polymers sometimes contain considerable amounts of the reactive diluent repeating units, it would be desirable for the reactive diluent repeating units not to impair the desired thermomechanical properties, either, but rather to contribute thereto.

SUMMARY OF THE INVENTION

Against the issues referenced herein, the present disclosure aims to provide novel polymerizable monomers. These polymerizable monomers may be used in a variety of applications, including as reactive diluents in photopolymerization processes, such as lithography-based (e.g., high temperature lithography-based processes conducted at temperatures greater than 90° C.) photopolymerization processes. The novel polymerizable monomers, as well as other compositions discussed herein, allow for good processability in additive manufacturing techniques and may yield cured products having thermomechanical properties that are desirable for various applications, including for the formation of medical devices and/or those items used in an intraoral environment, e.g., intraoral devices, such as aligners, expanders or spacers. Additionally, the present disclosure aims to provide curable compositions, and precursors thereof, for use in lithography-based photopolymerization processes for the manufacture of various items, such as those items used as medical devices and/or those items used in an intraoral environment, e.g., intraoral devices, such as aligners, expanders or spacers.

In a first aspect, the present disclosure reaches these and other goals by providing novel polymerizable monomers, each of which is a 2-, 3- or 4-(meth)acryloxybenzoic acid ester according to the general formula (I):

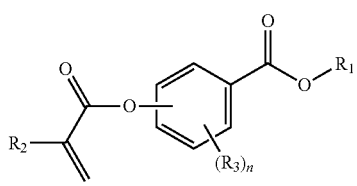

(I)

wherein R₁ represents a $C_5$-$C_{20}$ cycloaliphatic hydrocarbyl radical selected from the group consisting of optionally substituted $C_5$-$C_7$ cycloalkyl radicals;

R₂ represents H or $CH_3$;

each R₃ independently represents $C_1$-$C_3$ alkyl or $C_1$-$C_3$ alkoxy; and n is an integer from 0 to 4.

Such optionally substituted cycloalkyl esters of 2-, 3- or 4-(meth)acryloxybenzoic acid, or (meth)acrylates of cycloalkyl 2-, 3- or 4-hydroxybenzoates: (i) are either liquid at room temperature or have relatively low melting points, e.g., melting points below the usual processing temperatures of high temperature lithography-based photopolymerization processes such as high temperature 3D printing, preferably melting points <90° C., (ii) considerably lower the viscosity of a formulation to which they are added as reactive diluents, (iii) are compatible and readily co-polymerizable with even very high-molecular-weight prepolymers contained in such formulations, (iv) are substantially not volatile at the usual processing temperatures of high temperature lithography-based photopolymerization processes, and (v) yield polymers having desirably high glass transition temperatures and other desirable thermomechanical properties.

Especially the co-occurrence of low melting points and substantially no volatility at elevated temperatures was highly surprising, because, e.g., salicylates, i.e. 2-hydroxybenzoic acid esters, have been used for a long time as flavorings and scents because of their characteristic camphor-like smell, which means that salicylates exhibit rather high volatilities already at room temperature. Very surprisingly, however, none of the (meth)acrylated salicylates according to the present disclosure showed substantial volatility, neither at room temperature nor at an elevated temperature of 90° C., which renders them particularly suitable for use as monomers in high temperature polymerization processes.

Nonetheless, optional substituents of R₁ are preferably small substituents which do not affect the polymerization process nor trigger undesirable side reactions with any other components of curable resin formulations comprising the polymerizable monomers according to the present disclosure, and which do not undesirably raise the melting points or impair the viscosity-lowering effects of the novel monomers.

Therefore, in some embodiments, the optional substituents of the $C_5$-$C_7$ cycloalkyl radicals of R₁ are selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, —Br, and mixtures thereof.

In order to keep the molecular weights of the polymerizable monomers according to formula (I) relatively low, in some embodiments of the present disclosure, R₁ is an optionally substituted $C_5$-$C_7$ cycloalkyl radical having 5 to 15, more preferably 5 to 12, most preferably 5 to 10, carbon atoms in total. In some embodiments, R₁ is a $C_5$-$C_7$ cycloalkyl radical which is either unsubstituted or substituted with one or more, linear or branched, $C_1$-$C_6$ alkyl groups, even more preferably one or more $C_1$-$C_3$ alkyl groups, wherein two of said $C_1$-$C_6$ alkyl groups, or $C_1$-$C_3$ alkyl groups, may be connected to form a ring together with the carbon atoms to which they are attached and optionally one or more additional, intervening carbon atoms of the cyclohexyl ring, since such monomers according to formula (I) are either liquid at room temperature or have suitably low melting points and show pronounced viscosity-lowering effects. For the same reasons, in some embodiments, R₁ is a substituted cyclohexyl radical selected from the group consisting of the following radicals:

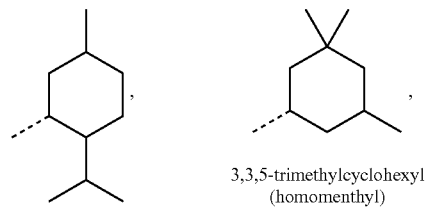

2-isopropyl-5-methylcyclohexyl (menthyl)

3,3,5-trimethylcyclohexyl (homomenthyl)

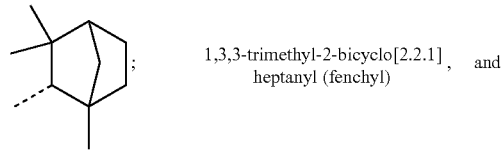

1,3,3-trimethyl-2-norbornanyl 1,3,3-trimethyl-2-bicyclo[2.2.1] heptanyl (fenchyl), and

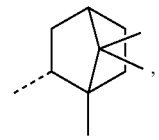

1,7,7-trimethyl-2-bicyclo[2.2.1] heptanyl ((iso)bornyl)

the broken lines in the above formulas each representing the bond to the ester oxygen atom. Polymerizable monomers according to the present disclosure comprising these substituted cyclohexyl radicals as ester moieties have already yielded favorable results, as will be shown in the experimental section, and, additionally, the corresponding alcohols used to prepare the respective (meth)-acryloxybenzoic acid esters are typically commercially available at reasonable costs.

In further embodiments, the $C_1$-$C_3$ alkyl or $C_1$-$C_3$ alkoxy substituents on the benzene ring in formula (I), R₃, are selected from the group consisting of methyl, methoxy, ethyl, and ethoxy, and in further embodiments n is 0 or 1, which means that the benzene ring in formula (I) is unsubstituted or carries only one such substituent R₃ at any substitutable position. Most preferably, however, n is 0.

In some embodiments of the present disclosure, the polymerizable monomers have melting points <90° C. in order to be liquid and, thus, processable at the temperatures usually employed in currently available additive manufacturing techniques. More preferably, they have melting points <50° C. or <30° C., and most preferably they are liquid at room temperature, which provides for low viscosities of the melts and, consequently, for pronounced viscosity-lowering effects when they are used as reactive diluents.

In some embodiments, the polymerizable monomers according to formula (I) are selected from the group consisting of the following compounds:

2-isopropyl-5-methylcyclohexyl 2-(methacryloxy)benzoate;
3,3,5-trimethylcyclohexyl 2-(methacryloxy)benzoate;
1,3,3-trimethyl-2-bicyclo[2.2.1]heptanyl 2-(methacryloxy)benzoate;
1,7,7-trimethyl-2-bicyclo[2.2.1]heptanyl 2-(methacryloxy)benzoate;
2-isopropyl-5-methylcyclohexyl 3-(methacryloxy)benzoate;
2-isopropyl-5-methylcyclohexyl 4-(methacryloxy)benzoate; and
3,3,5-trimethylcyclohexyl 2-(acryloxy)benzoate;
which have yielded favorable or even excellent results, as will be shown in more detail in the experimental section.

In a second aspect, the present disclosure provides a method of polymerizing a curable composition comprising at least one kind of polymerizable species, and optionally one or more further components selected from the group consisting of polymerization initiators, polymerization inhibitors, solvents, fillers, antioxidants, pigments, colorants, surface modifiers, and mixtures thereof, to obtain an optionally crosslinked polymer, the method comprising the steps of: providing the curable composition; mixing the curable composition with a reactive diluent; and polymerizing said composition; wherein the reactive diluent is selected from any of the polymerizable monomers as described herein and any mixtures thereof. In an embodiment, the mixing step is carried out after heating said curable composition. In an embodiment, the polymerizing step is carried out by heating and/or irradiating the composition.

In some embodiments of the inventive method, it is part of a high temperature lithography-based photopolymerization process, wherein said curable composition comprises at least one photopolymerization initiator and is heated before being mixed with said reactive diluent, which high temperature lithography-based photopolymerization process more preferably is an additive manufacturing process, most preferably a 3D printing process.

As already mentioned before, the polymerizable monomers according to the first aspect of the disclosure are suitable for use as reactive diluents, particularly in high temperature lithography-based photopolymerization processes, as they are characterized by (very) low melting points and consequently low viscosities of their melts, and at the same time by substantially no volatility—even at 90° C. Herein, "substantially no volatility" means a mass loss <1 wt % at the respective temperature, preferably at 90° C. Additionally, the novel polymerizable monomers of the present disclosure, when used as reactive diluents, do not impair the thermomechanical properties of the polymers they become parts of, but rather contribute thereto.

In further embodiments of the method according to the second aspect of the present disclosure, the curable composition comprises at least one photopolymerization initiator and is heated to a predefined elevated process temperature ranging from 50° C. to 120° C., such as from 90° C. to 120° C., before becoming irradiated with light of a suitable wavelength to be absorbed by said photoinitiator, thereby causing a cleavage of the photoinitiator to induce polymerization of the curable composition to obtain said optionally crosslinked polymer. In further embodiments, said curable composition comprises at least one multivalent monomer and is polymerized to obtain a crosslinked polymer.

The polymers thus obtained may comprise repeating units originating from the polymerizable monomers of the present invention in considerable amounts, for example, to an extent up to 40 wt %, 80% or 90%, and exhibit excellent thermomechanical properties, as will be shown in the experimental section. In some embodiments, the polymers comprise repeating units originating from the polymerizable monomers of the present invention in amounts ranging from 5 to 90 wt %, such as 10 to 80 wt %. The polymers may comprise repeating units originating from the polymerizable monomers of the present invention in amounts of at least 10, 20, 30 or 40 wt % and, for example, up to 80, 70, 60 or 50 wt %.

In a third aspect, the present disclosure provides such optionally crosslinked polymers obtained by the method according to the second aspect, as described above, comprising repeating units originating from the polymerizable monomers according to the first aspect.

Most preferably, these crosslinked polymers are orthodontic appliances, e.g., aligners, expanders or spacers orthodontic appliances. In an embodiment, the crosslinked polymer is biocompatible and/or bioinert. The method according to the second aspect of the present disclosure offers the possibility of quickly and facilely producing such orthodontic appliances by additive manufacturing such as 3D printing using polymerizable monomers according to the first aspect as reactive diluents.

In a fourth aspect, the present disclosure provides a group of novel compounds, i.e. specific polymerizable monomers according to the first aspect, namely:

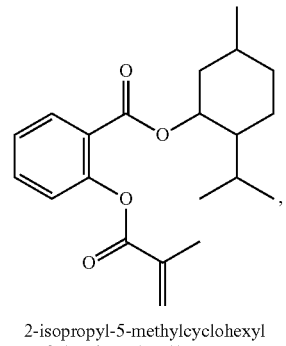

2-isopropyl-5-methylcyclohexyl
2-(methacryloxy)benzoate

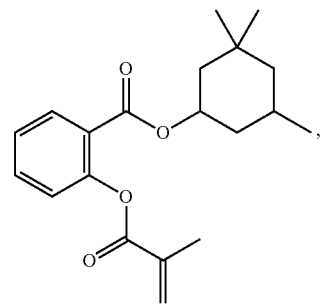

3,3,5-trimethylcyclohexyl
2-(methacryloxy)benzoate:

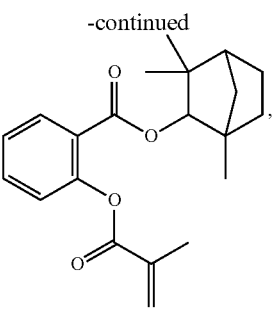

1,3,3-trimethyl-2-bicyclo[2.2.1]
heptanyl
2-(methacryloxy)benzoate):

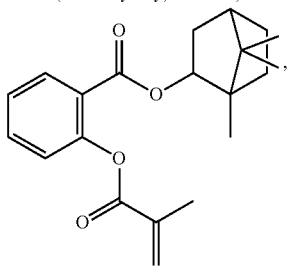

1,7,7-trimethyl-2-bicyclo[2.2.1]
heptanyl
2-(methacryoxy)benzoate:

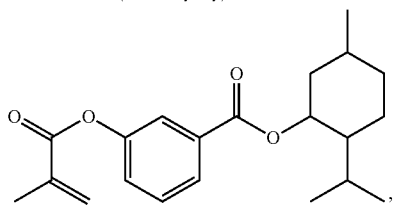

2-isopropyl-5-methylcyclohexyl
3-(methacryloxy)benzoate:

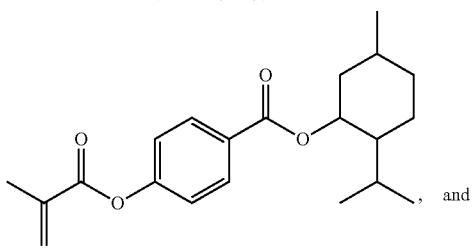

, and 2-isopropyl-5-methylcyclohexyl
4-(methacryloxy)benzoate:

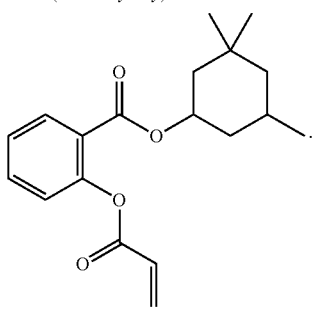

3,3,5-trimethylcyclohexyl
2-(acryloxy)benzoate:

In certain aspects, the present disclosure provides a polymerizable monomer that is a 2-, 3- or 4-(meth)acryloxybenzoic acid ester according to formula (I):

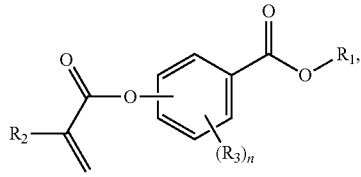

(I)

wherein:
$R_1$ represents $C_3$-$C_{10}$ cycloalkyl, wherein the $C_3$-$C_{10}$ cycloalkyl is unsubstituted; substituted with one or more substituents selected from the group consisting of —$CH_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;
$R_2$ represents H or $C_1$-$C_6$ alkyl;
each $R_3$ independently represents halo, $C_1$-$C_3$ alkyl, $C_1$-$C_3$ alkoxy, $Si(R_4)_3$, $P(O)(OR_5)_2$, or $N(R_6)_2$;
each $R_4$ independently represents $C_1$-$C_6$ alkyl or $C_1$-$C_6$ alkoxy;
each $R_5$ independently represents $C_1$-$C_6$ alkyl or $C_6$-$C_{10}$ aryl;
each $R_6$ independently represents H or $C_1$-$C_6$ alkyl; and
n is an integer from 0 to 4.

In certain aspects, the present disclosure provides a polymerizable monomer that is a 2-, 3- or 4-substituted benzoic acid ester according to formula (II):

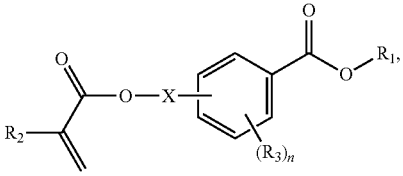

(II)

wherein:
$R_1$ represents $C_3$-$C_7$ cycloalkyl or 3- to 7-membered heterocycloalkyl, wherein the $C_3$-$C_7$ cycloalkyl and 3- to 7-membered heterocycloalkyl are unsubstituted; substituted with one or more substituents selected from the group consisting of —$CH_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;
$R_2$ represents H or $C_1$-$C_6$ alkyl;
each $R_3$ independently represents halo, $C_1$-$C_3$ alkyl, $C_1$-$C_3$ alkoxy, $Si(R_4)_3$, $P(O)(OR_5)_2$, or $N(R_6)_2$;

each R$_4$ independently represents C$_1$-C$_6$ alkyl or C$_1$-C$_6$ alkoxy;

each R$_5$ independently represents C$_1$-C$_6$ alkyl or C$_6$-C$_{10}$ aryl;

each R$_6$ independently represents H or C$_1$-C$_6$ alkyl;

X is C$_1$-C$_3$ alkylene, 1- to 3-membered heteroalkylene, or (CH$_2$CH$_2$O)$_m$;

m is an integer from 1 to 4; and n is an integer from 0 to 4.

In certain aspects, the present disclosure provides a polymerizable monomer that is a 2-, 3- or 4-substituted benzoic acid ester according to formula (III):

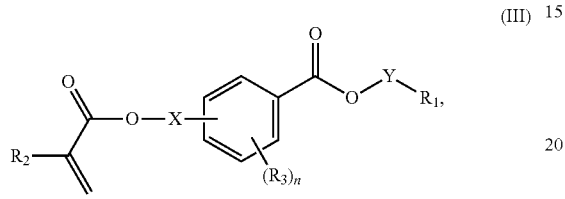

(III)

wherein:
R$_1$ represents C$_3$-C$_7$ cycloalkyl or C$_6$-C$_{10}$ aryl, wherein the C$_3$-C$_7$ cycloalkyl and C$_6$-C$_{10}$ aryl are unsubstituted or substituted with one or more substituents selected from the group consisting of C$_1$-C$_6$ alkyl, C$_1$-C$_6$ alkoxy, C$_3$-C$_7$ cycloalkyl, C$_6$-C$_{10}$ aryl, C$_1$-C$_6$ alkoxyl-C$_6$-C$_{10}$ aryl, —O(CO)—(C$_1$-C$_6$)alkyl, —COO—(C$_1$-C$_6$)alkyl, =O, —F, —Cl, and —Br, provided that the benzoic acid ester of formula (III) is 2- or 3-substituted when R$_1$ is unsubstituted;

R$_2$ represents H or C$_1$-C$_6$ alkyl;

each R$_3$ independently represents halo, C$_1$-C$_3$ alkyl, C$_1$-C$_3$ alkoxy, Si(R$_4$)$_3$, P(O)(OR)$_2$, or N(R$_6$)$_2$;

each R$_4$ independently represents C$_1$-C$_6$ alkyl or C$_1$-C$_6$ alkoxy;

each R$_5$ independently represents C$_1$-C$_6$ alkyl or C$_6$-C$_{10}$ aryl;

each R$_6$ independently represents H or C$_1$-C$_6$ alkyl;

X is absent, C$_1$-C$_3$ alkylene, 1- to 3-membered heteroalkylene, or (CH$_2$CH$_2$O)$_m$;

Y is C$_1$-C$_6$ alkylene;

m is an integer from 1 to 4; and n is an integer from 0 to 4.

In some embodiments, for a compound of formula (III), Y is C$_1$-C$_3$ alkylene. In some embodiments, X is absent. For a compound of formula (II) or (III), X may be C$_1$-C$_3$ alkylene. In some embodiments, for a compound of formula (I), (II) or (III), R$_1$ is optionally substituted C$_5$-C$_{10}$ cycloalkyl, such as optionally substituted C$_5$-C$_8$ cycloalkyl. R$_1$ may be substituted with one or more, linear or branched C$_1$-C$_6$ alkyl. In some embodiments, R$_1$ is substituted with —CH$_3$ and optionally further substituted with one or more, linear or branched C$_1$-C$_6$ alkyl. In some embodiments, R$_1$ is optionally substituted C$_5$-C$_7$ cycloalkyl having 5 to 15 or 5 to 12 or 5 to 10 carbon atoms in total. In some embodiments, R$_1$ is cyclohexyl substituted with —CH$_3$, and optionally further substituted with one or more, linear or branched C$_1$-C$_6$ alkyl, wherein two of said C$_1$-C$_6$ alkyl may be connected to form a ring together with the carbon atoms to which they are attached and optionally one or more additional, intervening carbon atoms of the cyclohexyl ring. In some embodiments, R$_1$ is cyclohexyl substituted with —CH$_3$, and optionally further substituted with one or more C$_1$-C$_3$ alkyl groups, wherein two of said C$_1$-C$_3$ alkyl groups may be connected to form a ring together with the carbon atoms to which they are attached and optionally one or more additional, intervening carbon atoms of the cyclohexyl ring. In some embodiments, R$_1$ is selected from the group consisting of

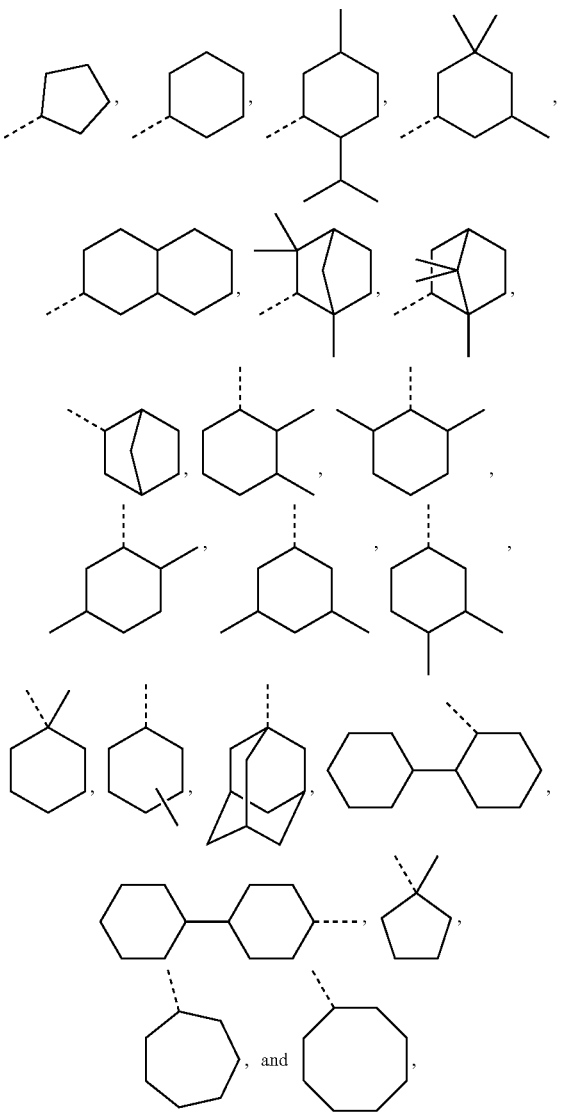

such as

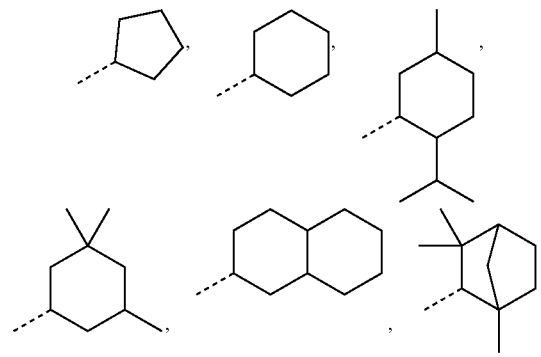

-continued
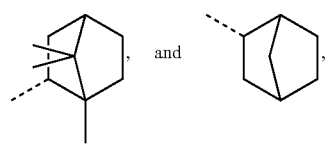
or such as
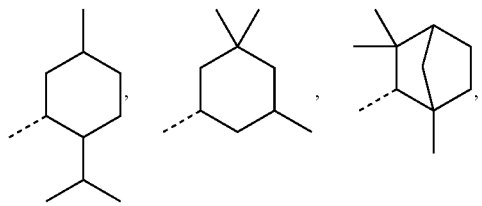
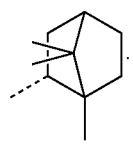
In some embodiments, for a compound of formula (III), $R_1$ is optionally substituted phenyl. $R_1$ may be substituted with one or more substituents selected from the group consisting of $C_1$-$C_4$ alkyl and $C_1$-$C_4$ alkoxy. In some embodiments, —Y—$R_1$ is selected from the group consisting of
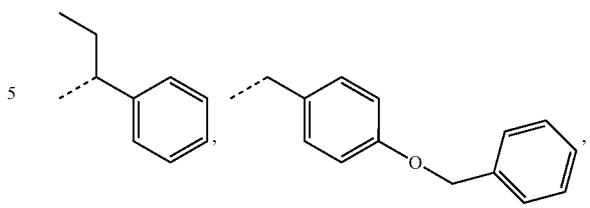
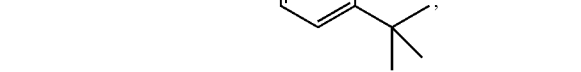
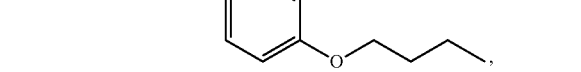
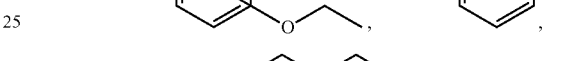
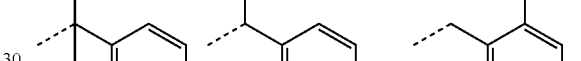
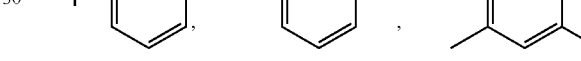
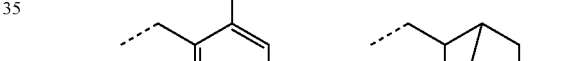
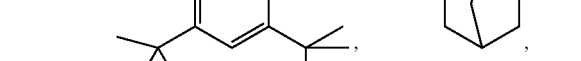
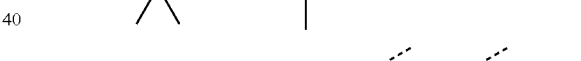
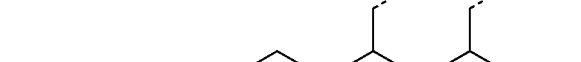
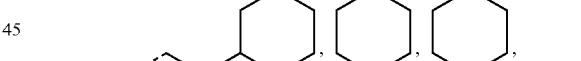
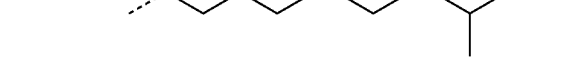
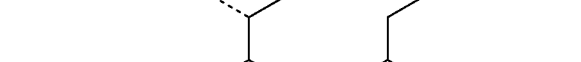
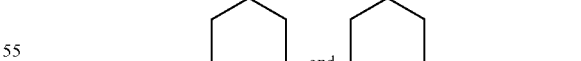
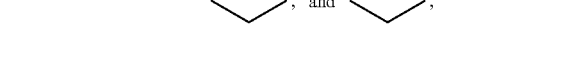
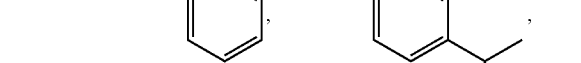
such as -continued

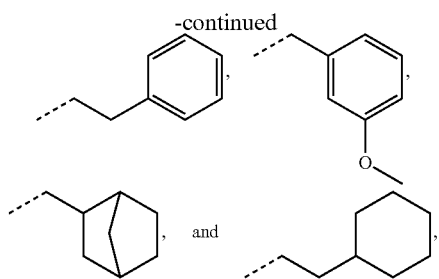

or such as

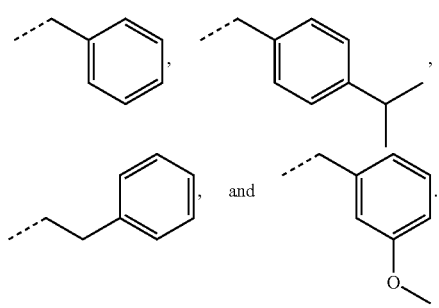

In some embodiments, for a compound of formula (I), (II) or (III), $R_1$ is unsubstituted. In some embodiments, the monomer is a 2- or 3-substituted benzoic acid ester. In some embodiments, the monomer is a 4-substituted benzoic acid ester.

In some embodiments, for a compound of formula (I), $R_1$ represents optionally substituted $C_5$-$C_7$ cycloalkyl; $R_2$ represents H or $CH_3$; each $R_3$ independently represents $C_1$-$C_3$ alkyl or $C_1$-$C_3$ alkoxy; and n is an integer from 0 to 4.

In some embodiments, for a compound of formula (I), (II) or (III), $R_3$ is selected from the group consisting of $C_1$-$C_3$ alkyl and $C_1$-$C_3$ alkoxy, such as methyl, methoxy, ethyl, and ethoxy. In some embodiments, n is 0 or 1, such as n is 0. In some embodiments, $R_2$ is H or $CH_3$. Preferably, a compound described herein exhibits a melting point <90° C.

In certain aspects, the present disclosure provides a method of polymerizing a curable composition comprising at least one kind of polymerizable species, and optionally one or more further components selected from the group consisting of polymerization initiators, polymerization inhibitors, solvents, fillers, antioxidants, pigments, colorants, surface modifiers, and mixtures thereof, to obtain an optionally crosslinked polymer, the method comprising the steps of providing said curable composition; mixing said curable composition with a reactive diluent; and polymerizing said composition; wherein said reactive diluent is selected from a polymerizable monomer described herein, and any mixtures thereof. Said mixing may be carried out after heating said curable composition. Said polymerizing may be carried out by heating and/or irradiating the composition. A method described herein may be part of a high temperature lithography-based photopolymerization process, wherein said curable composition comprises at least one photopolymerization initiator and is heated before being mixed with said reactive diluent. In some embodiments, the method is part of an additive manufacturing process, such as a 3D printing process. Said curable composition may comprise at least one photopolymerization initiator and may be heated to a predefined elevated process temperature ranging from 50° C. to 120° C., such as from 90° C. to 120° C., before becoming irradiated with light of a suitable wavelength to be absorbed by said photoinitiator, thereby causing a cleavage of the photoinitiator to induce polymerization of the curable composition to obtain said optionally crosslinked polymer. In some embodiments, said curable composition comprises at least one multivalent monomer and is polymerized to obtain a crosslinked polymer.

In certain aspects, the present disclosure provides an optionally crosslinked polymer obtained by a method described herein, comprising moieties of a polymerizable monomer described herein as repeating units. In certain aspects, the present disclosure provides an optionally crosslinked polymer obtained by a method described herein. In certain aspects, the present disclosure provides an optionally crosslinked polymer comprising a polymerizable monomer described herein. The crosslinked polymer is preferably biocompatible. In certain aspects, the present disclosure provides an orthodontic appliance comprising a crosslinked polymer described herein, such as a crosslinked polymer containing a polymerizable monomer of the present disclosure. The orthodontic appliance may be an aligner, expander or spacer. In some aspects, the orthodontic appliance comprises a plurality of tooth receiving cavities configured to reposition teeth from a first configuration toward a second configuration. In certain aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In various aspects, the present disclosure provides a dental appliance comprising a crosslinked polymer described herein.

In certain aspects, the present disclosure provides an orthodontic appliance comprising a polymer, wherein the polymer comprises a monomer of the formula:

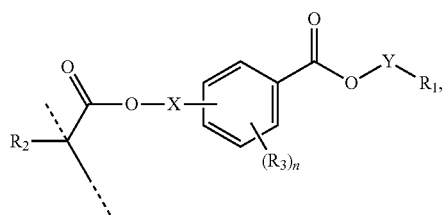

wherein:
- $R_1$ represents $C_3$-$C_{10}$ cycloalkyl, 3- to 10-membered heterocycloalkyl or $C_3$-$C_{10}$ aryl, wherein the $C_3$—$C_{10}$ cycloalkyl, 3- to 10-membered heterocycloalkyl and $C_3$-$C_{10}$ aryl are unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$ alkoxyl-$C_6$-$C_{10}$ aryl, —O(CO)—($C_1$-$C_6$) alkyl, —COO—($C_1$-$C_6$)alkyl, =O, —F, —Cl, and —Br;
- $R_2$ represents H or $C_1$-$C_6$ alkyl;
- each $R_3$ independently represents halo, $C_1$-$C_3$ alkyl, $C_1$-$C_3$ alkoxy, $Si(R_4)_3$, $P(O)(OR_5)_2$, or $N(R_6)_2$;
- each $R_4$ independently represents $C_1$-$C_6$ alkyl or $C_1$-$C_6$ alkoxy;
- each $R_5$ independently represents $C_1$-$C_6$ alkyl or $C_6$-$C_{10}$ aryl;

each $R_6$ independently represents H or $C_1$-$C_6$ alkyl;

X is absent, $C_1$-$C_3$ alkylene, 1- to 3-membered heteroalkylene, or $(CH_2CH_2O)_m$;

Y is absent, $C_1$-$C_6$ alkylene, 1- to 3-membered heteroalkylene, or $(CH_2CH_2O)_m$;

each m is independently an integer from 1 to 4; and n is an integer from 0 to 4 wherein each dashed line represents a bond to a carbon atom.

In certain aspects, said polymer comprises the monomer of formula:

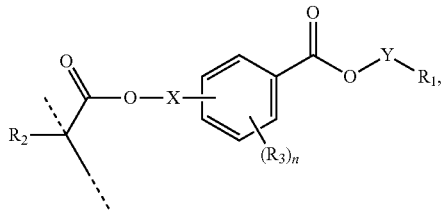

wherein:

$R_1$ represents $C_3$-$C_{10}$ cycloalkyl, wherein the $C_3$-$C_{10}$ cycloalkyl is unsubstituted; substituted with one or more substituents selected from the group consisting of —$CH_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;

$R_2$ represents H or $C_1$-$C_6$ alkyl;

each $R_3$ independently represents halo, $C_1$-$C_3$ alkyl, $C_1$-$C_3$ alkoxy, $Si(R_4)_3$, $P(O)(OR_5)_2$, or $N(R_6)_2$;

each $R_4$ independently represents $C_1$-$C_6$ alkyl or $C_1$-$C_6$ alkoxy;

each $R_5$ independently represents $C_1$-$C_6$ alkyl or $C_6$-$C_{10}$ aryl;

each $R_6$ independently represents H or $C_1$-$C_6$ alkyl;

X is absent;

Y is absent; and n is an integer from 0 to 4.

In some aspects, said polymer comprises the monomer of formula:

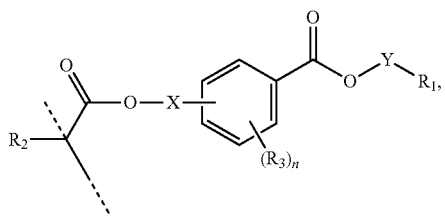

wherein:

$R_1$ represents $C_3$-$C_7$ cycloalkyl or 3- to 7-membered heterocycloalkyl, wherein the $C_3$-$C_7$ cycloalkyl and 3- to 7-membered heterocycloalkyl are unsubstituted; substituted with one or more substituents selected from the group consisting of —$CH_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;

$R_2$ represents H or $C_1$-$C_6$ alkyl;

each $R_3$ independently represents halo, $C_1$-$C_3$ alkyl, $C_1$-$C_3$ alkoxy, $Si(R_4)_3$, $P(O)(OR_5)_2$, or $N(R_6)_2$;

each $R_4$ independently represents $C_1$-$C_6$ alkyl or $C_1$-$C_6$ alkoxy;

each $R_5$ independently represents $C_1$-$C_6$ alkyl or $C_6$-$C_{10}$ aryl;

each $R_6$ independently represents H or $C_1$-$C_6$ alkyl;

X is $C_1$-$C_3$ alkylene, 1- to 3-membered heteroalkylene, or $(CH_2CH_2O)_m$;

Y is absent;

m is an integer from 1 to 4; and n is an integer from 0 to 4.

In certain aspects, said polymer comprises the monomer of formula:

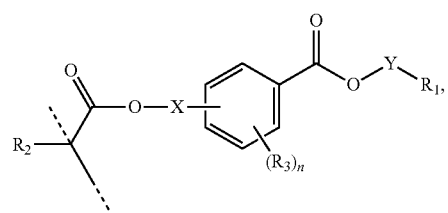

wherein:

$R_1$ represents $C_3$-$C_7$ cycloalkyl or $C_6$-$C_{10}$ aryl, wherein the $C_3$-$C_7$ cycloalkyl and $C_6$-$C_{10}$ aryl are unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$ alkoxyl-$C_6$-$C_{10}$ aryl, —O(CO)—($C_1$-$C_6$)alkyl, —COO—($C_1$-$C_6$)alkyl, =O, —F, —Cl, and —Br, provided that the benzoic acid ester of formula (III) is 2- or 3-substituted when $R_1$ is unsubstituted;

$R_2$ represents H or $C_1$-$C_6$ alkyl;

each $R_3$ independently represents halo, $C_1$-$C_3$ alkyl, $C_1$-$C_3$ alkoxy, $Si(R_4)_3$, $P(O)(OR_5)_2$, or $N(R_6)_2$;

each $R_4$ independently represents $C_1$-$C_6$ alkyl or $C_1$-$C_6$ alkoxy;

each $R_5$ independently represents $C_1$-$C_6$ alkyl or $C_6$-$C_{10}$ aryl;

each $R_6$ independently represents H or $C_1$-$C_6$ alkyl;

X is absent, $C_1$-$C_3$ alkylene, 1- to 3-membered heteroalkylene, or $(CH_2CH_2O)_m$;

Y is $C_1$-$C_6$ alkylene;

m is an integer from 1 to 4; and n is an integer from 0 to 4.

In some aspects, the orthodontic appliance comprises the polymer comprising the monomer of formula:

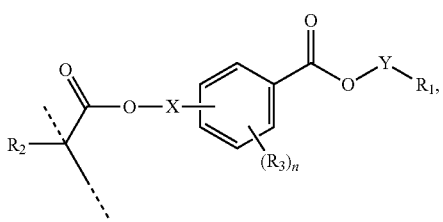

as disclosed above. In some aspects, Y is $C_1$-$C_3$ alkylene. In certain aspects, X is absent. In some aspects, X is $C_1$-$C_3$ alkylene. In certain aspects, $R_1$ is optionally substituted $C_5$-$C_{10}$ cycloalkyl. In some aspects, $R_1$ is optionally substituted $C_5$-$C_7$ cycloalkyl. In certain aspects, $R_1$ is substituted with one or more, linear or branched $C_1$-$C_6$ alkyl. In some aspects, $R_1$ is substituted with —$CH_3$ and optionally further substituted with one or more, linear or branched $C_1$-$C_6$ alkyl. In certain aspects, $R_1$ is optionally substituted $C_5$-$C_7$ cycloalkyl having 5 to 15 or 5 to 12 or 5 to 10 carbon atoms in total. In some aspects, $R_1$ is cyclohexyl substituted with —$CH_3$, and optionally further substituted with one or more, linear or branched $C_1$-$C_6$ alkyl, wherein two of said $C_1$-$C_6$ alkyl may be connected to form a ring together with the carbon atoms to which they are attached and optionally one or more additional, intervening carbon atoms of the cyclohexyl ring. In certain aspects, $R_1$ is cyclohexyl substituted with —$CH_3$, and optionally further substituted with one or more $C_1$-$C_3$ alkyl groups, wherein two of said $C_1$-$C_3$ alkyl groups may be connected to form a ring together with the carbon atoms to which they are attached and optionally one or more additional, intervening carbon atoms of the cyclohexyl ring.

In certain aspects, the orthodontic appliance comprises the polymer comprising the monomer of formula:

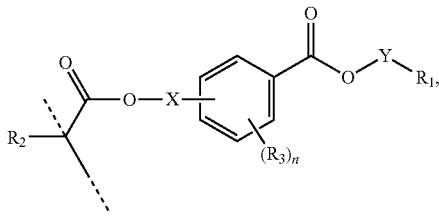

as disclosed above. In some aspects, $R_1$ is selected from the group consisting of:

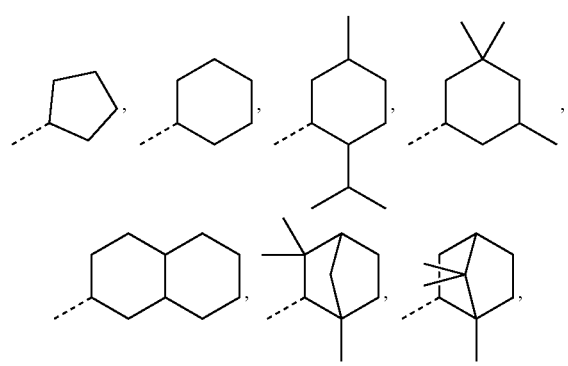

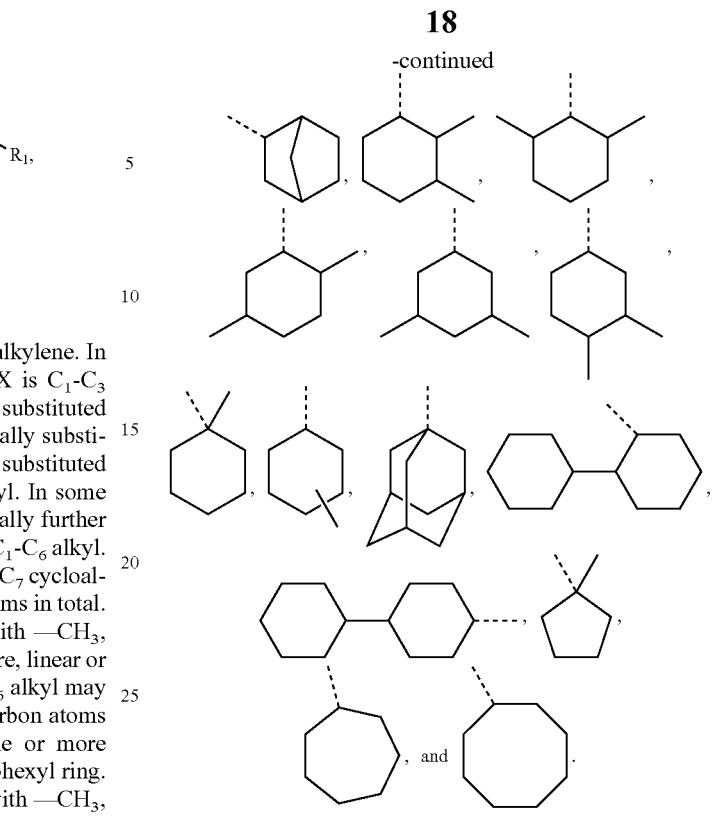

In certain aspects, $R_1$ is selected from the group consisting of:

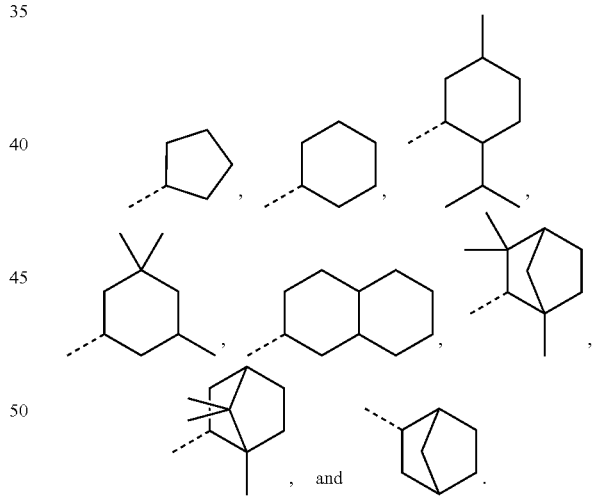

In certain aspects, $R_1$ is selected from the group consisting of:

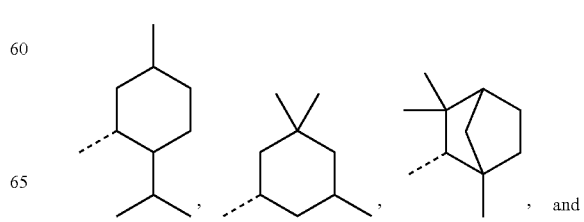

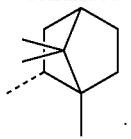

In some aspects, the orthodontic appliance comprises the polymer comprising the monomer of formula:

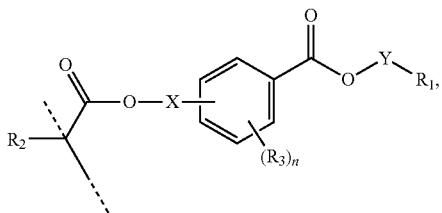

as disclosed above. In some aspects, $R_1$ is optionally substituted phenyl. In certain aspects, $R_1$ is substituted with one or more substituents selected from the group consisting of $C_1$-$C_4$ alkyl and $C_1$-$C_4$ alkoxy.

In some aspects, the orthodontic appliance comprises the polymer comprising the monomer of formula:

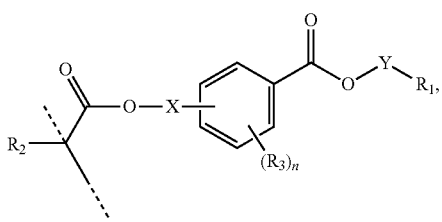

as disclosed above. In some aspects, —Y—$R_1$ is selected from the group consisting of:

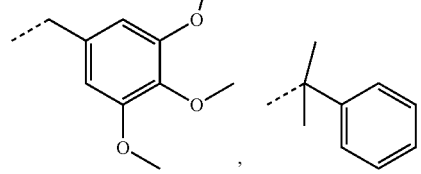

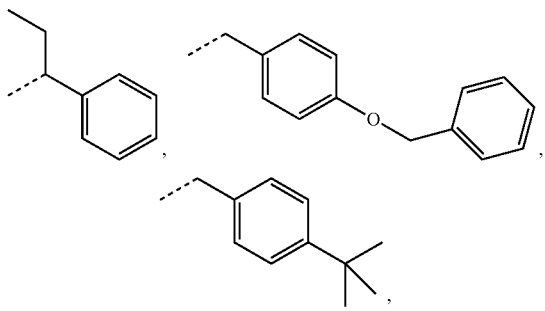

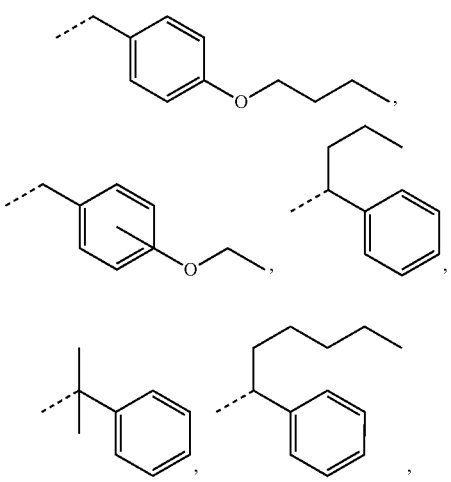

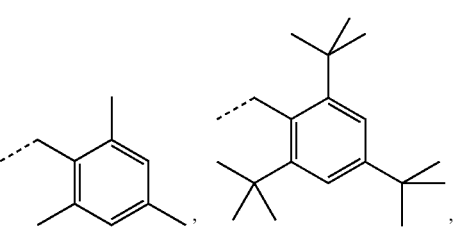

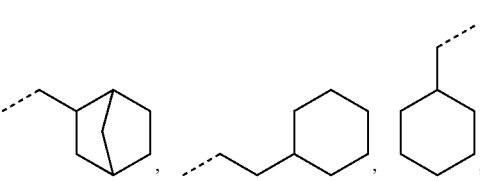

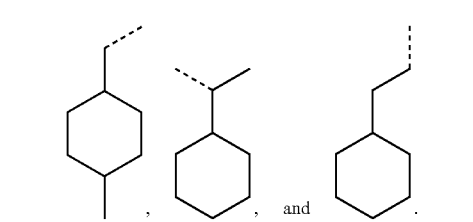

In certain aspects, —Y—R₁ is selected from the group consisting of:

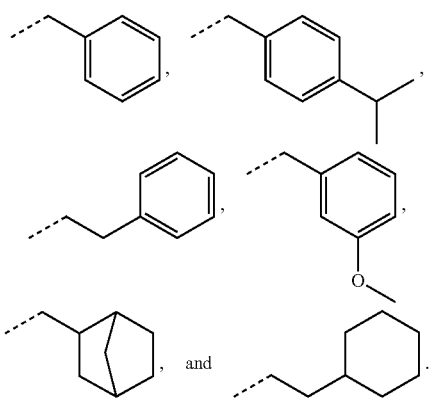

In some aspects, —Y—R₁ is selected from the group consisting of:

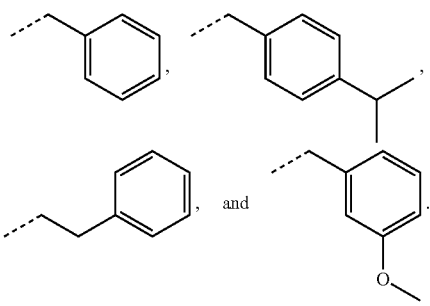

In some aspects, the orthodontic appliance comprises the polymer comprising the monomer of formula:

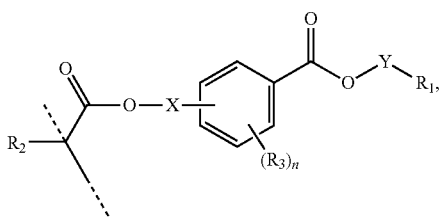

as disclosed above. In some aspects, $R_1$ is unsubstituted. In certain aspects, the monomer is a 2- or 3-substituted benzoic acid ester. In some aspects, the monomer is a 4-substituted benzoic acid ester.

In some aspects, the orthodontic appliance comprises the polymer comprising the monomer of formula:

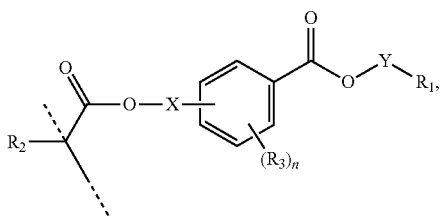

as disclosed above. In some aspects, $R_1$ represents optionally substituted $C_5$-$C_7$ cycloalkyl; $R_2$ represents H or $CH_3$; each $R_3$ independently represents $C_1$-$C_3$ alkyl or $C_1$-$C_3$ alkoxy; and n is an integer from 0 to 4. In some aspects, $R_3$ is selected from the group consisting of $C_1$-$C_3$ alkyl and $C_1$-$C_3$ alkoxy. In certain aspects, $R_3$ is selected from the group consisting of methyl, methoxy, ethyl, and ethoxy. In some aspects, n is 0 or 1. In some aspects, n is 0. In certain aspects, $R_2$ is H or $CH_3$.

In some embodiments, the orthodontic appliance is an aligner, expander or spacer. The orthodontic appliance may comprise a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration, optionally according to a treatment plan.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION OF THE INVENTION

Figure 1A:
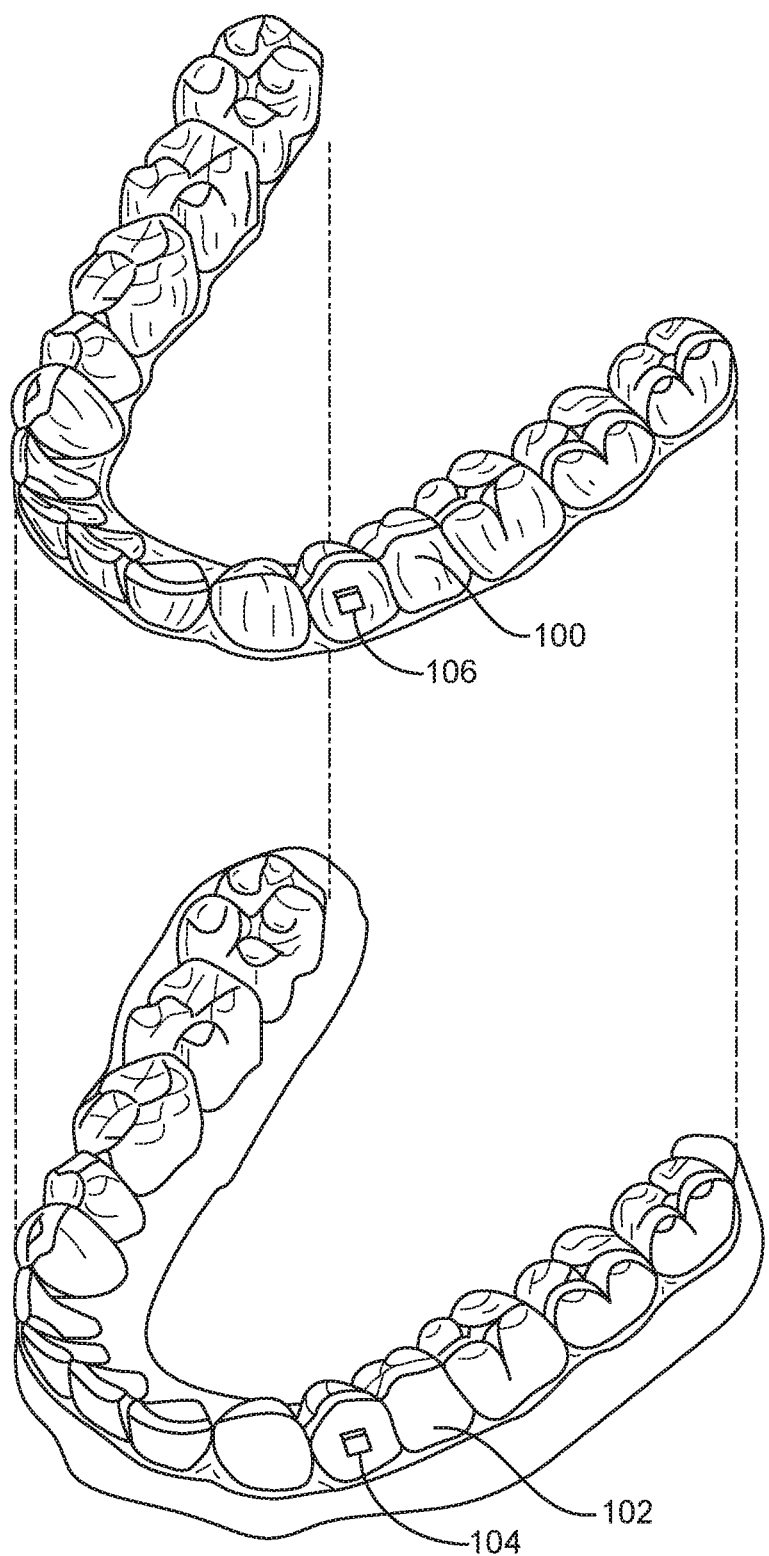
FIG. 1A illustrates a tooth repositioning appliance, in accordance with embodiments.

All terms, chemical names, expressions and designations have their usual meanings which are well-known to those skilled in the art. As used herein, the terms "to comprise" and "comprising" are to be understood as non-limiting, i.e. other components than those explicitly named may be included. Number ranges are to be understood as inclusive, i.e. including the indicated lower and upper limits.

As used herein, the term "polymer" refers to a molecule composed of repeating structural units connected by covalent chemical bonds and characterized by a substantial number of repeating units (e.g., equal to or greater than 10 repeating units and often equal to or greater than 50 repeating units and often equal to or greater than 100 repeating units) and a high molecular weight (e.g. greater than or equal to 5,000 Daltons (Da), 10,000 Da or 20,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other copolymers. "Crosslinked polymers" refers to polymers having one or multiple links between at least two polymer chains, which preferably result from multivalent monomers forming crosslinking sites upon polymerization.

Herein, an "oligomer" refers to a molecule composed of repeating structural units connected by covalent chemical bonds and characterized by a number of repeating units less than that of a polymer (e.g., equal to or less than 10 repeating units) and a lower molecular weight than polymers (e.g. less than 5,000 Da or 2,000 Da). Oligomers may be the polymerization product of one or more monomer precursors. In an embodiment, an oligomer or a monomer cannot be considered a polymer in its own right.

A "prepolymer" refers to a polymer or oligomer the molecules of which are capable of entering, through reactive groups, into further polymerization.

A "reactive diluent," as used herein, may refer to a substance which reduces the viscosity of another substance, such as a monomer or curable resin. A reactive diluent may become part of another substance, such as a polymer obtained by a polymerization process. In some examples, a reactive diluent is a curable monomer which, when mixed with a curable resin, reduces the viscosity of the resultant formulation and is incorporated into the polymer that results from polymerization of the formulation.

Oligomers and polymer mixtures can be characterized and differentiated from other mixtures of oligomers and polymers by measurements of molecular weight and molecular weight distributions.

The average molecular weight (M) is the average number of repeating units n times the molecular weight or molar mass (Mi) of the repeating unit. The number-average molecular weight (Mn) is the arithmetic mean, representing the total weight of the molecules present divided by the total number of molecules.

Photoinitiators that are useful in the disclosure include those that can be activated with light and initiate polymerization of the polymerizable components of the formulation. A "photoinitiator", as used herein, may refer to a compound that can produce radical species and/or promote radical reactions upon exposure to radiation (e.g., UV or visible light).

Photopolymerization occurs when suitable formulations are exposed to radiation (e.g., UV or visible light) of sufficient power and of a wavelength capable of initiating polymerization. The wavelengths and/or power of radiation useful to initiate polymerization may depend on the photoinitiator used. "Light" as used herein includes any wavelength and power capable of initiating polymerization. Some wavelengths of light include ultraviolet (UV) or visible. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous or pulsed light during the process. Both the length of time the system is exposed to UV light and the intensity of the UV light can be varied to determine the ideal reaction conditions.

Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials onto a build surface in order to form successive layers of the object geometry. In some embodiments, the polymerizable monomers described herein can be used in inkjet or coating applications.

Photopolymers may be fabricated by "vat" processes in which light is used to selectively cure a vat or reservoir of the photopolymer. Each layer of photopolymer may be selectively exposed to light in a single exposure or by scanning a beam of light across the layer. Specific techniques include stereolithography (SLA), Digital Light Processing (DLP) and two photon-induced photopolymerization (TPIP).

Continuous direct fabrication methods for photopolymers have also been reported. For example, a direct fabrication process can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

"High temperature lithography," as used herein, may refer to any lithography-based photopolymerization processes that involve heating photopolymerizable material(s). The heating may lower the viscosity of the photopolymerizable material(s) before and/or during curing. Non-limiting examples of high-temperature lithography processes include those processes described in WO 2015/075094, WO 2016/078838 and WO 2018/032022. In some implementations, high-temperature lithography may involve applying heat to material to temperatures between 50° C.-120° C., such as 90° C.-120° C., 100° C.-120° C., 105° C.-115° C., 108°

C.-110° C., etc. The material may be heated to temperatures greater than 120° C. It is noted other ranges may be used without departing from the scope and substance of the inventive concepts described herein.

"Biocompatible" refers to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

As mentioned above, the present disclosure provides, in a first aspect, a novel class of polymerizable monomers, each independently comprising a 2-, 3- or 4-(meth)acryloxybenzoic acid ester according to general formula (I):

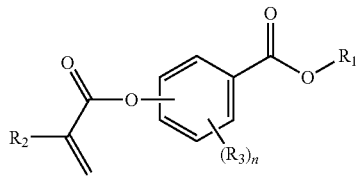

(I)

wherein $R_1$ represents a $C_5$-$C_{20}$ cycloaliphatic hydrocarbyl radical selected from the group consisting of optionally substituted $C_5$-$C_7$ cycloalkyl radicals;

$R_2$ represents H or $CH_3$;

each $R_3$ independently represents $C_1$-$C_3$ alkyl or $C_1$-$C_3$ alkoxy; and n is an integer from 0 to 4.

Any optional substituents to $C_5$-$C_7$ cycloalkyl radicals of $R_1$ should preferably not comprise functionalities which might trigger undesirable side reactions with any other components of curable resin formulations comprising the polymerizable monomers according to the present disclosure. Moreover, they should preferably not excessively raise the melting points or impair the viscosity-lowering effects of the novel monomers. Therefore, in some embodiments, the optional substituents of the $C_5$-$C_7$ cycloalkyl radicals of $R_1$ are selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, —Br, and mixtures thereof, and more preferably they are $C_1$-$C_6$ alkyl groups, most preferably $C_1$-$C_3$ alkyl groups, two of which groups may be connected to form a ring together with the carbon atoms to which they are attached and optionally one or more additional, intervening carbon atoms of the cyclohexyl ring. In further embodiments, $R_1$ is an optionally substituted $C_5$-$C_7$ cycloalkyl radical having 5 to 15, more preferably 5 to 12, most preferably 5 to 10, carbon atoms in total.

In most preferable embodiments, $R_1$ is selected from the group consisting of the following radicals:

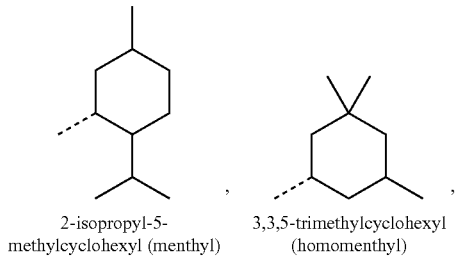

2-isopropyl-5-methylcyclohexyl (menthyl)

3,3,5-trimethylcyclohexyl (homomenthyl)

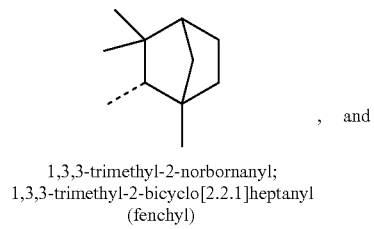

1,3,3-trimethyl-2-norbornanyl;
1,3,3-trimethyl-2-bicyclo[2.2.1]heptanyl (fenchyl)

, and

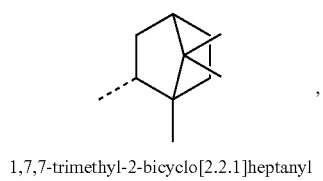

1,7,7-trimethyl-2-bicyclo[2.2.1]heptanyl ((iso)bornyl)

the broken lines in the above formulas each representing the bond to the ester oxygen atom.

The corresponding esters according to formula (I) have already yielded good results, and the corresponding alcohols used to prepare these esters are commercially available, which avoids the need of possibly complex and expensive preparation procedures. These alcohols, of course, are the following:

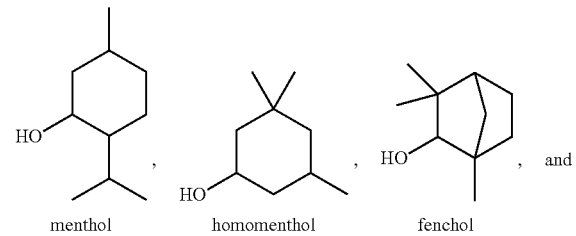

menthol          homomenthol          fenchol

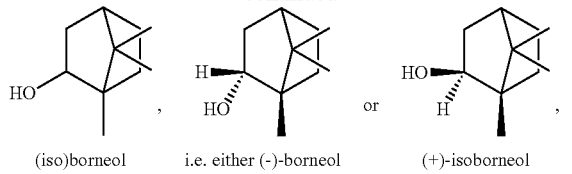

(iso)borneol, i.e. either (-)-borneol or (+)-isoborneol depending on the molecular configuration at the asymmetrical carbon atom at position 2 of the basic bicyclo[2.2.1]heptane structure.

However, in further embodiments, other cycloalkyl radicals $R_1$ contemplated by the present disclosure are, for example, those originating from the following alcohols:

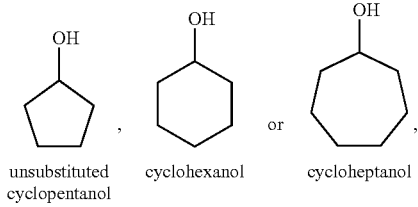 [SMILES: OC1CCCC1 ; OC1CCCCC1 ; OC1CCCCCC1]

unsubstituted cyclopentanol, cyclohexanol or cycloheptanol these cycloalkanols substituted with one or more $C_1$-$C_6$ alkyl group(s), for example, methyl, ethyl, propyl, isopropyl, n-butyl, tert-butyl, amyl, isoamyl, hexyl, isohexyl, and any combinations thereof, at any substitutable carbon atom(s), including position C1, i.e. as a geminal substituent to the alcohol functional group, such cycloalkanols substituted with one or more further cycloalkyl group(s) at any substitutable carbon atom, for example, cyclopentylcyclohexanol or cyclohexylcyclohexanol, e.g.,

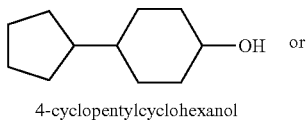

4-cyclopentylcyclohexanol

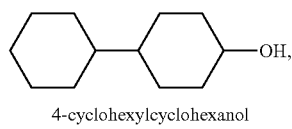

4-cyclohexylcyclohexanol fused ring structures, for example,

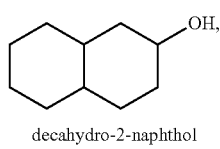 [SMILES: OC1CCC2CCCCC2C1]

decahydro-2-naphthol or polycyclic groups such as 1- or 2-adamantanol

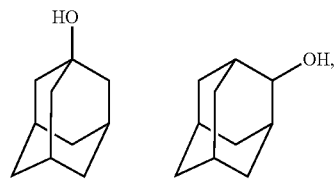 [SMILES: OC12CC3CC(CC(C3)C1)C2 ; OC1C2CC3CC(C2)CC1C3]

as well as such bi- or polycyclic structures substituted with one or more $C_1$-$C_6$ alkyl group(s) at any substitutable carbon atom, as exemplified above, etc.

The substituent on the benzene ring, $R_3$, if present, is preferably selected from the group consisting of methyl, methoxy, ethyl, and ethoxy, and n is preferably selected from 0 or 1. However, most preferably, n is 0, i.e. the benzene ring is unsubstituted, which, again, avoids the need of specifically synthesizing the corresponding acids, being the starting materials for the synthesis of the esters according to formula (I) by (trans)esterification, or the need of purchasing the same, if available at all, at typically higher prices than the unsubstituted acids.

In certain aspects, the present disclosure provides a polymerizable monomer that is a 2-, 3- or 4-(meth)acryloxybenzoic acid ester according to formula (I):

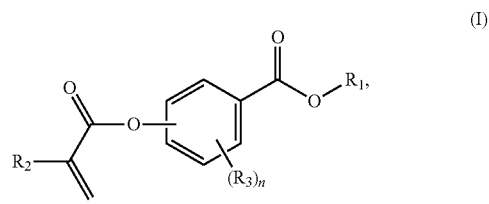

wherein:
R$_1$ represents $C_3$-$C_{10}$ cycloalkyl, wherein the $C_3$-$C_{10}$ cycloalkyl is unsubstituted; substituted with one or more substituents selected from the group consisting of —CH$_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —CH$_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;

R$_2$ represents H or $C_1$-$C_6$ alkyl;

each R$_3$ independently represents halo, $C_1$-$C_3$ alkyl, $C_1$-$C_3$ alkoxy, Si(R$_4$)$_3$, P(O)(OR$_5$)$_2$, or N(R$_6$)$_2$;

each R$_4$ independently represents $C_1$-$C_6$ alkyl or $C_1$-$C_6$ alkoxy;

each R$_5$ independently represents $C_1$-$C_6$ alkyl or $C_6$-$C_{10}$ aryl;

each R$_6$ independently represents H or $C_1$-$C_6$ alkyl; and n is an integer from 0 to 4.

In certain aspects, the present disclosure provides a polymerizable monomer that is a 2-, 3- or 4-substituted benzoic acid ester according to formula (II):

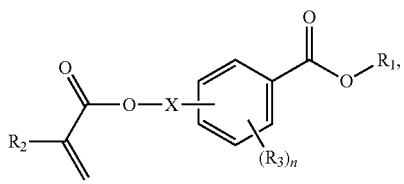

wherein:
R$_1$ represents C$_3$-C$_7$ cycloalkyl or 3- to 7-membered heterocycloalkyl, wherein the C$_3$-C$_7$ cycloalkyl and 3- to 7-membered heterocycloalkyl are unsubstituted; substituted with one or more substituents selected from the group consisting of —CH$_3$, C$_1$-C$_6$ alkoxy, —O(CO)—(C$_1$-C$_6$)alkyl, —COO—(C$_1$-C$_6$)alkyl, =O, —F, —Cl, and —Br; substituted with one or more —CH$_3$ and optionally further substituted with one or more substituents selected from the group consisting of C$_1$-C$_6$ alkyl, C$_1$-C$_6$ alkoxy, —O(CO)—(C$_1$-C$_6$)alkyl, —COO—(C$_1$-C$_6$)alkyl, =O, —F, —Cl, and —Br; or substituted with two or more substituents selected from the group consisting of C$_1$-C$_6$ alkyl, C$_1$-C$_6$ alkoxy, —O(CO)—(C$_1$-C$_6$)alkyl, —COO—(C$_1$-C$_6$)alkyl, =O, —F, —Cl, and —Br;
R$_2$ represents H or C$_1$-C$_6$ alkyl;
each R$_3$ independently represents halo, C$_1$-C$_3$ alkyl, C$_1$-C$_3$ alkoxy, Si(R$_4$)$_3$, P(O)(OR$_5$)$_2$, or N(R$_6$)$_2$;
each R$_4$ independently represents C$_1$-C$_6$ alkyl or C$_1$-C$_6$ alkoxy;
each R$_5$ independently represents C$_1$-C$_6$ alkyl or C$_6$-C$_{10}$ aryl;
each R$_6$ independently represents H or C$_1$-C$_6$ alkyl;
X is C$_1$-C$_3$ alkylene, 1- to 3-membered heteroalkylene, or (CH$_2$CH$_2$O)$_m$;
m is an integer from 1 to 4; and
n is an integer from 0 to 4.

In certain aspects, the present disclosure provides a polymerizable monomer that is a 2-, 3- or 4-substituted benzoic acid ester according to formula (II):

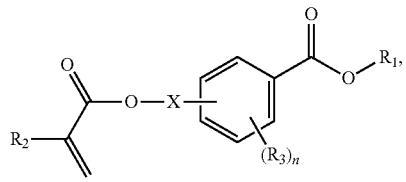

wherein:
R$_1$ represents C$_3$-C$_8$ cycloalkyl or 3- to 7-membered heterocycloalkyl, wherein the C$_3$-C$_8$ cycloalkyl and 3- to 7-membered heterocycloalkyl are unsubstituted; substituted with one or more substituents selected from the group consisting of —CH$_3$, C$_1$-C$_6$ alkoxy, —O(CO)—(C$_1$-C$_6$)alkyl, —COO—(C$_1$-C$_6$)alkyl, =O, —F, —Cl, and —Br; substituted with one or more —CH$_3$ and optionally further substituted with one or more substituents selected from the group consisting of C$_1$-C$_6$ alkyl, C$_1$-C$_6$ alkoxy, —O(CO)—(C$_1$-C$_6$)alkyl, —COO—(C$_1$-C$_6$)alkyl, =O, —F, —Cl, and —Br; or substituted with two or more substituents selected from the group consisting of C$_1$-C$_6$ alkyl, C$_1$-C$_6$ alkoxy, —O(CO)—(C$_1$-C$_6$)alkyl, —COO—(C$_1$-C$_6$)alkyl, =O, —F, —Cl, and —Br;
R$_2$ represents H or C$_1$-C$_6$ alkyl;
each R$_3$ independently represents halo, C$_1$-C$_3$ alkyl, C$_1$-C$_3$ alkoxy, Si(R$_4$)$_3$, P(O)(OR$_5$)$_2$, or N(R$_6$)$_2$;
each R$_4$ independently represents C$_1$-C$_6$ alkyl or C$_1$-C$_6$ alkoxy;
each R$_5$ independently represents C$_1$-C$_6$ alkyl or C$_6$-C$_{10}$ aryl;
each R$_6$ independently represents H or C$_1$-C$_6$ alkyl;
X is C$_1$-C$_3$ alkylene, 1- to 3-membered heteroalkylene, or (CH$_2$CH$_2$O)$_m$;
m is an integer from 1 to 4; and
n is an integer from 0 to 4.

In certain aspects, the present disclosure provides a polymerizable monomer that is a 2-, 3- or 4-substituted benzoic acid ester according to formula (III):

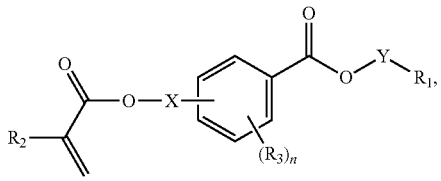

wherein:
R$_1$ represents C$_3$-C$_7$ cycloalkyl or C$_6$-C$_{10}$ aryl, wherein the C$_3$-C$_7$ cycloalkyl and C$_6$-C$_{10}$ aryl are unsubstituted or substituted with one or more substituents selected from the group consisting of C$_1$-C$_6$ alkyl, C$_1$-C$_6$ alkoxy, C$_3$-C$_7$ cycloalkyl, C$_6$-C$_{10}$ aryl, C$_1$-C$_6$ alkoxyl-C$_6$-C$_{10}$ aryl, —O(CO)—(C$_1$-C$_6$)alkyl, —COO—(C$_1$-C$_6$)alkyl, =O, —F, —Cl, and —Br, provided that the benzoic acid ester of formula (III) is 2- or 3-substituted when R$_1$ is unsubstituted;
R$_2$ represents H or C$_1$-C$_6$ alkyl;
each R$_3$ independently represents halo, C$_1$-C$_3$ alkyl, C$_1$-C$_3$ alkoxy, Si(R$_4$)$_3$, P(O)(OR$_5$)$_2$, or N(R$_6$)$_2$;
each R$_4$ independently represents C$_1$-C$_6$ alkyl or C$_1$-C$_6$ alkoxy;
each R$_5$ independently represents C$_1$-C$_6$ alkyl or C$_6$-C$_{10}$ aryl;
each R$_6$ independently represents H or C$_1$-C$_6$ alkyl;
X is absent, C$_1$-C$_3$ alkylene, 1- to 3-membered heteroalkylene, or (CH$_2$CH$_2$O)$_m$;
Y is C$_1$-C$_6$ alkylene;
m is an integer from 1 to 4; and
n is an integer from 0 to 4.

In certain aspects, the present disclosure provides a polymerizable monomer that is a 2-, 3- or 4-substituted benzoic acid ester according to formula (III):

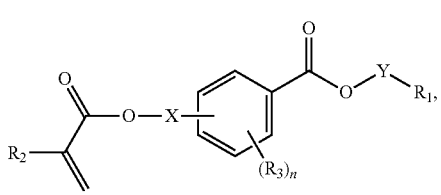

wherein:
  R$_1$ represents C$_3$-C$_8$ cycloalkyl or C$_6$-C$_{10}$ aryl, wherein the C$_3$-C$_8$ cycloalkyl and C$_6$-C$_{10}$ aryl are unsubstituted or substituted with one or more substituents selected from the group consisting of C$_1$-C$_6$ alkyl, C$_1$-C$_6$ alkoxy, C$_3$-C$_7$ cycloalkyl, C$_6$-C$_{10}$ aryl, C$_1$-C$_6$ alkoxyl-C$_6$-C$_{10}$ aryl, —O(CO)—(C$_1$-C$_6$)alkyl, —COO—(C$_1$-C$_6$)alkyl, =O, —F, —Cl, and —Br, provided that the benzoic acid ester of formula (III) is 2- or 3-substituted when R$_1$ is unsubstituted;
  R$_2$ represents H or C$_1$-C$_6$ alkyl;
  each R$_3$ independently represents halo, C$_1$-C$_3$ alkyl, C$_1$-C$_3$ alkoxy, Si(R$_4$)$_3$, P(O)(OR)$_2$, or N(R$_6$)$_2$;
  each R$_4$ independently represents C$_1$-C$_6$ alkyl or C$_1$-C$_6$ alkoxy;
  each R$_5$ independently represents C$_1$-C$_6$ alkyl or C$_1$-C$_{10}$ aryl;
  each R$_6$ independently represents H or C$_1$-C$_6$ alkyl;
  X is absent, C$_1$-C$_3$ alkylene, 1- to 3-membered heteroalkylene, or (CH$_2$CH$_2$O)$_m$;
  Y is C$_1$-C$_6$ alkylene;
  m is an integer from 1 to 4; and
  n is an integer from 0 to 4.

In some embodiments, for a compound of formula (I), (II) or (III), R$_1$ is optionally substituted C$_5$-C$_7$ cycloalkyl. The optionally substituted C$_5$-C$_7$ cycloalkyl may have 5 to 15 carbon atoms in total, such as 5 to 12 or 5 to 10 carbon atoms. In some embodiments, for a compound of formula (I), (II) or (III), R$_1$ is optionally substituted C$_5$-C$_8$ cycloalkyl. The optionally substituted C$_5$-C$_8$ cycloalkyl may have 5 to 15 carbon atoms in total, such as 5 to 12 or 5 to 10 carbon atoms. In some embodiments, for a compound of formula (II), R$_1$ is selected from optionally substituted C$_5$-C$_7$ cycloalkyl and optionally substituted 5- to 7-membered heterocycloalkyl. In some embodiments, for a compound of formula (III), R$_1$ is selected from optionally substituted C$_5$-C$_7$ cycloalkyl and optionally substituted C$_6$-C$_{10}$ aryl, such as optionally substituted phenyl. For a compound of formula (I), (II) or (III), R$_1$ may be a monocyclic cycloalkyl, such as cyclohexyl. In some embodiments, R$_1$ is a bicyclic cycloalkyl, such as a bridged, fused, or spirocyclic cycloalkyl. This includes, for example, bicyclo[2.2.1]heptyl, bicyclo[1.1.1]pentyl, spiro[4.4]nonyl, and decahydronaphthalyl, each of which may be optionally substituted. In some embodiments, R$_1$ is unsubstituted. Alternatively, R$_1$ is substituted with at least one substituent.

Exemplary optional substituents of R$_1$ include C$_1$-C$_6$ alkyl, C$_1$-C$_6$ alkoxy, C$_3$-C$_7$ cycloalkyl, C$_6$-C$_{10}$ aryl, C$_1$-C$_6$ alkoxy-C$_6$-C$_{10}$ aryl, —O(CO)—(C$_1$-C$_6$)alkyl, —COO—(C$_1$-C$_6$)alkyl, =O, —F, —Cl, and —Br. In some embodiments, R$_1$ is substituted with one or more substituents selected from the group consisting of —CH$_3$, C$_1$-C$_6$ alkoxy, —O(CO)—(C$_1$-C$_6$)alkyl, —COO—(C$_1$-C$_6$)alkyl, =O, —F, —Cl, and —Br. R$_1$ may be substituted with at least one —CH$_3$. For example, in some embodiments R$_1$ is substituted with one or more —CH$_3$ and optionally further substituted with one or more substituents selected from the group consisting of C$_1$-C$_6$ alkyl, C$_1$-C$_6$ alkoxy, —O(CO)—(C$_1$-C$_6$) alkyl, —COO—(C$_1$-C$_6$)alkyl, =O, —F, —Cl, and —Br. In some embodiments, R$_1$ substituted with two or more substituents selected from the group consisting of C$_1$-C$_6$ alkyl, C$_1$-C$_6$ alkoxy, —O(CO)—(C$_1$-C$_6$)alkyl, —COO—(C$_1$-C$_6$) alkyl, =O, —F, —Cl, and —Br. In some embodiments, R$_1$ is substituted with one or more, linear or branched C$_1$-C$_6$ alkyl, such as methyl, ethyl, n-propyl, iso-propyl, n-butyl, sec-butyl, iso-butyl, or tert-butyl. R$_1$ may be substituted with —CH$_3$ and optionally further substituted with one or more, linear or branched C$_1$-C$_6$ alkyl. Two substituents of R$_1$, such as two C$_1$-C$_6$ alkyl, may be connected to form a ring. For example, two substituents on a cyclohexyl group may form a bridge, such as the methylene bridge found in bicyclo [2.2.1]heptyl. In some embodiments, R$_1$ is substituted with one or more substituents selected from the group consisting of C$_1$-C$_4$ alkyl and C$_1$-C$_4$ alkoxy.

In some embodiments, for a compound of formula (I), (II) or (III), R$_1$ is cyclohexyl substituted with —CH$_3$, and optionally further substituted with one or more, linear or branched C$_1$-C$_6$ alkyl, wherein two of said C$_1$-C$_6$ alkyl may be connected to form a ring together with the carbon atoms to which they are attached and optionally one or more additional, intervening carbon atoms of the cyclohexyl ring.

Exemplary R$_1$ groups include, but are not limited to

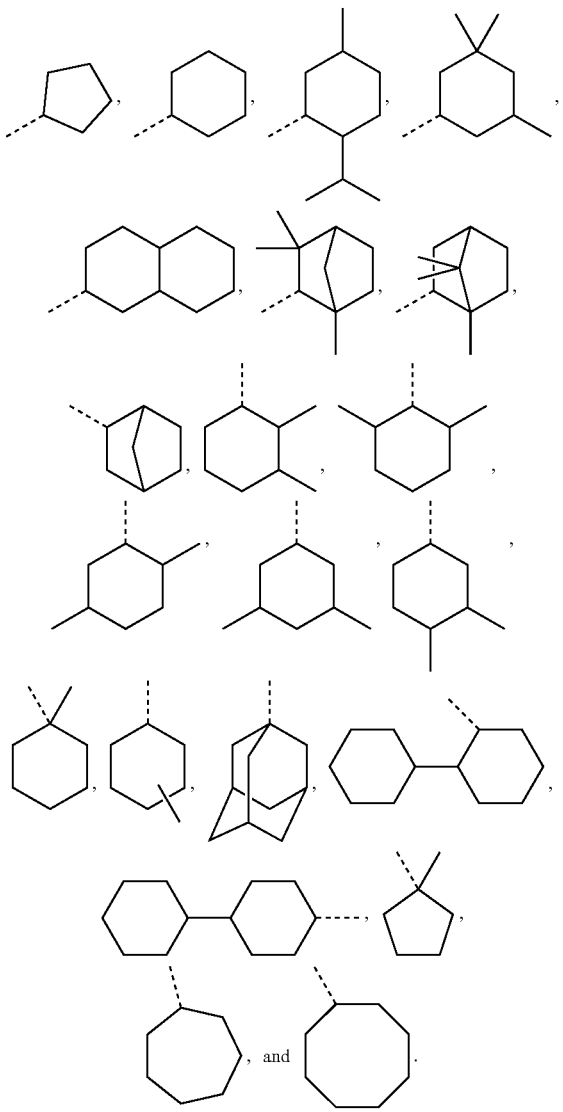

The broken line is used herein to indicate the bond to the rest of the molecule (e.g., the bond to the ester oxygen of formulas (I) and (II) or the bond to linker Y of formula (III)). Further exemplary —Y—R$_1$ groups of a compound of formula (III) include, but are not limited to

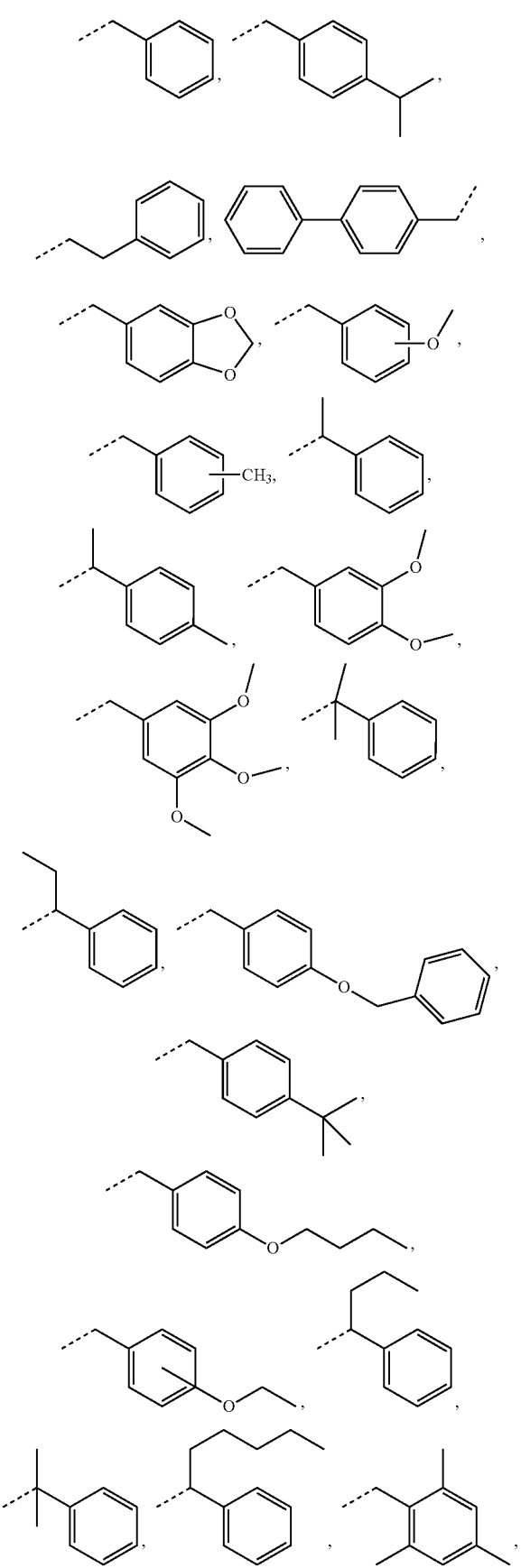
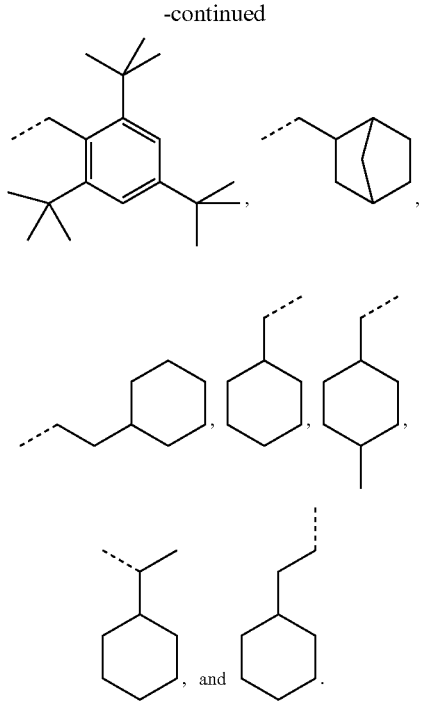
A polymerizable monomer of formula (I), (II) or (III) may be 2-substituted, as depicted in formulas (I-a), (II-a) and (III-a):
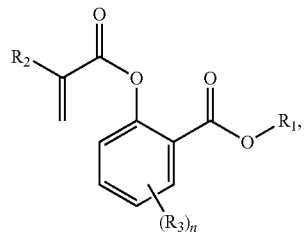
(I-a)
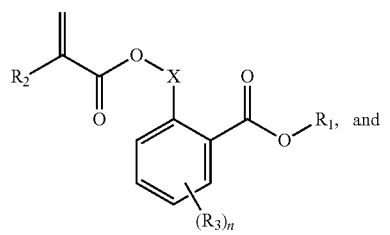
(II-a), and
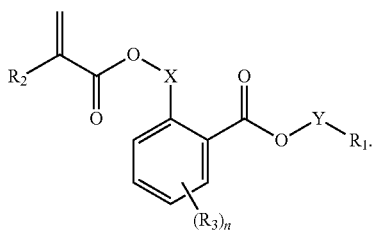
(III-a)
A polymerizable monomer of formula (I), (II) or (III) may be 3-substituted, as depicted in formulas (I-b), (II-b) and (III-b):

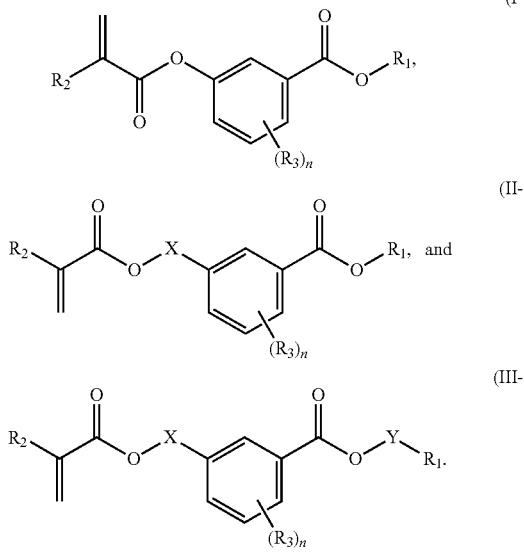

A polymerizable monomer of formula (I), (II) or (III) may be 4-substituted, as depicted in formulas (I-c), (II-c) and (III-c):

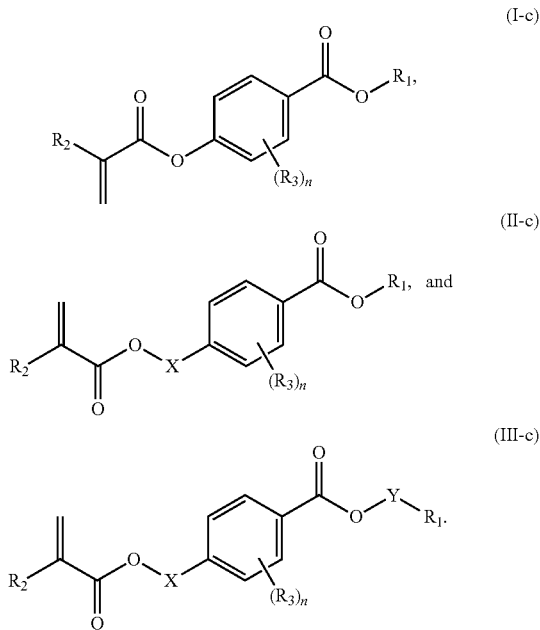

In some embodiments, for a compound of formula (I), (II) or (III), $R_1$ represents optionally substituted $C_5$-$C_7$ cycloalkyl; $R_2$ represents H or $CH_3$; each $R_3$ independently represents $C_1$-$C_3$ alkyl or $C_1$-$C_3$ alkoxy; and n is an integer from 0 to 4. In some embodiments, $R_3$ is selected from the group consisting of $C_1$—$C_3$ alkyl and $C_1$-$C_3$ alkoxy, such as —$CH_3$ or —$OCH_3$. $R_3$ may be selected from methyl, methoxy, ethyl and ethyoxy.

In some embodiments, for a compound of formula (I), (II) or (III), n is 0 or 1, such as n is 0. In some embodiments, $R_2$ is H or $CH_3$. For a compound of formula (II) or (III), X may be $C_1$-$C_3$ alkylene, such as methylene. In some embodiments, X is absent. In some embodiments, for a compound of formula (III), Y is $C_1$-$C_3$ alkylene.

Some characteristics of the polymerizable monomers according to the present disclosure, with regard to their possible use as reactive diluents, include having a melting point which is lower than the processing temperatures employed in current high temperature lithography-based photopolymerization processes, which are typically in the range of 50-120° C., such as 90-120° C. Therefore, polymerizable monomers to be used as reactive diluents should have a melting point <120° C., preferably <90° C., more preferably <70° C., even more preferably <50° C. or <30° C., which provides for low viscosities of the melts and, consequently, for more pronounced viscosity-lowering effects when they are used as reactive diluents for resins to be cured by means of high temperature lithography-based polymerization. Most preferably, they are liquid at room temperature, which, in addition to the above advantages, facilitates their handling.

In highly preferable embodiments of the present invention, the polymerizable monomer is selected from the group consisting of the following compounds: 2-isopropyl-5-methylcyclohexyl 2-(methacryloxy)benzoate; 3,3,5-trimethylcyclohexyl 2-(methacryloxy)benzoate; 1,3,3-trimethyl-2-bicyclo[2.2.1]heptanyl 2-(methacryloxy)benzoate; 1,7,7-trimethyl-2-bicyclo[2.2.1]heptanyl 2-(methacryloxy) benzoate; 2-isopropyl-5-methylcyclohexyl 3-(methacryloxy)benzoate; 2-isopropyl-5-methylcyclohexyl 4-(methacryloxy)benzoate; and 3,3,5-trimethylcyclohexyl 2-(acryloxy)benzoate; which compounds have already yielded good or excellent results, which is why these seven novel compounds are the subject matter of the fourth aspect of the disclosure. In some embodiments, the polymerizable monomer is selected from compounds 1 to 21 presented in Table 1.

The second aspect of the present disclosure is a method of polymerizing a curable composition comprising at least one kind of polymerizable species, and optionally one or more further components selected from the group consisting of polymerization initiators, polymerization inhibitors, solvents, fillers, antioxidants, pigments, colorants, surface modifiers, and mixtures thereof, to obtain an optionally crosslinked polymer, the method comprising a step of mixing said curable composition, optionally after heating, with a reactive diluent before inducing polymerization by heating and/or irradiating the composition; wherein said reactive diluent is selected from the polymerizable monomers according to the first aspect of the disclosure, and mixtures thereof.

This method is preferably part of a high temperature lithography-based photopolymerization process, wherein said curable composition comprises at least one photopolymerization initiator and is heated before being mixed with said reactive diluent, more preferably part of an additive manufacturing process, for example, part of a 3D printing process. In some embodiments of the method, said curable composition comprises at least one photopolymerization initiator and is heated to a predefined elevated process temperature ranging from 50° C. to 120° C., such as from 90° C. to 120° C., before becoming irradiated with light of a suitable wavelength to be absorbed by said photoinitiator, thereby causing a cleavage of the photoinitiator to induce polymerization of the curable composition to obtain said polymer, which may be a crosslinked polymer, if said curable composition comprises at least one multivalent monomer, which provides for a certain degree of crosslinking upon polymerization.

Since the polymerizable monomers of the present disclosure become co-polymerized in the polymerization process of the method according to the present disclosure, the result is an optionally crosslinked polymer comprising moieties of the polymerizable monomer as repeating units, which is the subject matter of a third aspect of the present disclosure. Preferably, such polymer is a crosslinked polymer which, typically, is highly suitable for use as an orthodontic appliance.

In certain aspects, the present disclosure provides an orthodontic appliance comprising a polymer, wherein the polymer comprises a monomer of the formula:

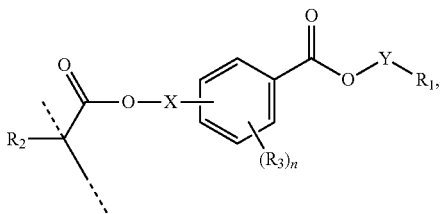

wherein:
- $R_1$ represents $C_3$-$C_{10}$ cycloalkyl, 3- to 10-membered heterocycloalkyl or $C_3$-$C_{10}$ aryl, wherein the $C_3$-$C_{10}$ cycloalkyl, 3- to 10-membered heterocycloalkyl and $C_3$-$C_{10}$ aryl are unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$ alkoxyl-$C_6$-$C_{10}$ aryl, —O(CO)—($C_1$-$C_6$)alkyl, —COO—($C_1$-$C_6$)alkyl, =O, —F, —Cl, and —Br;
- $R_2$ represents H or $C_1$-$C_6$ alkyl;
- each $R_3$ independently represents halo, $C_1$-$C_3$ alkyl, $C_1$-$C_3$ alkoxy, Si($R_4$)$_3$, P(O)(OR)$_2$, or N($R_6$)$_2$;
- each $R_4$ independently represents $C_1$-$C_6$ alkyl or $C_1$-$C_6$ alkoxy;
- each $R_5$ independently represents $C_1$-$C_6$ alkyl or $C_6$-$C_{10}$ aryl;
- each $R_6$ independently represents H or $C_1$-$C_6$ alkyl;
- X is absent, $C_1$-$C_3$ alkylene, 1- to 3-membered heteroalkylene, or (CH$_2$CH$_2$O)$_m$;
- Y is absent, $C_1$-$C_6$ alkylene, 1- to 3-membered heteroalkylene, or (CH$_2$CH$_2$O)$_m$;
- each m is independently an integer from 1 to 4; and
- n is an integer from 0 to 4 wherein each dashed line represents a bond to a carbon atom.

In some embodiments,
- $R_1$ represents $C_3$-$C_{10}$ cycloalkyl, wherein the $C_3$-$C_{10}$ cycloalkyl is unsubstituted; substituted with one or more substituents selected from the group consisting of —CH$_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —CH$_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;
- $R_2$ represents H or $C_1$-$C_6$ alkyl;
- each $R_3$ independently represents halo, $C_1$-$C_3$ alkyl, $C_1$-$C_3$ alkoxy, Si($R_4$)$_3$, P(O)(OR)$_2$, or N($R_6$)$_2$;
- each $R_4$ independently represents $C_1$-$C_6$ alkyl or $C_1$-$C_6$ alkoxy;
- each $R_5$ independently represents $C_1$-$C_6$ alkyl or $C_6$-$C_{10}$ aryl;
- each $R_6$ independently represents H or $C_1$-$C_6$ alkyl;
- X is absent;
- Y is absent; and
- n is an integer from 0 to 4

In some embodiments,
- $R_1$ represents $C_3$-$C_7$ cycloalkyl or 3- to 7-membered heterocycloalkyl, wherein the $C_3$-$C_7$ cycloalkyl and 3- to 7-membered heterocycloalkyl are unsubstituted; substituted with one or more substituents selected from the group consisting of —CH$_3$, $C_1$-$C_6$ alkoxy, —O(CO)—($C_1$-$C_6$)alkyl, —COO—($C_1$-$C_6$)alkyl, =O, —F, —Cl, and —Br; substituted with one or more —CH$_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br; or substituted with two or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br;
- $R_2$ represents H or $C_1$-$C_6$ alkyl;
- each $R_3$ independently represents halo, $C_1$-$C_3$ alkyl, $C_1$-$C_3$ alkoxy, Si($R_4$)$_3$, P(O)(OR)$_2$, or N($R_6$)$_2$;
- each $R_4$ independently represents $C_1$-$C_6$ alkyl or $C_1$-$C_6$ alkoxy;
- each $R_5$ independently represents $C_1$-$C_6$ alkyl or $C_6$-$C_{10}$ aryl;
- each $R_6$ independently represents H or $C_1$-$C_6$ alkyl;
- X is $C_1$-$C_3$ alkylene, 1- to 3-membered heteroalkylene, or (CH$_2$CH$_2$O)$_m$;
- Y is absent;
- m is an integer from 1 to 4; and
- n is an integer from 0 to 4.

In some embodiments,
- $R_1$ represents $C_3$-$C_7$ cycloalkyl or $C_6$-$C_{10}$ aryl, wherein the $C_3$-$C_7$ cycloalkyl and $C_6$-$C_{10}$ aryl are unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$ alkoxyl-$C_6$-$C_{10}$ aryl, —O(CO)—($C_1$-$C_6$)alkyl, —COO—($C_1$-$C_6$)alkyl, =O, —F, —Cl, and —Br, provided that the benzoic acid ester of formula (III) is 2- or 3-substituted when $R_1$ is unsubstituted;
- $R_2$ represents H or $C_1$-$C_6$ alkyl;
- each $R_3$ independently represents halo, $C_1$-$C_3$ alkyl, $C_1$-$C_3$ alkoxy, Si($R_4$)$_3$, P(O)(OR)$_2$, or N($R_6$)$_2$;
- each $R_4$ independently represents $C_1$-$C_6$ alkyl or $C_1$-$C_6$ alkoxy;
- each $R_5$ independently represents $C_1$-$C_6$ alkyl or $C_1$-$C_{10}$ aryl;
- each $R_6$ independently represents H or $C_1$-$C_6$ alkyl;
- X is absent, $C_1$-$C_3$ alkylene, 1- to 3-membered heteroalkylene, or (CH$_2$CH$_2$O)$_m$;
- Y is $C_1$-$C_6$ alkylene;
- m is an integer from 1 to 4; and
- n is an integer from 0 to 4.

In some embodiments, Y is $C_1$-$C_3$ alkylene. In some embodiments, X is absent. In some embodiments, X is $C_1$-$C_3$ alkylene.

$R_1$ may be optionally substituted $C_5$-$C_{10}$ cycloalkyl, such as optionally substituted $C_5$-$C_7$ cycloalkyl. In some embodiments, $R_1$ is substituted with one or more, linear or branched $C_1$-$C_6$ alkyl. For example, $R_1$ may be substituted with —$CH_3$ and optionally further substituted with one or more, linear or branched $C_1$-$C_6$ alkyl. In some embodiments, $R_1$ is optionally substituted $C_5$-$C_7$ cycloalkyl having 5 to 15 or 5 to 12 or 5 to 10 carbon atoms in total. In some embodiments, $R_1$ is cyclohexyl substituted with —$CH_3$, and optionally further substituted with one or more, linear or branched $C_1$-$C_6$ alkyl, wherein two of said $C_1$-$C_6$ alkyl may be connected to form a ring together with the carbon atoms to which they are attached and optionally one or more additional, intervening carbon atoms of the cyclohexyl ring. In some embodiments, $R_1$ is cyclohexyl substituted with —$CH_3$, and optionally further substituted with one or more $C_1$-$C_3$ alkyl groups, wherein two of said $C_1$-$C_3$ alkyl groups may be connected to form a ring together with the carbon atoms to which they are attached and optionally one or more additional, intervening carbon atoms of the cyclohexyl ring. In some embodiments, $R_1$ is selected from the group consisting of:

such as

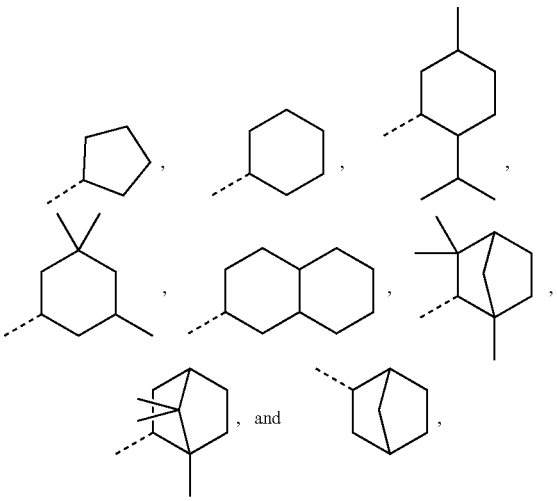

or such as

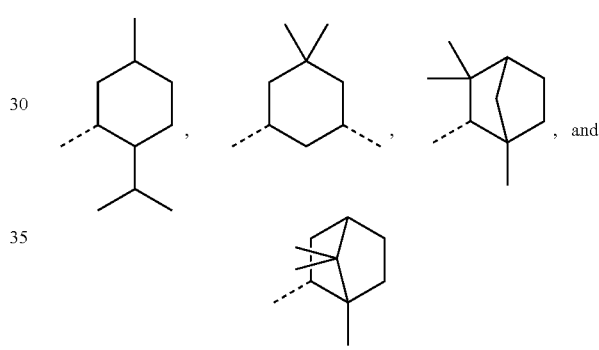

In some embodiments, $R_1$ is optionally substituted phenyl. In some embodiments, $R_1$ is substituted with one or more substituents selected from the group consisting of $C_1$-$C_4$ alkyl and $C_1$-$C_4$ alkoxy.

In some embodiments, —Y—$R_1$ is selected from the group consisting of

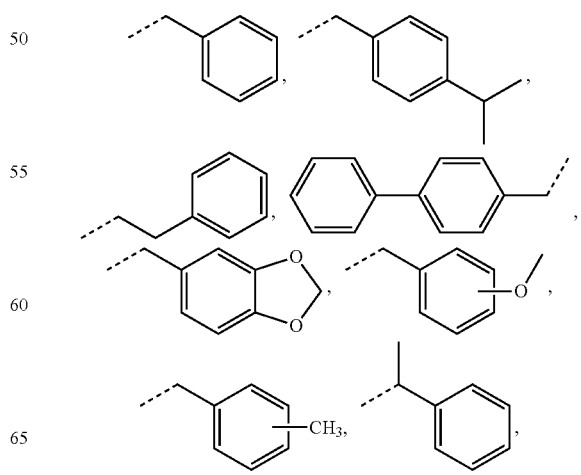

-continued

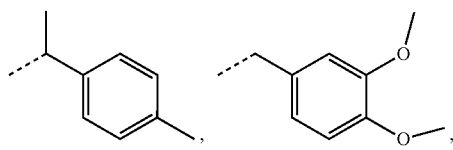
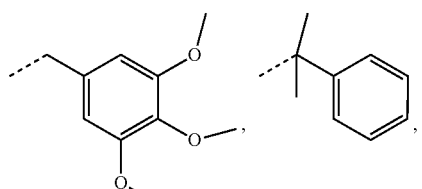
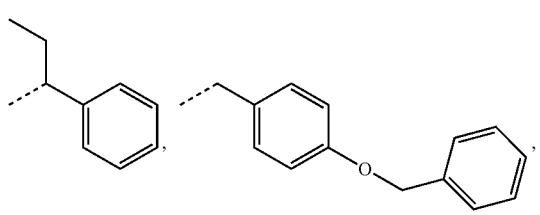
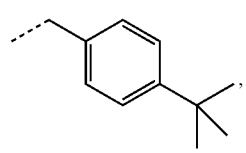
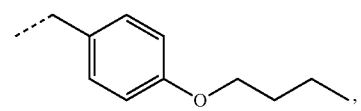
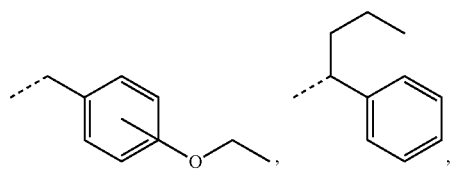
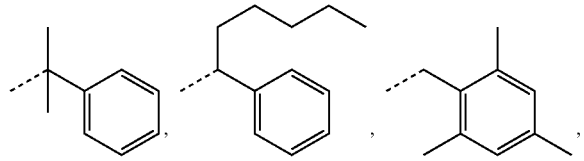
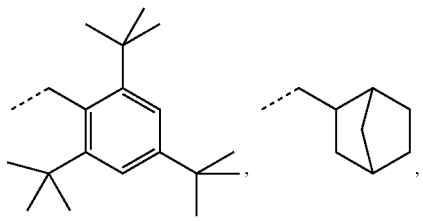
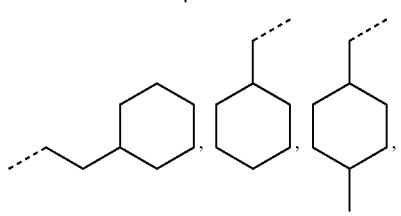

-continued

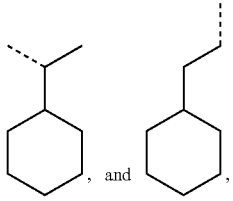

such as

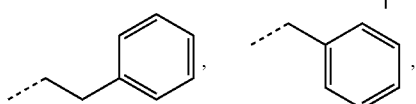
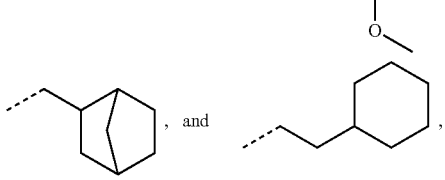

or such as

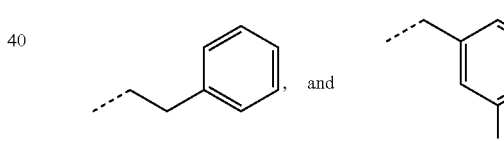

In some embodiments, $R_1$ is unsubstituted.

In some embodiments, the monomer is a 2- or 3-substituted benzoic acid ester. In some embodiments, the monomer is a 4-substituted benzoic acid ester.

In some embodiments, $R_1$ represents optionally substituted $C_5$-$C_7$ cycloalkyl; $R_2$ represents H or $CH_3$; each $R_3$ independently represents $C_1$-$C_3$ alkyl or $C_1$-$C_3$ alkoxy; and n is an integer from 0 to 4. In some embodiments, $R_3$ is selected from the group consisting of $C_1$-$C_3$ alkyl and $C_1$-$C_3$ alkoxy, such as methyl, methoxy, ethyl, and ethoxy. In some embodiments, n is 0 or 1, such as n is 0. In some embodiments, $R_2$ is H or $CH_3$.

As mentioned above, the polymerizable monomers according to the first aspect of the present disclosure may be synthesized by esterification or transesterification reactions of the corresponding commercially available 2-, 3- or 4-hydroxybenzoic acids or esters and subsequent (meth)acrylation, preferably using (meth)acrylic anhydride or (meth)acryloyl chloride, or by an esterification or transesterification reaction of the corresponding 2-, 3- or 4-(meth)acryloxybenzoic acids or esters, which may be commercially available or synthesized, in the first instance, by an esterification reaction of the corresponding 2-, 3- or 4-hydroxybenzoic acids or acid esters, preferably, again, with (meth)acrylic anhydride or (meth)acryloyl chloride.

Preferably, these esterification or transesterification reactions are carried out in the presence of a suitable base, e.g., triethylamine, pyridine, dimethylaminopyridine, or sodium metal, and/or of a suitable solvent, e.g. $CH_2Cl_2$ or any other, preferably aprotic and low-boiling, solvent for the reactants. It may be advantageous to heat or cool the reactants, as appropriate. For example, for (trans)esterifying the corresponding 2-, 3- or 4-hydroxybenzoic acids (or acid esters), it may be preferable to heat the reaction mixture to elevated temperatures such as 100° C. or higher, e.g., 120° C. or 130° C., and for subsequent esterification reactions using (meth) acrylic anhydride, heating may be advantageous as well. However, where (meth)acryloyl chloride is used for esterifying the OH group of the hydroxybenzoic acid esters, cooling the reaction mixtures, e.g., to a temperature <0° C. or ←10° C., may be recommendable in order to avoid a possible cleavage of the respective benzoic acid esters. Those skilled in the art of organic syntheses will know the best way of carrying out such (trans)esterification reactions.

If a transesterification reaction is carried out to prepare a desired 2-, 3- or 4-(meth)acryloxybenzoic acid ester, the corresponding methyl or ethyl ester is preferably used as the starting material, since methanol or ethanol formed as a by-product can be distilled off quite easily.

Exemplary methods of synthesizing the polymerizable monomers of the present disclosure are shown in the following reaction schemes. In a first synthetic route, either the corresponding 2-, 3- or 4-hydroxybenzoic acid or the corresponding methyl 2-, 3- or 4-hydroxybenzoate is used as the starting material, which is (trans)esterified with the appropriate alcohol $R_1$—OH, optionally while distilling off the MeOH formed as a by-product, to yield the desired 2-, 3- or 4-hydroxybenzoic acid $R_1$-ester which is finally (meth) acrylated using (meth)acrylic anhydride or (meth)acryloyl chloride, as shown in the following reaction scheme.

Alternatively, the corresponding 2-, 3- or 4-hydroxybenzoic acid or the corresponding methyl 2-, 3- or 4-hydroxybenzoate may be used as the starting material which is first (meth)acrylated by reaction with (meth)acrylic anhydride or (meth)acryloyl chloride to give the corresponding 2-, 3- or 4-((meth)acryloxy)benzoic acid, or its methyl ester, which is (trans)esterified to yield the desired monomer according to formula (I), as shown in the following Scheme 2.

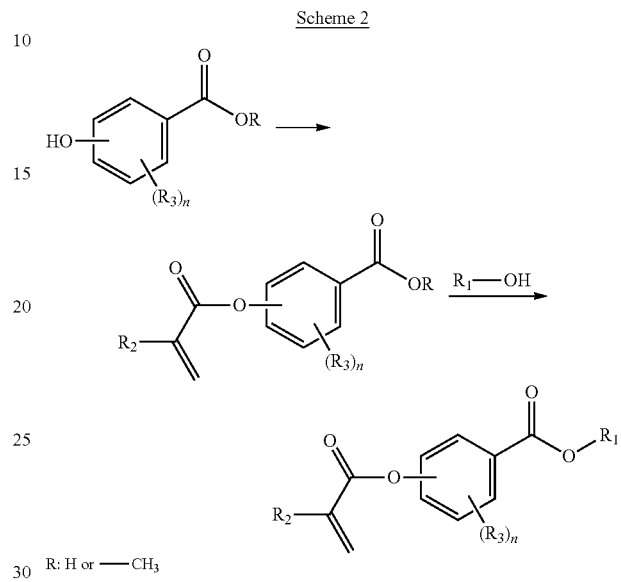

If the corresponding 2-, 3- or 4-hydroxybenzoic acid is used as the starting material, the second esterification reaction may be supported by first converting the intermediate (meth)acrylated benzoic acid into the corresponding benzoyl chloride using a suitable chlorinating agent, e.g., thionyl chloride, and subsequently reacting the intermediate benzoyl chloride with the corresponding alcohol $R_1$—OH to yield the final product, as shown in the following reaction scheme.

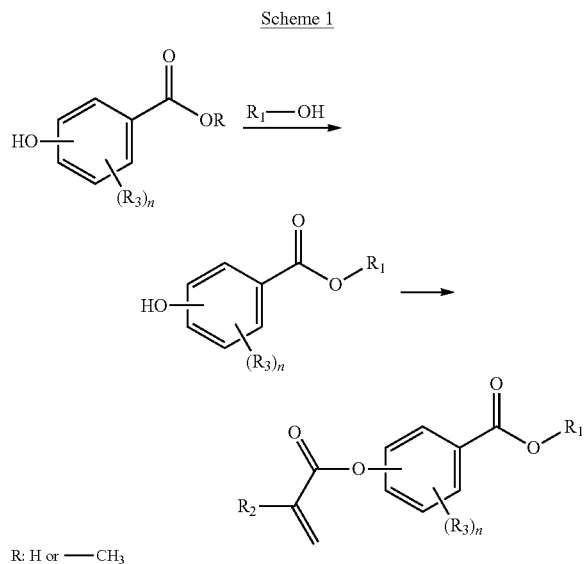

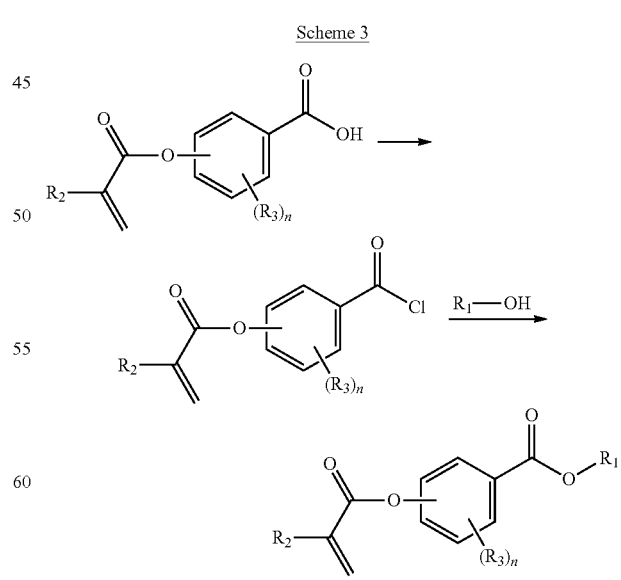

Such preparations are common practice in the field of organic synthesis, and a skilled artisan will readily be able to select the best method for preparing the particular polymerizable monomers according to the present disclosure.

A polymerizable monomer of the present disclosure, for example, a compound provided in Table 1, may be synthesized according to one of the general routes outlined in Schemes 1-3, Examples 1-21 or by methods generally known in the art.

TABLE 1

| No. | Structure |
|-----|-----------|
| 1 | |
| 2 | |
| 3 | |
| 4 | |

TABLE 1-continued

| No. | Structure |
|-----|-----------|
| 5 | |
| 6 | |
| 7 | |
| 8 | |
| 9 | |

TABLE 1-continued

| No. | Structure |
|---|---|
| 10 | |
| 11 | |
| 12 | |
| 13 | |
| 14 | |
| 15 | |
| 16 | |
| 17 | |
| 18 | |
| 19 | |
| 20 | |
| 21 | |

TABLE 1-continued

| No. | Structure |
|---|---|
| Ref1 | 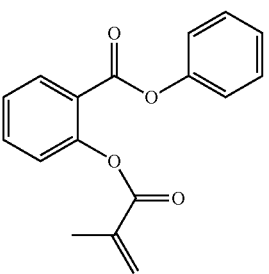 [SMILES: C=C(C)C(=O)Oc1ccccc1C(=O)Oc1ccccc1] |
| Ref2 | 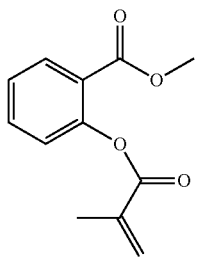 [SMILES: C=C(C)C(=O)Oc1ccccc1C(=O)OC] |
| Ref3 | 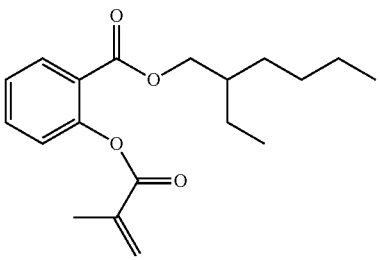 [SMILES: C=C(C)C(=O)Oc1ccccc1C(=O)OCC(CC)CCCC] |
| Ref4 | 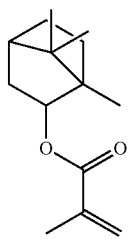 |
| Ref5 | 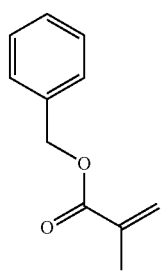 |

The method according to the second aspect of the present disclosure, i.e. the method of polymerizing a curable composition comprising at least one kind of polymerizable species to give an optionally crosslinked polymer by mixing said curable composition, optionally after heating, with a reactive diluent before inducing polymerization by heating and/or irradiating the composition, wherein said reactive diluent is at least one polymerizable monomer according to the present disclosure, is not particularly limited. This means that any polymerizable monomers, oligomers or prepolymers which are able to co-polymerize with the polymerizable monomers of the disclosure may be used as said polymerizable species.

In some embodiments, this method is part of a high temperature lithography-based photopolymerization process, wherein said curable composition comprises at least one photopolymerization initiator which, upon irradiation with light of a suitable wavelength to be absorbed, is cleaved, which results in cleavage products at least one of which is able to induce polymerization of the curable composition, which polymerization reaction preferably is part of an additive manufacturing process, more preferably a 3D printing process. Consequently, the photoinitiator should be compatible with the at least one polymerizable species and the reactive diluent, i.e. the polymerizable monomers of the disclosure. Being part of a high temperature photopolymerization process, some embodiments of the method comprise a step of heating the curable formulation containing the polymerizable monomer(s) of the disclosure as reactive diluent to a predefined elevated process temperature ranging from 50° C. to 120° C., such as from 90° C. to 120° C., before it is irradiated to induce polymerization resulting in optionally crosslinked polymers.

In further embodiments, the method comprises polymerizing a curable composition which comprises at least one multivalent monomer and is polymerized to give a crosslinked polymer which comprises moieties originating from the polymerizable monomer(s) of the present disclosure as repeating units.

Such optionally crosslinked polymers comprising repeating units originating from the polymerizable monomer(s) of the disclosure are the subject matter of the third aspect of the present disclosure, the crosslinked embodiments of these polymers being especially suitable to be used as orthodontic appliances such as aligners.

In order to obtain crosslinked polymers which are particularly suitable as orthodontic appliances, the at least one polymerizable species used in the method according to the present disclosure should be selected with regard to several thermomechanical properties of the resulting polymers. First, at least one, preferably, however, more than one, multivalent polymerizable species should be included. Second, the amounts of the polymerizable species and the reactive diluent, i.e. the polymerizable monomer(s) of the present disclosure, should be well balanced. And third, the polymerizable monomer(s) of the present disclosure used as reactive diluent(s) should be selected so as to contribute to the thermomechanical properties of the polymers.

As shown by the following examples, the polymerizable monomers according to the present disclosure are well suitable as reactive diluents for highly viscous curable resins and result in optionally crosslinked polymers having favorable thermomechanical properties for a possible use as orthodontic appliances.

In some embodiments, the crosslinked polymers are characterized by a tensile stress-strain curve that displays a yield point after which the test specimen continues to elongate, but there is no increase in stress. Such yield point behavior typically occurs "near" the glass transition temperature, where the material is between the glassy and rubbery regimes and may be characterized as having viscoelastic behavior. In some embodiments, viscoelastic behavior is observed in the temperature range 20° C. to 40° C. The yield stress is determined at the yield point. In some embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by $\ln(l/l_0)$, which may be approximated by $(l-l_0)/l_0$ at small strains (e.g. less than approximately 10%) and the elongation is $l/l_0$, where l is the gauge length after some deformation has occurred and $l_0$ is the initial gauge length. The mechanical properties can depend on the temperature at which they are measured. The test temperature may be below the expected use temperature for a dental appliance such as 35° C. to 40° C. In embodiments, the test temperature is 23±2° C.

In some embodiments, the stress relaxation can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature of 37±2° C. at 100% relative humidity or a temperature of 37±2° C. in water.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is m$^2$/s. Devices for measuring viscosity include viscometers and rheometers.

As used herein the terms "rigidity" and "stiffness" are used interchangeably, as are the corresponding terms "rigid" and "stiff."

As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The polymerizable monomers according to the present disclosure are suitable as reactive diluents for highly viscous curable resins and result in optionally crosslinked polymers having favorable thermomechanical properties for use as orthodontic appliances, for example, for moving one or more teeth.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof, for example. In some cases, the reinforced composites can comprise a polymer matrix reinforced with ceramic or metallic particles, for example. The appliance can be shaped in many ways, such as with thermoforming or direct fabrication as described herein, for example. Alternatively or in combination, the appliance can be fabricated with machining such as an appliance fabricated from a block of material with computer numeric control machining. Preferably, the appliance is fabricated using a polymerizable monomer according to the present disclosure, for example, using the monomers as reactive diluents for curable resins.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com").

Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
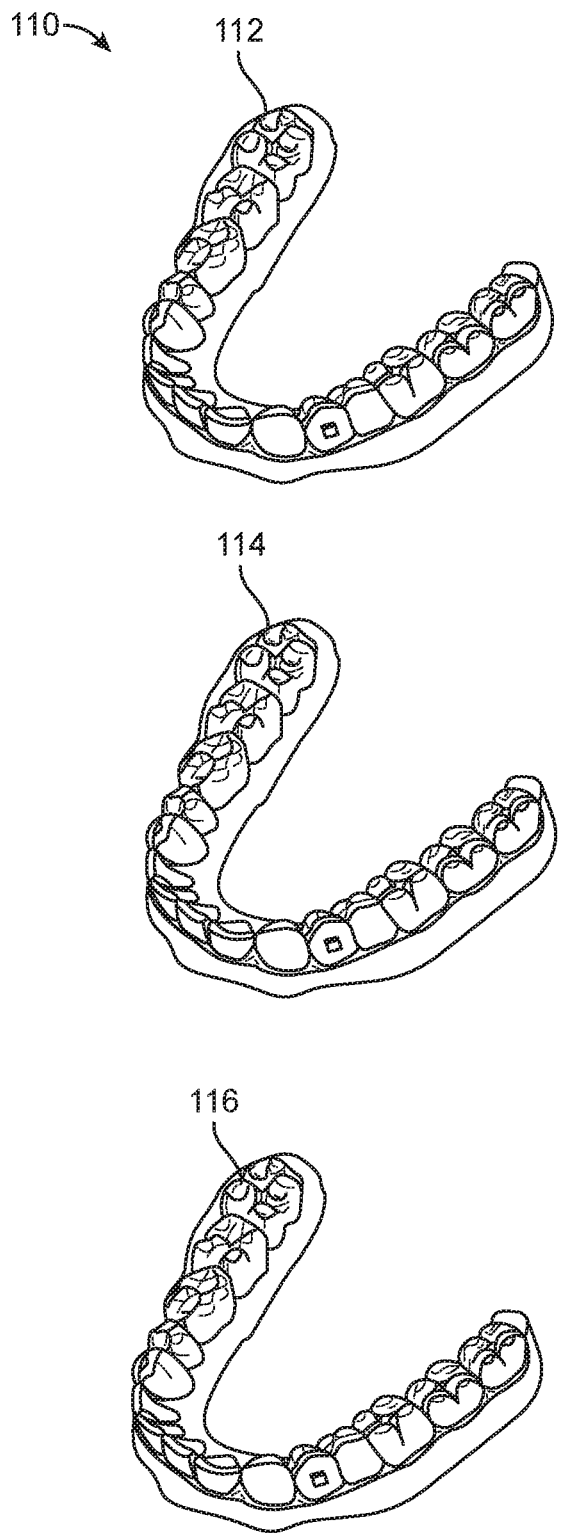
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
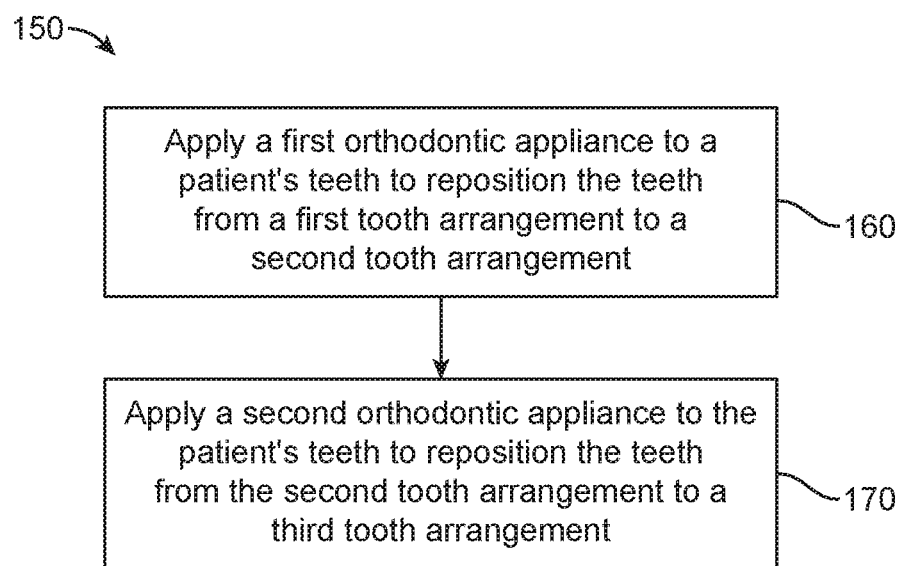
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein buildup the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variability in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
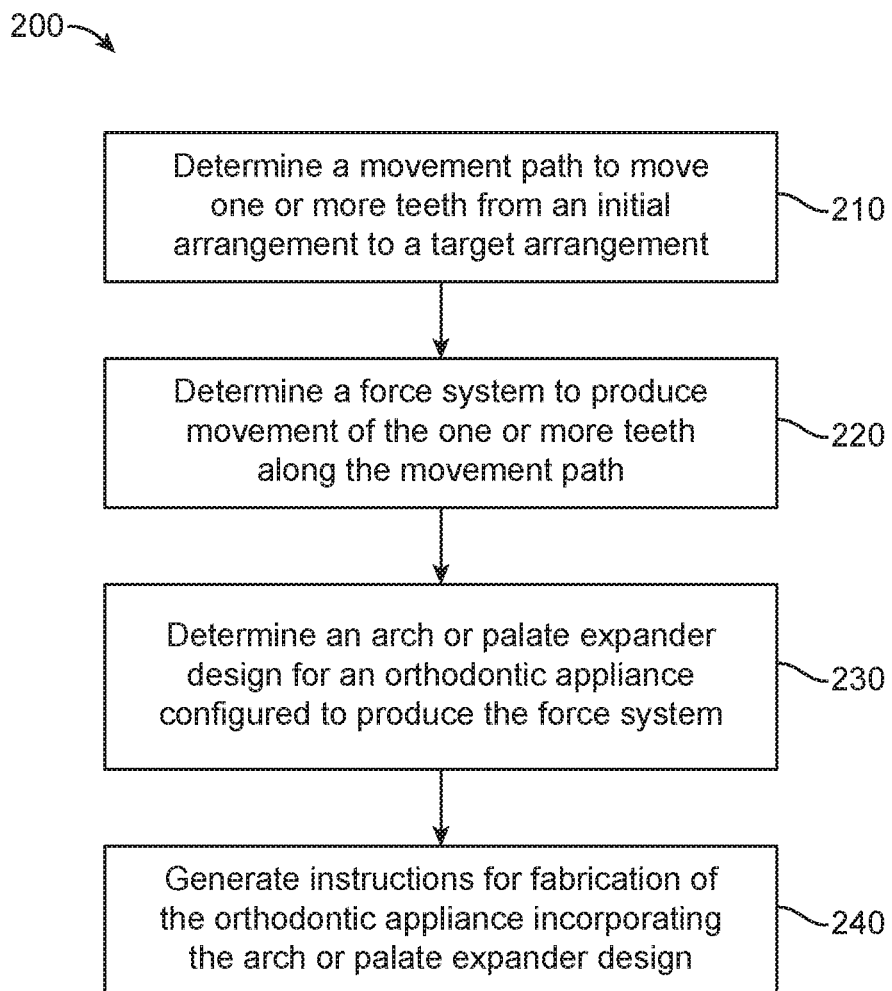
FIG. 2 illustrates a method for designing an orthodontic appliance, in accordance with embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three dimensional data of the palate and upper arch; 2) The three dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
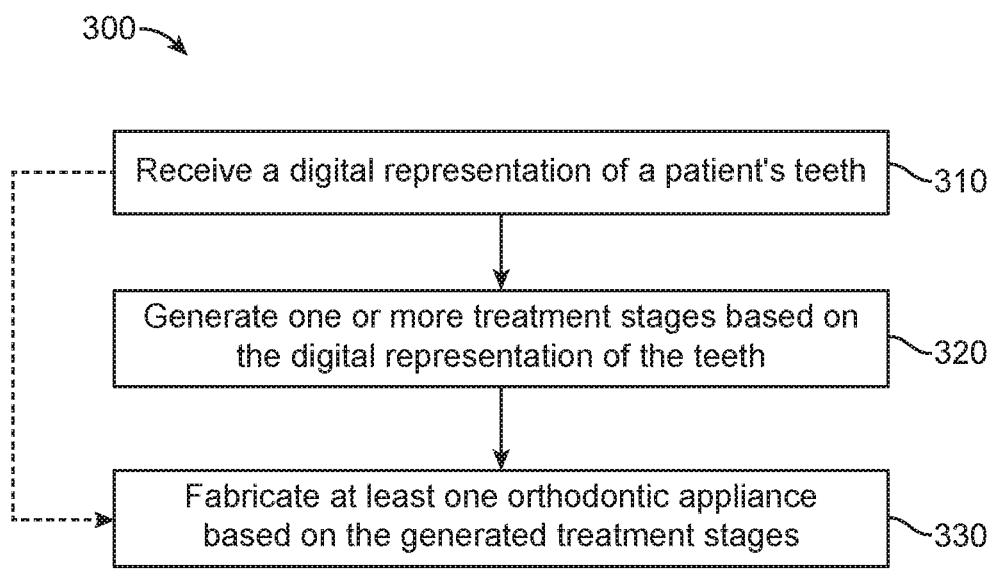
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

EXAMPLES

The following examples are given for the purpose of illustrating various embodiments of the invention and are not meant to limit the present disclosure in any fashion. The present examples, along with the methods described herein are presently representative of some embodiments, are exemplary, and are not intended as limitations on the scope of the invention. Changes therein and other uses which are encompassed within the spirit of the invention as defined by the scope of the claims will occur to those skilled in the art.

All chemicals were purchased from commercial sources and were used without further purification, unless otherwise stated.

$^1$H NMR and $^{13}$C NMR spectra were recorded on a BRUKER AC-E-200 FT-NMR spectrometer or a BRUKER Avance DRX-400 FT-NMR spectrometer. The chemical shifts are reported in ppm (s: singlet, d: doublet, t: triplet, q: quartet, m: multiplet). The solvents used were deuterated chloroform (CDCl$_3$, 99.5% deuteration) and deuterated DMSO (d$_6$-DMSO, 99.8% deuteration).

Reference Example 1: Synthesis of Phenyl 2-(methacryloxy)benzoate (Ref1)

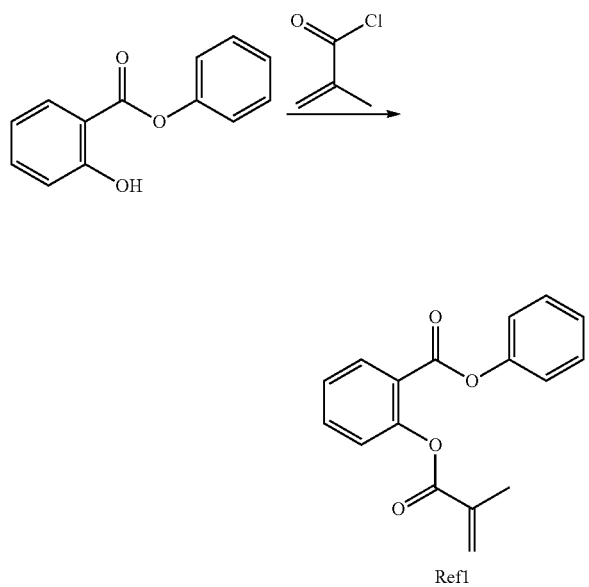

Ref1

4.28 g (20 mmol) of phenyl salicylate and 3.34 g (33 mmol) of triethylamine were dissolved in 50 mL of dry CH$_2$Cl$_2$ in a 100 mL three-necked round-bottomed flask, thoroughly purged with Ar and cooled to −15° C. Meanwhile, 2.30 g (22 mmol) of freshly distilled methacryloyl chloride were dissolved in 20 mL of dry CH$_2$Cl$_2$, also purged with Ar and then added dropwise to the reaction mixture within 1 h without exceeding a temperature of 0° C. When the addition was completed, the reaction mixture was stirred for 1 h at a temperature below 0° C. and then slowly warmed up to room temperature and stirred for 18 h, whereafter a precipitate had formed, which was removed by filtration. The filtrate was washed twice with water, three times with aqueous 10% HCl, and twice with brine. Then the organic layer was dried over Na$_2$SO$_4$, filtered through a silica bed, stabilized with 250 ppm of BHT, and then the solvent was evaporated. The resulting white crystals were recrystallized from diethyl ether to yield 5.10 g (90%) of Ref1. m$_p$: 99-100° C.; $^1$H NMR (200 MHz, CDCl$_3$; δ, ppm): 8.22 (d, 1H; Ar—H), 7.63 (t, 1H; Ar—H), 7.37 (m, 3H; Ar—H), 7.27-7.11 (m, 4H; Ar—H), 6.36 (s, 1H; =C$\underline{H}_2$), 5.70 (m, 1H; =C$\underline{H}_2$), 2.03 (s, 3H; CH$_2$=CH$_2$—C$\underline{H}_3$); APT $^{13}$C NMR (50.3 MHz, CDCl$_3$; δ, ppm): 166.0 (C4), 163.2 (C4), 151.3 (C4), 150.7 (C4), 135.6 (C4), 134.5 (C3), 132.4 (C3), 129.6 (C3), 127.9 (C2), 126.2 (C3), 126.1 (C1), 124.2 (C3), 123.1 (C4), 121.8 (C3), 18.5 (C1).

Reference Example 2: Synthesis of Methyl 2-(methacryloxy)benzoate (Ref2)

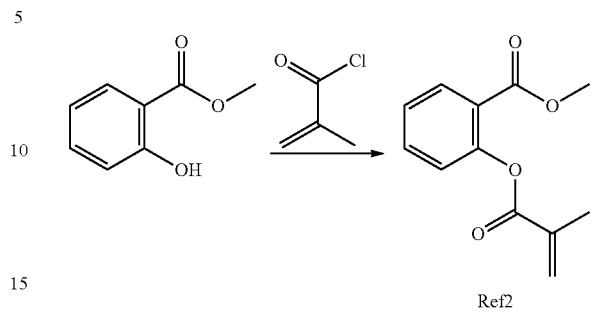

Ref2

The preparation was similar to Reference Example 1 using 3.04 g (20 mmol) of methyl salicylate, except for the purification of the crude product after evaporation of the solvent, which was carried out by silica chromatography (eluent PE:EE=6:1) to yield 3.72 g (84%) of Ref2 as a transparent liquid. $^1$H NMR (200 MHz, CDCl$_3$; δ, ppm): 8.03 (d, 1H; Ar—H), 7.55 (t, 1H; Ar—H), 7.30 (t, 1H; Ar—H), 7.15 (d, 1H; Ar—H), 6.37 (s, 1H; =C$\underline{H}_2$), 5.77 (m, 1H; =C$\underline{H}_2$), 3.82 (s, 3H; COO—CH$_3$), 2.09 (s, 3H; CH$_2$=CH$_2$—C$\underline{H}_3$); APT $^{13}$C NMR (50.3 MHz, CDCl$_3$, δ, ppm): 166.0 (C4), 165.0 (C4), 150.9 (C4), 135.8 (C4), 133.8 (C3), 131.8 (C3), 127.4 (C2), 126.0 (C3), 123.9 (C3), 123.4 (C4), 52.2 (C3), 18.4 (C1).

Reference Example 3: Synthesis of 2-ethylhexyl 2-(methacryloxy)benzoate (Ref3)

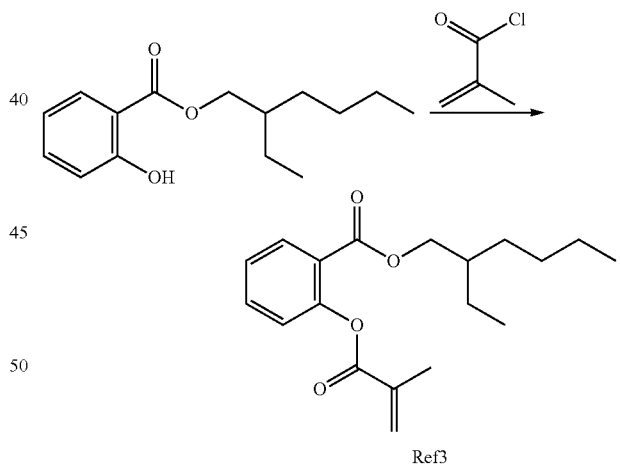

Ref3

The preparation was similar to Reference Example 1 using 5.02 g (20 mmol) of 2-ethylhexyl salicylate, including purification of the crude product after evaporation of the solvent by silica chromatography (eluent PE:EE=6:1) to yield 5.29 g (83%) of Ref3 as a transparent liquid. $^1$H NMR (200 MHz, CDCl$_3$, δ, ppm): 8.01 (d, 1H; Ar—H), 7.50 (t, 1H; Ar—H), 7.28 (t, 1H; Ar—H), 7.11 (d, 1H; Ar—H), 6.37 (d, 1H; =C$\underline{H}_2$), 5.75 (d, 1H; =C$\underline{H}_2$), 4.16 (d, 2H; COO—C$\underline{H}_2$—), 2.07 (s, 3H; CH$_2$=CH$_2$—C$\underline{H}_3$), 1.64 (m, 1H; COO—CH$_2$—C$\underline{H}$—(CH$_2$)$_2$), 1.42-1.25 (m, 8H; —CH$_2$—CH$_3$); APT $^{13}$C NMR (50.3 MHz, CDCl$_3$, δ, ppm): 165.9 (C4), 164.7 (C4, CO), 150.9 (C4, CO), 135.8 (C4), 133.6 (C1), 131.7 (C1), 129. (C4), 127.5 (C2), 125.9 (C1), 123.9 (C1), 67.6 (C2), 38.8 (C3), 30.4 (C2), 29.0 (C2), 23.8 (C2), 23.0 (C3), 14.1 (C1), 11.0 (C1).

Reference Example 4: Isobornyl Methacrylate (Ref4)

As reference example 4, commercially available isobornyl methacrylate (Ref4) was purchased from Sigma Aldrich.

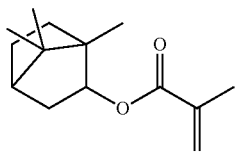

Ref4

Reference Example 5: Benzyl Methacrylate (Ref5)

Reference example 5, benzyl methacrylate (Ref5), was purchased from TCI.

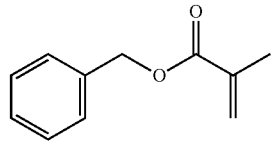

Ref5

Example 1: Synthesis of Cyclopentyl 2-(methacryloxy)benzoate (Cyclopentyl Salicylate Methacrylate) (1)

Step 1: Preparation of Cyclopentyl Salicylate

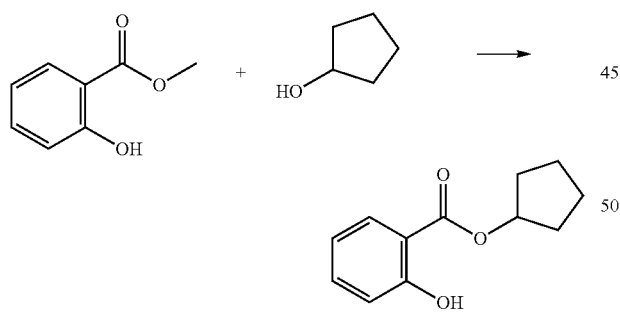

3.45 g (40 mmol) of pentanol and 1.15 g (50 mmol) of sodium metal were heated to 130° C. while stirring until homogeneity of the melt was reached. Then, 4.57 g (30 mmol) of methyl salicylate were added.

Methanol, which was formed as a by-product, was distilled off After complete distillation, the reaction was allowed to cool to room temperature. The resulting amorphous, red-brownish solid was dissolved in $CH_2Cl_2$, and unsoluble components were removed by filtration after 4 h. The solvent was evaporated to give 6.24 g of a red-brownish crude product, which was purified by silica chromatography (eluent PE:EE=6:1), yielding 1.92 g (30%) of cyclopentyl salicylate as a transparent liquid. $^1$H NMR (400 MHz, $CDCl_3$, δ, ppm): 10.92 (s, 1H; Ar—O$\underline{H}$) 7.81 (d, 1H; Ar—H), 7.43 (t, 1H; Ar—H), 6.97 (d, 1H; Ar—H), 6.86 (t, 1H; Ar—H), 5.43 (m, 1H; COO—C$\underline{H}$—), 2.01-1.57 (m, 8H); APT $^{13}$C NMR (100.6 MHz, $CDCl_3$, δ, ppm): 170.1 (C4, CO), 161.8 (C4, CO), 135.5 (C3), 130.0 (C3), 119.1 (C3), 117.6 (C3), 113.1 (C4), 78.5 (C3), 48.7 (C4), 32.8 (C2), 23.9 (C2).

Step 2: Preparation of Cyclopentyl Salicylate Methacrylate (1)

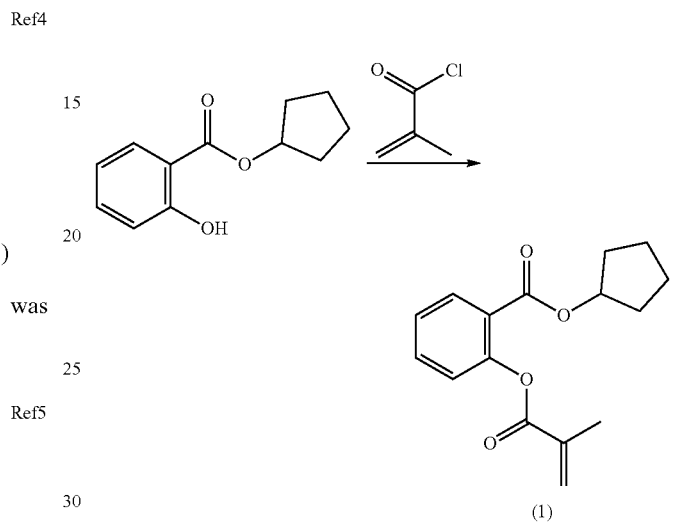

(1)

The preparation was similar to Reference Example 1, using 1.84 g (9 mmol) of cyclopentyl salicylate and purifying the crude product by silica chromatography (eluent PE:EE=6:1), yielding 2.15 g (87%) of the title compound (1) as transparent liquid, which had been stabilized by adding 250 ppm of BHT prior to evaporating the solvents. $^1$H NMR (200 MHz, $CDCl_3$, δ, ppm): 8.00 (d, 1H; Ar—H), 7.53 (t, 1H; Ar—H), 7.29 (t, 1H; Ar—H), 7.12 (d, 1H; Ar—H), 6.39 (s, 1H; =C$\underline{H}_2$), 5.78 (s, 1H; =C$\underline{H}_2$), 5.33 (s, 1H; COO—C$\underline{H}$—), 2.08 (s, 3H; $CH_2$=$CH_2$—C$\underline{H}_3$), 1.94-1.50 (m, 8H).

Example 2: Synthesis of Cyclohexyl 2-(methacryloxy)benzoate (Cyclohexyl Salicylate Methacrylate) (2)

Step 1: Preparation of Cyclohexyl Salicylate

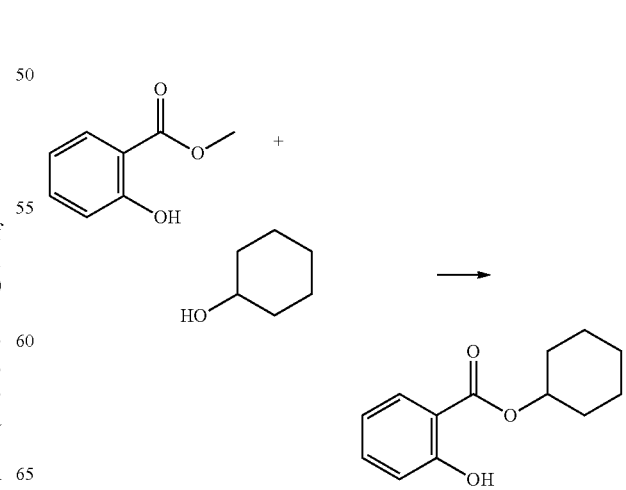

Cyclohexyl salicylate was prepared according to synthesis protocol of Example (1) (step 1) by reacting 4.00 g (40 mmol) of cyclohexanol, 1.15 g (50 mmol) of sodium metal, and 6.85 g (45 mmol) of methyl salicylate The brownish crude product was purified by silica chromatography (eluent PE:EE=6:1), yielding 3.80 g (33%) of cyclohexyl salicylate as a transparent liquid. $^1$H NMR (400 MHz, CDCl$_3$, δ, ppm): 10.94 (s, 1H; Ar—O$\underline{H}$) 7.87 (d, 1H; Ar—H), 7.44 (t, 1H; Ar—H), 6.98 (d, 1H; Ar—H), 6.87 (t, 1H; Ar—H), 5.07 (sept, 1H; COO—C$\underline{H}$—), 1.98-1.93 (m, 2H), 1.84-1.78 (m, 2H), 1.66-1.33 (m, 6H); APT $^{13}$C NMR (100.6 MHz, CDCl$_3$, δ, ppm): 169.8 (C4, CO), 161.8 (C4, CO), 135.6 (C3), 130.0 (C3), 119.1 (C3), 117.6 (C3), 113.2 (C4), 73.9 (C3), 31.6 (C2), 25.5 (C2), 23.7 (C2).

Step 2: Preparation of Cyclohexyl Salicylate Methacrylate (2)

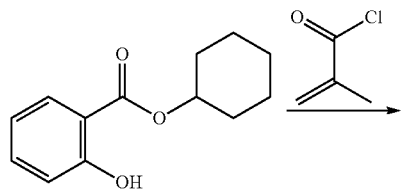

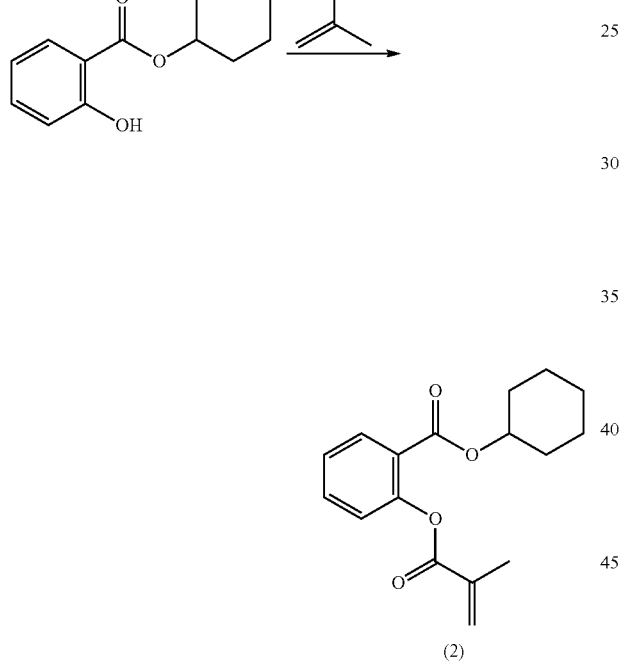

(2)

The preparation was similar to Reference Example 1, using 3.30 g (15 mmol) of cyclohexyl salicylate, 16 mmol of methacryloyl chloride and 22 mmol triethylamine. Purifying of the crude product was performed by silica chromatography (eluent PE:EE=6:1), yielding 3.45 g (80%) of the title compound (2) as transparent liquid, which had been stabilized by adding 250 ppm of BHT prior to evaporating the solvents. $^1$H NMR (400 MHz, CDCl$_3$, δ, ppm): 8.03 (d, 1H; Ar—H), 7.55 (t, 1H; Ar—H), 7.32 (t, 1H; Ar—H), 7.13 (d, 1H; Ar—H), 6.40 (s, 1H; =C$\underline{H_2}$), 5.80 (s, 1H; =C$\underline{H_2}$), 4.95 (sept, 1H; COO—C$\underline{H}$—), 2.10 (s, 3H; CH$_2$=CH$_2$—C$\underline{H_3}$), 1.95-1.91 (m, 2H), 1.78-1.75 (m, 2H), 1.62-1.24 (m, 6H); APT $^{13}$C NMR (100.6 MHz, CDCl$_3$, δ, ppm): 165.9 (C4, CO), 164.2 (C4, CO), 150.7 (C4), 135.9 (C4), 133.5 (C3), 131.9 (C3), 127.7 (C2), 126.0 (C3), 124.5 (C4), 123.8 (C3), 73.7 (C3), 31.7 (C2), 25.5 (C2), 24.0 (C2), 18.5 (C1).

Example 3: Synthesis of 2-isopropyl-5-methylcyclohexyl 2-(methacryloxy)benzoate (Menthyl Salicylate Methacrylate) (3)

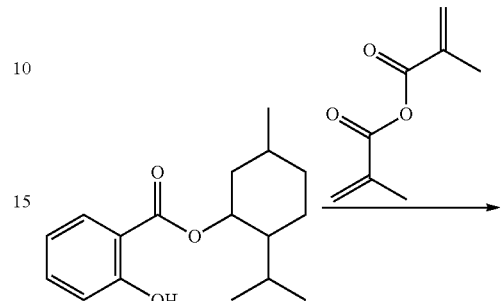

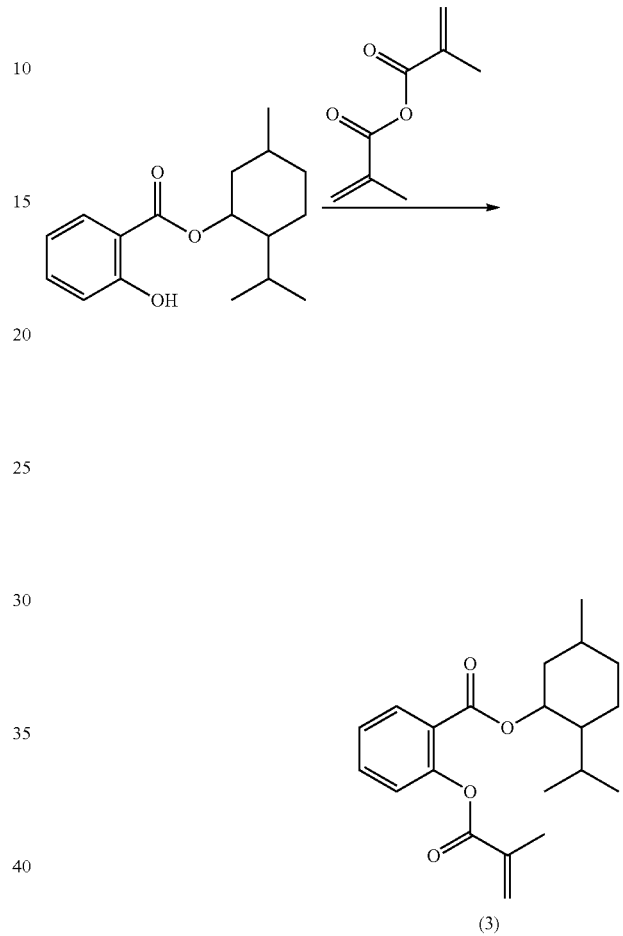

(3)

5.55 g of menthyl salicylate (20 mmol), 5.27 g of methacrylic anhydride (34 mmol) and 0.12 g of dimethylaminopyridine (1 mmol, DMAP) were charged into a 50 mL round-bottomed flask. The flask was purged with Ar, heated to 120° C. (oil bath temperature) and stirred for 24 h. The conversion was monitored by means of TLC. Upon complete conversion, the excess of methacrylic anhydride and by-products were distilled off in vacuo. The crude product was purified by silica chromatography (eluent PE:EE=6:1) to yield 5.67 g (83%) of the title compound (3) as a transparent liquid, which was stabilized using 250 ppm of BHT. $^1$H NMR (200 MHz, CDCl$_3$, δ, ppm): 8.01 (d, 1H; Ar—H), 7.52 (t, 1H; Ar—H), 7.29 (t, 1H; Ar—H), 7.29 (d, 1H; Ar—H), 6.39 (d, 1H; =C$\underline{H_2}$), 5.78 (d, 1H; =C$\underline{H_2}$), 4.87 (q, 1H; COO—C$\underline{H}$—(CH$_2$)$_2$), 2.08 (s, 3H; CH$_2$=CH$_2$—C$\underline{H_3}$), 1.93-1.00 (m, 9H) 0.84 (d, 6H; (CH$_2$)$_2$—CH—(C$\underline{H_3}$)$_2$), 0.75 (d, 3H; (CH$_2$)$_2$—CH—C$\underline{H_3}$); APT $^{13}$C NMR (50.3 MHz, CDCl$_3$, δ, ppm): 165.7 (C4, CO), 164.2 (C4, CO), 150.6 (C4), 135.7 (C4), 133.4 (C3), 131.7 (C3), 128.9 (C4), 127.4 (C2), 125.9 (C3), 123.8 (C3), 74.9 (C3), 47.1 (C3), 40.8 (C2), 34.3 (C2), 31.4 (C3), 26.1 (C3), 23.3 (C2), 22.0 (C1), 20.8 (C1), 18.4 (C1), 16.1 (C1).

Example 4: Synthesis of 2-isopropyl-5-methylcyclohexyl 3-(methacryloyloxy)benzoate (menthyl 3-(methacryloxy)benzoate) (4)

Step 1: Preparation of 3-(methacryloxy)benzoic Acid

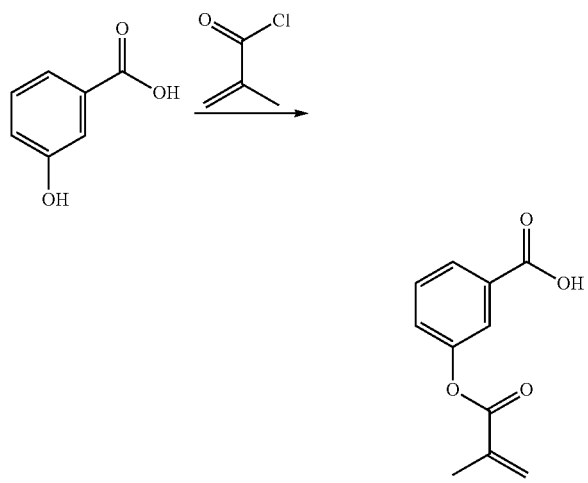

First, an alkaline solution of 2.40 g (60 mmol) of sodium hydroxide in 50 mL deionized water was prepared, wherein 4.15 g (30 mmol) of benzoic acid were dissolved. To this solution, a solution of 3.46 g (33 mmol) of freshly distilled methacryloyl chloride in 20 mL of dry dioxane was added dropwise under vigorous stirring within 30 min. After complete addition, the reaction was stirred at room temperature for 5 h and acidified with hydrochloric acid (10%), whereupon a white solid precipitated, which was filtered off, washed with hydrochloric acid (10%, 1×50 mL) and warm deionized water (3×50 mL) and finally recrystallized from ethanol to yield 4.21 g (68%) of the title compound as a white solid. $^1$H NMR (400 MHz, DMSO-$d_6$, δ, ppm): 13.00 (s, 1H; —COOH), 7.98 (d, 1H; Ar—H), 7.77 (t, 1H; Ar—H), 7.46 (t, 1H; Ar—H), 7.28 (m, 1H; Ar—H), 6.38 (s, 1H; =C$\underline{H}_2$), 5.77 (t, 1H; =C$\underline{H}_2$), 2.07 (s, 3H; CH$_2$=CH$_2$—C$\underline{H}_3$); APT $^{13}$C NMR (100.6 MHz, CDCl$_3$, δ, ppm): 166.5 (C4, CO), 165.2 (C4, CO), 150.6 (C4), 135.1 (C4), 132.4 (C3), 129.9 (C3), 128.0 (C2), 126.7 (C3), 126.4 (C4), 122.6 (C3), 18.0 (C1).

Step 2: Preparation of Menthyl 3-(methacryloxy)benzoate (4)

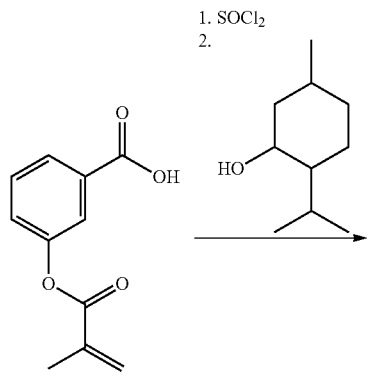

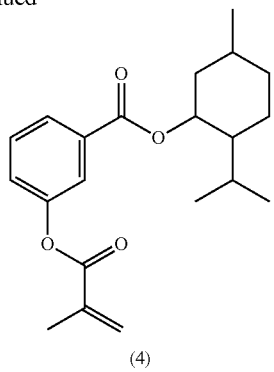

(4)

3-(Methacryloxy)benzoic acid (2.49 g, 12 mmol) was dissolved in 20 mL thionyl chloride and one drop of DMF was added. This solution was refluxed for 3 h, whereafter the excess of thionyl chloride was distilled off. Thus obtained 3-(methacryloxy)benzoyl chloride was dissolved in dry dichloromethane (20 mL) and added dropwise to a solution of 3,3,5-trimethylcyclohexanol (3.13 g, 20 mmol) and pyridine (3.2 g, 40 mmol) in 50 mL of dry dichloromethane at 0° C. After addition, the reaction was warmed up to room temperature and stirred overnight. A white precipitate having formed was filtered off, and the filtrate was washed with hydrochloric acid (10%, 3×30 mL), deionized water (1×30 mL) and brine (2×30 mL). The organic layer was dried over Na$_2$SO$_4$, filtered, and concentrated to dryness. The crude product was purified by column chromatography (SiO$_2$, PE:EE=6:1) to yield 2.02 g (49%) of (4) as a transparent liquid. $^1$H NMR (400 MHz, CDCl$_3$, δ, ppm): 7.95 (d, 1H; Ar—H), 7.77 (t, 1H; Ar—H), 7.46 (t, 1H; Ar—H), 7.30 (m, 1H; Ar—H), 6.37 (s, 1H; =C$\underline{H}_2$), 6.58 (t, 1H; =C$\underline{H}_2$), 4.96 (m, 1H; COO—C$\underline{H}$—), 2.06 (s, 3H; CH$_2$=CH$_2$—C$\underline{H}_3$), 2.00-0.77 (m, 18H); APT $^{13}$C NMR (100.6 MHz, CDCl$_3$, δ, ppm): 165.7 (C4, CO), 165.2 (C4, CO), 151.0 (C4), 135.7 (C4), 132.5 (C4), 129.4 (C3), 127.7 (C2), 127.0 (C3), 126.3 (C3), 122.9 (C3), 75.2 (C3), 47.3 (C3), 41.1 (C2), 34.4 (C2), 31.5 (C3), 26.5 (C3), 23.6 (C2), 22.1 (C1), 20.9 (C1), 18.4 (C1), 16.6 (C1).

Example 5: Synthesis of 2-isopropyl-5-methylcyclohexyl 4-(methacryloyloxy)benzoate (Menthyl 4-(methacryloxy)benzoate) (5)

Step 1: Preparation of 4-(methacryloxy)benzoic Acid

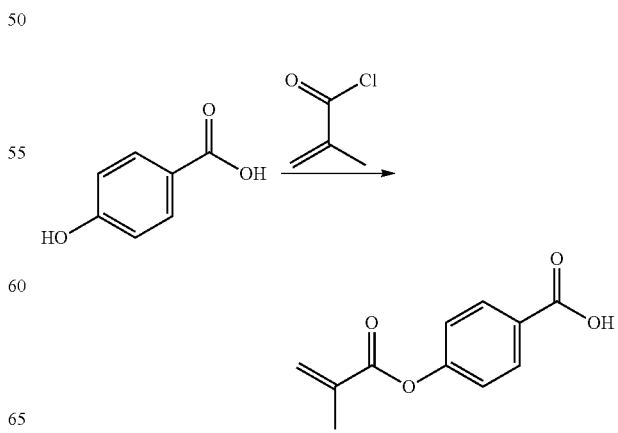

The preparation was similar to Example 4 (step 1), using 4.14 g (30 mmol) of 4-hydroxybenzoic acid and purifying the crude product by recrystallization from ethanol, yielding 4.01 g (65%) of the title compound as a white solid. $^1$H NMR (400 MHz, DMSO-$d_6$, δ, ppm): 13.04 (s, 1H; —COOH), 8.03 (d, 2H; Ar—H), 7.33 (d, 2H; Ar—H), 6.30 (s, 1H; =C$\underline{H}_2$), 5.93 (t, 1H; =C$\underline{H}_2$), 2.10 (s, 3H; CH$_2$=CH$_2$—C$\underline{H}_3$); APT $^{13}$C NMR (100.6 MHz, DMSO-$d_6$, δ, ppm): 166.6 (C4, CO), 164.9 (C4, CO), 154.1 (C4), 135.7 (C4), 130.9 (C3), 128.4 (C2), 128.2 (C4), 122.0 (C3), 18.0 (C1).

Step 2: Preparation of Homomenthyl 4-(methacryloxy)benzoate (5)

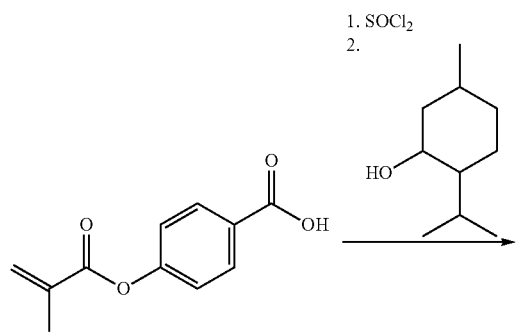

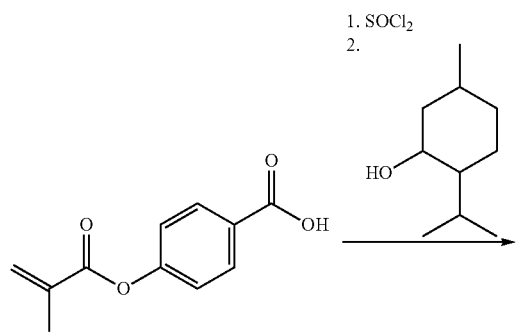

(5)

The preparation was similar to Example 4 (step 2), using 2.51 g (12 mmol) of 4-(methacryloxy)benzoic acid and purifying the crude product by column chromatography (SiO$_2$, PE:EE=6:1), yielding 2.71 g (66%) of (5) as a colorless transparent liquid. $^1$H NMR (400 MHz, CDCl$_3$, δ, ppm): 8.12 (d, 2H; Ar—H), 7.22 (d, 2H; Ar—H), 6.37 (s, 1H; =C$\underline{H}_2$), 5.79 (t, 1H; =C$\underline{H}_2$), 4.95 (m, 1H; COO—C$\underline{H}$—), 2.07 (s, 3H; CH$_2$=CH$_2$—C$\underline{H}_3$), 2.00-0.78 (m, 18H); APT $^{13}$C NMR (100.6 MHz, CDCl$_3$, δ, ppm): 165.4 (C4, 2×CO*), 154.5 (C4), 135.7 (C4), 131.2 (C3), 128.4 (C2), 127.8 (C4), 121.7 (C3), 75.1 (C3), 47.4 (C3), 41.1 (C2), 34.4 (C2), 31.5 (C3), 26.6 (C3), 23.7 (C2), 22.1 (C1), 20.9 (C1), 18.4 (C1), 16.6 (C1). (*Overlapping of the 2 CO peaks was confirmed by means of HMQC NMR.).

Example 6: Synthesis of 3,3,5-trimethylcyclohexyl 2-(methacryloxy)benzoate (Homomenthyl Salicylate Methacrylate) (6)

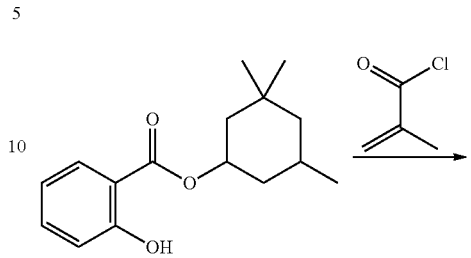

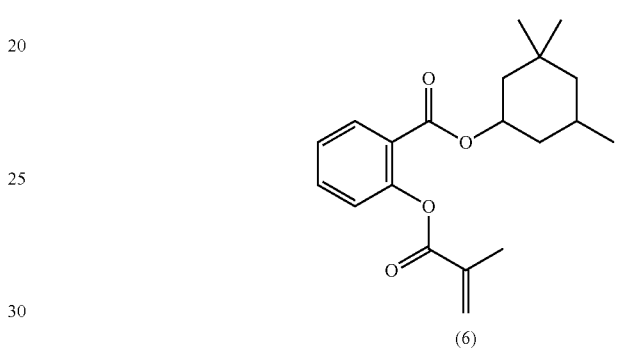

(6)

The preparation was similar to Reference Example 1, using 7.89 g (30 mmol) of homomenthyl salicylate (3,3,5-trimethylcyclohexyl salicylate; mixture of cis and trans isomers) and purifying the crude product by silica chromatography (eluent PE:EE=6:1) to yield 8.00 g (81%) of the title compound (6) as a transparent liquid which was stabilized using 250 ppm of BHT. $^1$H NMR (400 MHz, CDCl$_3$, δ, ppm): 8.00 (d, 1H; Ar—H), 7.54 (t, 1H; Ar—H), 7.30 (t, 1H; Ar—H), 7.10 (d, 1H; Ar—H), 6.40 (d, 1H; =C$\underline{H}_2$), 5.80 (d, 1H; =C$\underline{H}_2$), 5.30-5.05 (m, 1H; COO—C$\underline{H}$—(CH$_2$)$_2$), 2.10 (s, 3H; CH$_2$=CH$_2$—C$\underline{H}_3$), 1.76-1.00 (m, 7H) 0.96 (d, 6H; (CH$_2$)$_2$—CH—(C$\underline{H}_3$)$_2$), 0.90 (d, 3H; (CH$_2$)$_2$—CH—C$\underline{H}_3$); APT $^{13}$C NMR (100.6 MHz, CDCl$_3$, δ, ppm): 165.7 (C4, CO), 164.3 (C4, CO), 150.6 (C4), 135.8 (C4), 133.4 (C3), 131.9 (C3), 127.6 (C2), 125.9 (C3), 124.5 (C4), 123.8 (C3), 72.0 (C3), 47.6 (C2), 43.9 (C2), 40.4 (C2), 33.1 (C3), 32.3 (C4), 27.1 (C3), 22.3 (C1), 18.5 (C1).

Example 7: Synthesis of 3,3,5-trimethylcyclohexyl 2-(acryloxy)benzoate (Homomenthyl Salicylate Acrylate) (7)

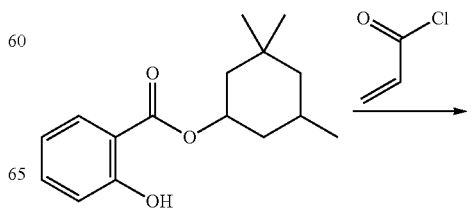

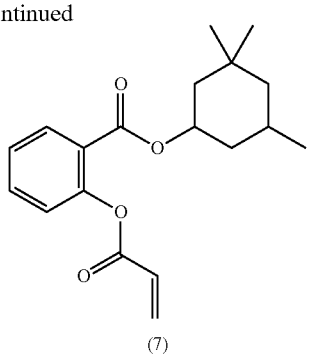

(7)

The preparation was similar to Reference Example 1, using 5.25 g (30 mmol) of homomenthyl salicylate (3,3,5-trimethylcyclohexyl salicylate; mixture of cis and trans isomers) and 3.09 g (34 mmol) freshly distilled acryloyl chloride and purifying the crude product by silica chromatography (eluent PE:EE=6:1) to yield 3.90 g (62%) of the title compound (7) as a transparent liquid which was stabilized using 250 ppm of BHT. $^1$H NMR (200 MHz, CDCl$_3$, δ, ppm): 8.02 (d, 1H; Ar—H), 7.55 (t, 1H; Ar—H), 7.31 (t, 1H; Ar—H), 7.13 (d, 1H; Ar—H), 6.69 (dd, 1H; =CH$_2$), 6.40 (q, 1H; —CH=CH$_2$), 6.07 (dd, 1H; =CH$_2$), 5.29-5.01 (m, 1H; COO—CH—(CH$_2$)$_2$), 1.76-1.00 (m, 7H) 0.96 (d, 6H; (CH$_2$)$_2$—CH—(CH$_3$)$_2$), 0.90 (d, 3H; (CH$_2$)$_2$—CH—CH$_3$); APT $^{13}$C NMR (50.3 MHz, CDCl$_3$, δ, ppm): 164.6 (C4, CO), 164.3 (C4, CO), 150.2 (C4), 133.6 (C3), 132.8 (C2), 132.0 (C3), 128.1 (C3), 126.2 (C3), 124.5 (C2), 123.8 (C3), 72.2 (C3), 47.7 (C2), 43.1 (C2), 40.5 (C2), 33.2 (C3), 32.4 (C4), 27.2 (C3), 25.7 (C1), 22.4 (C1).

Example 8: Synthesis of decahydronaphthalen-2-yl 2-(methacryloyloxy)benzoate (8)

Step 1: Preparation of decahydronaphthalen-2-yl 2-hydroxybenzoate

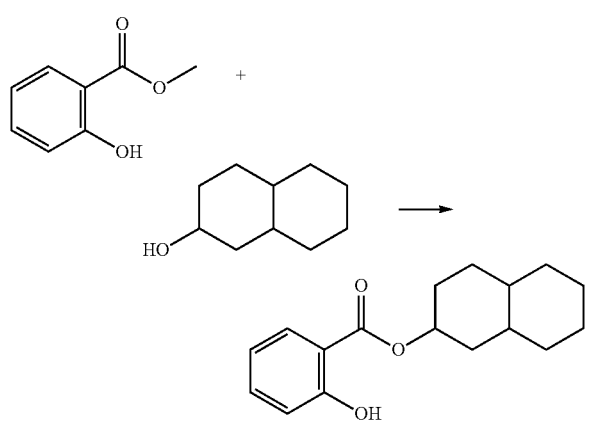

The synthesis was carried out according to example (1) step 1 using 7.40 g (48 mmol) of decahydronaphthalen-2-ol, 1.38 g (60 mmol) of sodium metal, and 7.76 g (51 mmol) of methyl salicylate. The crude product was purified by silica chromatography (eluent PE:EE=6:1), yielding 5.12 g (39%) of (8) as a transparent liquid. $^1$H NMR (400 MHz, CDCl$_3$, δ, ppm): 10.95 (s, 1H; Ar—OH) 7.89 (d, 1H; Ar—H), 7.43 (t, 1H; Ar—H), 6.98 (d, 1H; Ar—H), 6.86 (t, 1H; Ar—H), 5.27-4.96 (m, 1H; COO—CH—), 2.14-0.87 (m, 16H).

Step 2: Preparation of decahydronaphthalen-2-yl 2-(methacryloyloxy)benzoate (8)

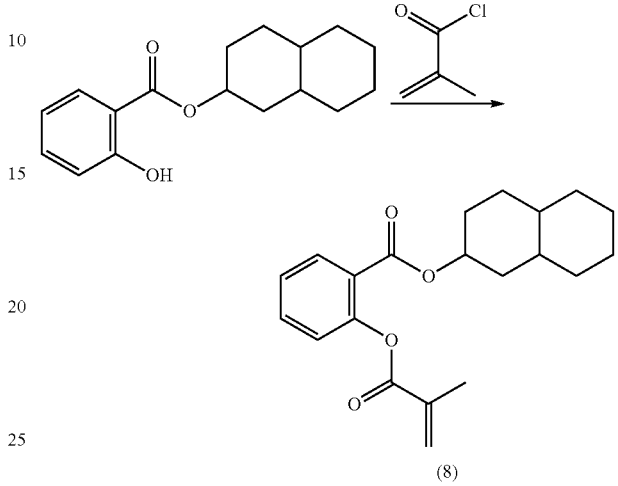

(8)

The preparation was similar to Reference Example 1, using 4.66 g (17 mmol) of decahydronaphthalen-2-yl 2-hydroxybenzoate and purifying the crude product by silica chromatography (eluent PE:EE=6:1), yielding 4.18 g (72%) of the title compound (8) as a transparent viscous liquid, which had been stabilized by adding 250 ppm of BHT prior to evaporating the solvents. H NMR (400 MHz, CDCl$_3$, δ, ppm): 8.02 (d, 1H; Ar—H), 7.53 (t, 1H; Ar—H), 7.30 (t, 1H; Ar—H), 7.11 (d, 1H; Ar—H), 6.39 (s, 1H; =CH$_2$), 5.78 (s, 1H; =CH$_2$), 5.15-4.90 (m, 1H; COO—CH—), 2.09 (s, 3H; CH$_2$=CH$_2$—CH$_3$), 1.97-0.84 (m, 16H).

Example 9: Synthesis of 1,3,3-trimethyl-2-bicyclo[2.2.1]heptanyl 2-(methacryloxy)benzoate (Fenchyl Salicylate Methacrylate) (9)

Step 1: Preparation of Fenchyl Salicylate

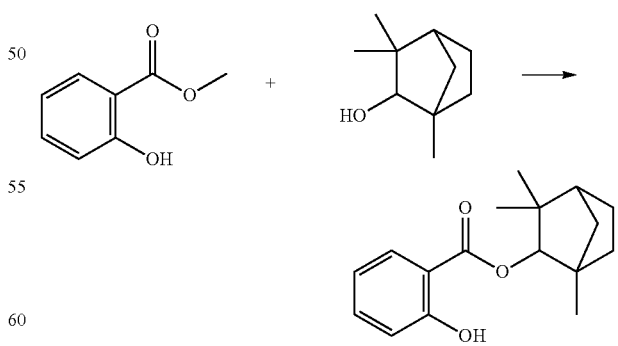

Fenchyl salicylate was prepared according to Example (1) step 1 by reacting 7.05 g (46 mmol) of fenchol, 1.38 g (60 mmol) of sodium metal, and 7.41 g (49 mmol) of methyl salicylate. The red-brownish crude product was purified by silica chromatography (eluent PE:EE=6:1), yielding 3.42 g (27%) of fenchyl salicylate as a slightly brownish liquid. $^1$H NMR (400 MHz, CDCl$_3$, δ, ppm): 10.95 (s, 1H; Ar—O$\underline{H}$) 7.90 (d, 1H; Ar—H), 7.47 (t, 1H; Ar—H), 7.00 (d, 1H; Ar—H), 6.91 (t, 1H; Ar—H), 4.65 (s, 1H; COO—C$\underline{H}$—), 1.94-1.24 (m, 8H) 1.21 (s, 3H; (CH$_2$)$_2$—CH—(C$\underline{H}_3$)$_2$), 1.14 (s, 3H; (CH$_2$)$_2$—CH—(C$\underline{H}_3$)$_2$), 0.87 (s, 3H; (CH$_2$)$_2$—CH—C$\underline{H}_3$); APT $^{13}$C NMR (100.6 MHz, CDCl$_3$, δ, ppm): 170.6 (C4, CO), 161.9 (C4, CO), 135.6 (C3), 129.8 (C3), 119.2 (C3), 117.7 (C3), 112.9 (C4), 87.4 (C3), 48.7 (C4), 48.5 (C3), 41.5 (C2), 40.0 (C4), 29.7 (C1), 27.0 (C2), 26.0 (C2), 20.4 (C1), 19.6 (C1).

Step 2: Preparation of Fenchyl Salicylate Methacrylate (9)

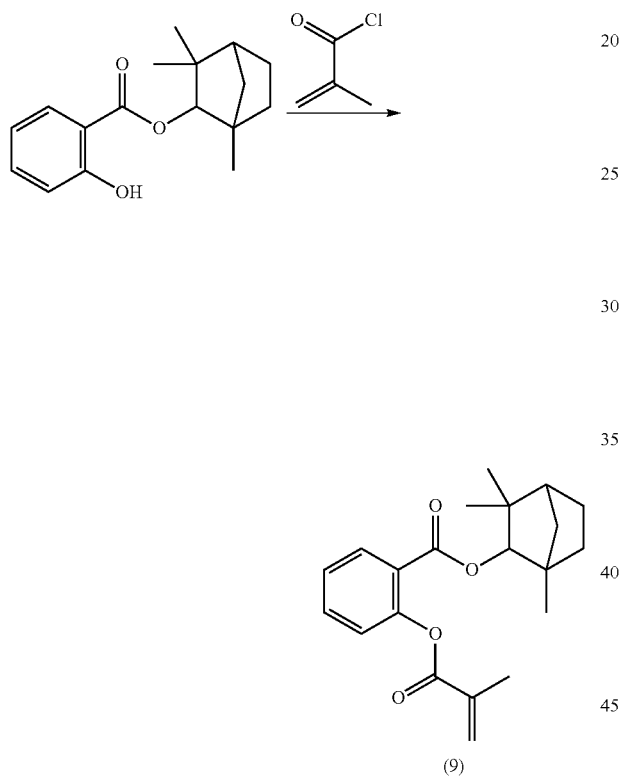

(9)

The preparation was similar to Reference Example 1, using 2.50 g (9 mmol) of fenchyl salicylate and purifying the crude product by silica chromatography (eluent PE:EE=6:1), yielding 2.56 g (83%) of the title compound (9) as a white solid, which had been stabilized by adding 250 ppm of BHT prior to evaporating the solvents. m$_p$: 43-45° C.; $^1$H NMR (400 MHz, CDCl$_3$, δ, ppm): 8.03 (d, 1H; Ar—H), 7.56 (t, 1H; Ar—H), 7.32 (t, 1H; Ar—H), 6.39 (s, 1H; =C$\underline{H}_2$), 5.77 (s, 1H; =C$\underline{H}_2$), 4.60 (s, 1H; COO—C$\underline{H}$—), 2.10 (s, 3H; CH$_2$=CH$_2$—C$\underline{H}_3$), 2.01-1.22 (m, 8$\underline{H}$) 1.16 (s, 3H; (CH$_2$)$_2$—CH—(C$\underline{H}_3$)$_2$), 1.10 (s, 3H; (CH$_2$)$_2$—CH—(C$\underline{H}_3$)$_2$), 0.85 (s, 3H; (CH$_2$)$_2$—CH—C$\underline{H}_3$); APT $^{13}$C NMR (100.6 MHz, CDCl$_3$, δ, ppm): 166.0 (C4, CO), 164.7 (C4, CO), 151.0 (C4), 135.9 (C4), 133.4 (C3), 131.3 (C3), 127.5 (C2), 125.9 (C3), 124.3 (C4), 123.9 (C3), 86.8 (C3), 48.6 (C4), 48.5 (C3), 41.6 (C2), 39.8 (C4), 29.8 (C1), 26.9 (C2), 26.0 (C2), 20.4 (C1), 19.5 (C1), 18.5 (C1).

Example 10: Synthesis of 1,7,7-trimethyl-2-bicyclo [2.2.1]heptanyl 2-(methacryloxy)benzoate ((Iso) Bornyl Salicylate Methacrylate) (10)

Step 1: Preparation of (Iso)Bornyl Salicylate

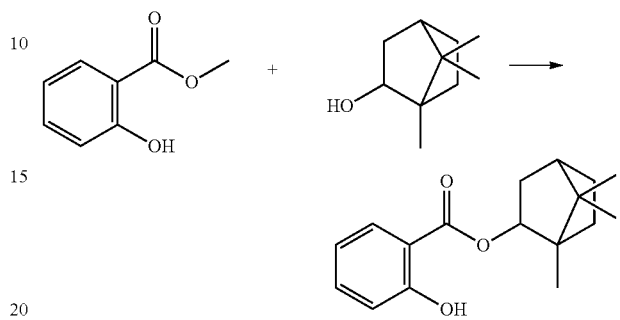

(Iso)bornyl salicylate was reacted according to synthesis protocol of Example 1 (step 1) reacting 6.64 g (44 mmol) of methyl salicylate, 5.93 g (39 mmol) (iso)borneol, and 1.05 g (46 mmol) of sodium metal. The crude product was purified by silica chromatography (eluent PE:EE=6:1), yielding 3.18 g (30%) of (iso)bornyl salicylate. $^1$H NMR (400 MHz, CDCl$_3$, δ, ppm): 10.96 (s, 1H; Ar—O$\underline{H}$) 7.78 (d, 1H; Ar—H), 7.45 (t, 1H; Ar—H), 6.98 (d, 1H; Ar—H), 6.88 (t, 1H; Ar—H), 4.95 (s, 1H; COO—C$\underline{H}$—), 2.10 (s, 3H; CH$_2$=CH$_2$—C$\underline{H}_3$), 1.76-1.00 (m, 7$\underline{H}$), 1.13 (s, 3H; C—C$\underline{H}_3$), 0.96 (s, 3H; (CH$_2$)$_2$—CH—(C$\underline{H}_3$)$_2$), 0.91 (s, 3H; C—C$\underline{H}_3$); APT $^{13}$C NMR (50.3 MHz, CDCl$_3$, δ, ppm): 169.8 (C4, CO), 161.9 (C4, CO), 135.5 (C3), 129.7 (C3), 119.2 (C3), 117.7 (C3), 113.1 (C4), 82.3 (C3), 49.2 (C4), 47.1 (C4), 45.2 (C3), 38.9 (C2), 33.8 (C2), 27.1 (C2), 20.2 (C1), 20.1 (C1), 11.7 (C1).

Step 2: Preparation of (Iso)Bornyl Salicylate Methacrylate (10)

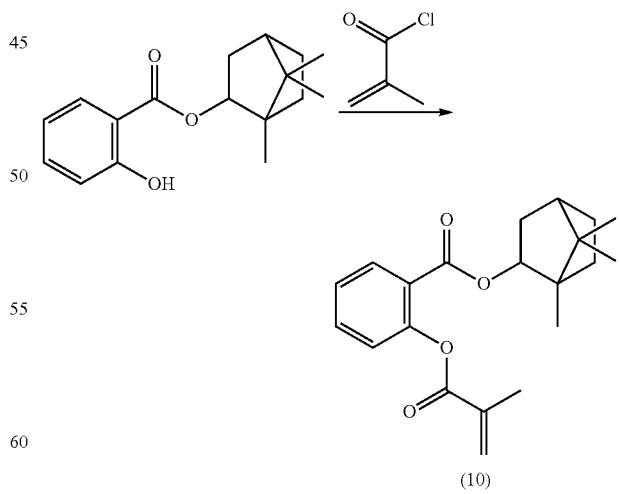

(10)

The preparation was similar to Reference Example 1, using 3.29 g (12 mmol) of (iso)bornyl salicylate and purifying the crude product by silica chromatography (eluent PE:EE=6:1), yielding 3.22 g (78%) of the title compound

(10) as a white solid, which had been stabilized by adding 250 ppm of BHT prior to evaporating the solvents. $m_p$: 78-80° C.; $^1$H NMR (400 MHz, CDCl$_3$, δ, ppm): 7.95 (d, 1H; Ar—H), 7.55 (t, 1H; Ar—H), 7.30 (t, 1H; Ar—H), 7.14 (d, 1H; Ar—H), 6.39 (s, 1H; =CH$_2$), 6.78 (t, 1H; =CH$_2$), 4.87 (s, 1H; COO—CH—), 2.10 (s, 3H; CH$_2$=CH$_2$—CH$_3$), 1.88-1.09 (m, 8H) 1.07 (s, 3H; C—CH$_3$), 0.91 (s, 3H; (CH$_2$)$_2$—CH—(CH$_3$)$_2$), 0.87 (s, 3H; C—CH$_3$); APT $^{13}$C NMR (100.6 MHz, CDCl$_3$, δ, ppm): 166.0 (C4, CO), 163.7 (C4, CO), 151.2 (C4), 135.9 (C4), 133.5 (C3), 131.3 (C3), 127.6 (C2), 126.0 (C3), 124.2 (C4), 124.0 (C3), 81.6 (C3), 49.2 (C4), 47.2 (C4), 45.2 (C3), 38.9 (C2), 33.9 (C2), 27.2 (C2), 20.2 (C1), 18.6 (C1), 11.7 (C1).

Example 11: Synthesis of bicyclo[2.2.1]heptan-2-ylmethyl 2-(methacryloyloxy)benzoate (11)

Step 1: Preparation of bicyclo[2.2.1]heptan-2-ylmethyl 2-hydroxybenzoate

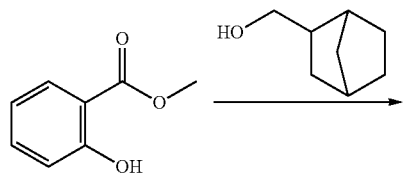

5.68 g (45 mmol) norbornane-2-methanol and 1.38 g (60 mmol) sodium were heated in substance under stirring to 130° C. until everything was molten. Then, 7.60 g (50 mmol) methyl salicylate was added to the reaction. After some time, methanol was formed as a by-product, which was distilled off After the distillation was finished, the reaction was cooled down to room temperature. The amorphous red-brownish solid was then dissolved in CH$_2$Cl$_2$ for 2 h and undissolved residues were filtrated. The solvent was evaporated to give 7.21 g of a red brownish crude product. Finally, the product was cleaned by column chromatography (PE:EE=6:1) yielding 3.01 g (27%) of the colorless product. $^1$H NMR (400 MHz, CDCl$_3$, δ, ppm): 10.84 (s, 1H; Ar—OH), 7.85 (t, 1H; Ar—H), 7.44 (t, 1H; Ar—H), 6.99 (d, 1H; Ar—H), 6.87 (t, 1H; Ar—H), 4.39 (q, 1H; —COO—CH$_2$—), 4.22 (t, 1H; —COO—CH$_2$—), 2.33-1.11 (m, 11H; cycloaliphate). APT $^{13}$C NMR (100.6 MHz, CDCl$_3$, δ, ppm): 170.3 (C4, CO), 161.8 (C4, CO), 135.7 (C3), 130.0 (C3), 119.2 (C3), 117.7 (C3), 112.8 (C4), 122.0 (C3), 67.3 (C2), 39.8 (C2), 38.8 (C3), 38.4 (C3), 36.8 (C3), 33.6 (C2), 30.0 (C2), 22.8 (C2).

Step 2: Preparation of bicyclo[2.2.1]heptan-2-ylmethyl 2-(methacryloyloxy)benzoate (11)

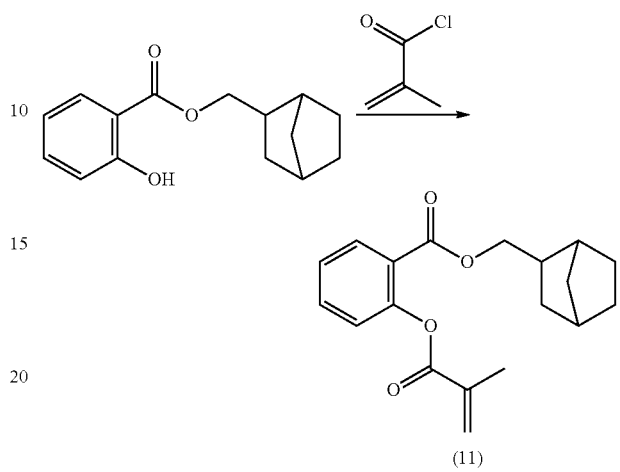

The preparation was similar to Reference Example 1, using 2.51 g (10 mmol) of bicyclo[2.2.1]heptan-2-ylmethyl 2-hydroxybenzoate and 1.14 g (11 mmol) of methacryloyl chloride in 30 mL dry dichloromethane as well as 1.52 g (15 mmol) of trimethylamine. The purification of the crude product was carried out by column chromatography (SiO$_2$, PE:EE=6:1), yielding 2.71 g (86%) of (11) as a colorless transparent liquid and was stabilized with 250 ppm MEHQ. $^1$H NMR (400 MHz, CDCl$_3$, δ, ppm): 8.01 (t, 1H; Ar—H) 7.54 (t, 1H; Ar—H), 7.30 (t, 1H; Ar—H), 7.12 (d, 1H; Ar—H), 6.38 (s, 1H; =CH$_2$), 5.77 (t, 1H; =CH$_2$), 4.28 (q, 1H; —COO—CH$_2$—), 4.12 (t, 1H; —COO—CH$_2$—), 2.08 (s, 3H; COO—CH$_2$—Ar), 2.08 (s, 3H; CH$_2$=CH$_2$—CH$_3$), 2.26-1.09 (m, 11H; cycloaliphate); APT $^{13}$C NMR (100.6 MHz, CDCl$_3$, δ, ppm): 165.9 (C4, CO), 164.7 (C4, CO), 150.9 (C4), 135.7 (C4), 133.7 (C3), 131.9 (C3), 129.1 (C4), 127.6 (C4), 126.0 (C3), 123.9 (C3), 67.2 (C2), 39.8 (C2), 38.8 (C3), 38.4 (C3), 36.8 (C3), 33.7 (C2), 29.9 (C2), 22.7 (C2), 18.5 (C1).

Example 12: Synthesis of 2-cyclohexylethyl 2-(methacryloyloxy)benzoate (12)

Step 1: Preparation of 2-cyclohexylethyl 2-hydroxybenzoate

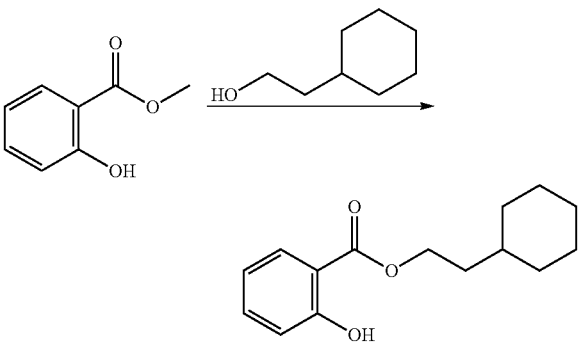

Title compound (12) was synthesized according to Example 1 (step 1) by reacting 5.77 g (45 mmol) cyclohexyl-2-ethanol, 1.38 g (60 mmol) sodium, and 7.59 g (50 mmol) methyl salicylate. The crude product was cleaned by column chromatography (PE:EE=6:1) yielding 3.01 g (27%) of the colorless liquid product. $^1$H NMR (400 MHz, CDCl$_3$, δ, ppm): 10.86 (s, 1H; Ar—O$\underline{H}$), 7.85 (t, 1H; Ar—H), 7.44 (t, 1H; Ar—H), 6.99 (d, 1H; Ar—H), 6.88 (t, 1H; Ar—H), 4.38 (t, 2H; —COO—C$\underline{H}_2$—), 1.78-1.67 (m, 7H), 1.48-0.95 (m, 6H); APT $^{13}$C NMR (100.6 MHz, CDCl$_3$, δ, ppm): 170.3 (C4, CO), 161.8 (C4, CO), 135.6 (C3), 130.0 (C3), 119.2 (C3), 117.7 (C3), 112.8 (C4), 63.8 (C2), 36.0 (C2), 34.8 (C1), 33.3 (C2), 26.6 (C2), 26.3 (C2).

Step 2: Preparation of 2-cyclohexylethyl 2-(methacryloyloxy)benzoate (12)

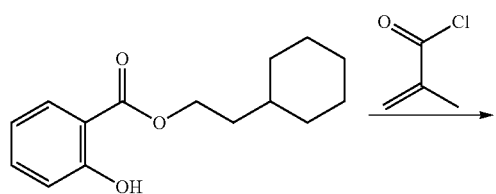

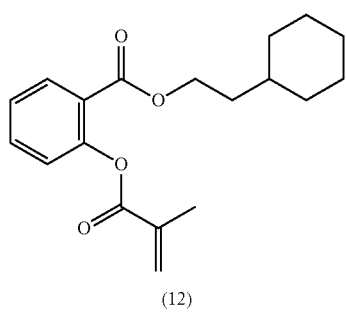

(12)

The preparation was similar to Reference Example 1, using 2.51 g (10 mmol) of cyclohexylethanol salicylate and 1.14 g (11 mmol) of methacryloyl chloride in 30 mL dry dichloromethane as well as 1.52 g (15 mmol) of trimethylamine. The purification of the crude product was carried out by column chromatography (SiO$_2$, PE:EE=6:1), yielding 2.71 g (86%) of (12) as a colorless transparent liquid that was stabilized with 250 ppm MEHQ. $^1$H NMR (400 MHz, CDCl$_3$, δ, ppm): 8.03 (t, 1H; Ar—H) 7.54 (t, 1H; Ar—H), 7.31 (t, 1H; Ar—H), 7.13 (d, 1H; Ar—H), 6.38 (s, 1H; =C$\underline{H}_2$), 5.77 (t, 1H; =C$\underline{H}_2$), 4.27 (t, 1H; —COO—C$\underline{H}_2$—), 2.08 (s, 3H; CH$_2$=$\overline{C}$H$_2$—C$\underline{H}_3$), 1.76-1.55 (m, 7H), 1.41-0.88 (m, 6H); APT $^{13}$C NMR (100.6 MHz, CDCl$_3$, δ, ppm): 165.9 (C4, CO), 164.8 (C4, CO), 150.8 (C4), 135.8 (C4), 133.6 (C3), 131.9 (C3), 129.0 (C4), 127.5 (C4), 126.0 (C3), 123.9 (C3), 63.5 (C2), 36.0 (C2), 34.5 (C3), 33.2 (C2), 26.5 (C2), 26.2 (C2), 18.5 (C1).

Example 13: Synthesis of Benzyl 2-(methacryloxy)benzoate (Benzyl Salicylate Methacrylate) (13)

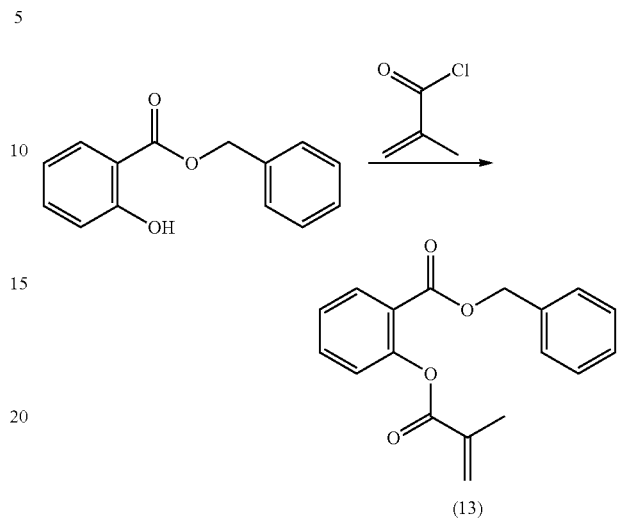

The preparation was similar to Reference Example 1 using 5.55 g of benzyl salicylate (20 mmol), 5.27 g of methacryloyl chloride (34 mmol) and 0.12 g of trimethylamine (1 mmol) in dry dichloromethane under argon protection. The crude product was purified by silica chromatography (eluent PE:EE=6:1) to yield 5.67 g (83%) of the title compound (13) as a transparent liquid, which was stabilized using 250 ppm of BHT. $^1$H NMR (200 MHz, CDCl$_3$, δ, ppm): 8.12 (dd, 2H; Ar—H), 7.58 (td, 2H; Ar—H), 7.42-7.29 (m, 6H; Ar—H), 7.17 (dd, 1H; Ar—H), 6.31 (s, 1H; =C$\underline{H}_2$), 5.68 (t, 1H; =C$\underline{H}_2$), 5.30 (s, 2H; COO—C$\underline{H}_2$—Ar), 2.00 (s, 3H; CH$_2$=$\overline{C}$H$_2$—C$\underline{H}_3$). APT $^{13}$C NMR (50.3 MHz, CDCl$_3$, δ, ppm): 165.9 (C4, CO), 164.5 (C4, CO), 150.9 (C4), 135.7 (C4), 135.6 (C4), 133.9 (C3), 132.0 (C3), 128.6 (C3), 128.5 (C3), 128.4 (C3), 127.6 (C2), 126.0 (C3), 124.0 (C3), 123.6 (C4), 67.1 (C2), 18.3 (C1).

Example 14: Synthesis of Benzyl 4-(methacryloxy)benzoate (14)

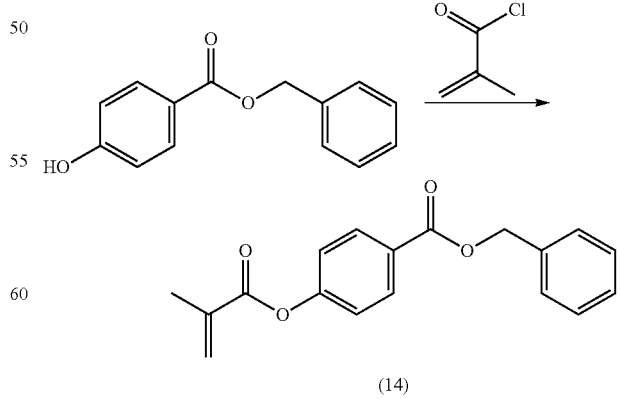

Compound (14) was synthesized by reacting 4.57 g (20 mmol) of benzyl 4-hydroxybenzoate and 2.30 g (22 mmol)

of methacryloyl chloride in dry dichloromethane using a slight surplus of trimethylamine as acid scavenger. The crude product was purified by silica chromatography (eluent PE:EE=6:1), yielding 5.15 g (87%) of benzyl 4-(methacryloxy)benzoate (14) as a transparent liquid that was stabilized with 250 ppm of MEHQ. $^1$H NMR (400 MHz, CDCl$_3$, δ, ppm): 8.18 (d, 2H; Ar—H) 7.50-7.38 (m, 5H; Ar—H), 7.25 (d, 2H; Ar—H), 6.40 (s, 1H; =CH$_2$), 5.80 (t, 1H; =CH$_2$), 5.41 (s, 2H; COO—CH$_2$—Ar), 2.10 (s, 3H; CH$_2$=CH$_2$—CH$_3$). APT $^{13}$C NMR (100.6 MHz, CDCl$_3$, δ, ppm): 165.6 (C4, CO), 165.2 (C4, CO), 154.7 (C4), 136.0 (C4), 135.6 (C4), 131.3 (C3), 128.6 (C3), 128.3 (C3), 128.2 (C3), 127.9 (C2), 127.6 (C4), 121.7 (C3), 66.8 (C2), 18.3 (C1).

Example 15: Synthesis of Isopropylbenzyl 3-(methacryloxy)benzoate (15)

Step 1: Preparation of 3-(methacryloxy)benzoic Acid

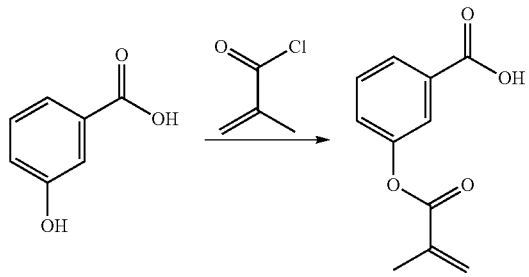

The synthesis was carried out according to Example 4, Step 1.

Step 2: Preparation of Isopropylbenzyl 3-(methacryloxy)benzoate (15)

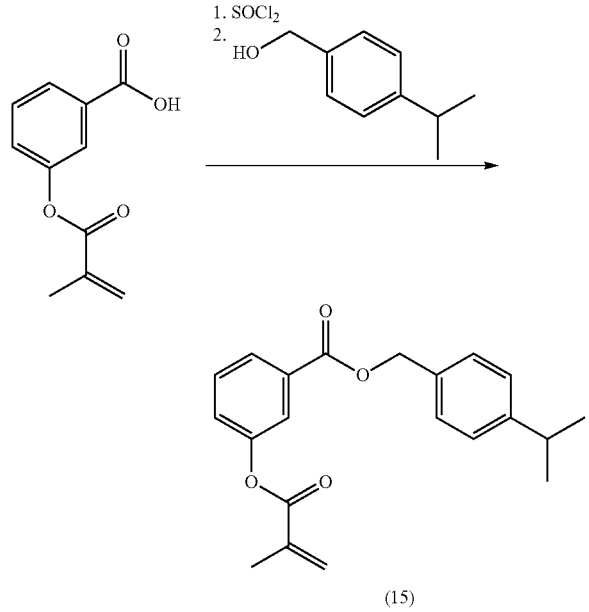

Title compound (15) was synthesized according to Example 4, Step 2. 3-(Methacryloxy)benzoic acid (3.09 g, 15 mmol), 4-Isopropyl benzyl alcohol (3.00 g, 20 mmol) and pyridine (3.2 g, 40 mmol) were used. The crude product was purified by column chromatography (SiO$_2$, PE:EE=6:1) to yield 3.71 g (73%) of (15) as a transparent liquid that was stabilized with 250 ppm BHT. $^1$H NMR (400 MHz, CDCl$_3$, δ, ppm): 8.00 (d, 1H; Ar—H), 7.82 (t, 1H; Ar—H), 7.51-7.25 (m, 6H; Ar—H), 6.37 (s, 1H; =CH$_2$), 5.79 (t, 1H; =CH$_2$), 5.35 (s, 1H; COO—CH$_2$—), 2.94 (q, 1H; Ar—CH—(CH$_3$)$_2$), 2.08 (s, 3H; CH$_2$=CH$_2$—CH$_3$), 1.29 (s, 3H; CH—(CH$_3$)$_2$), 1.26 (s, 3H; CH—(CH$_3$)$_2$). APT $^{13}$C NMR (100.6 MHz, CDCl$_3$, δ, ppm): 165.7 (C4, CO), 165.6 (C4, CO), 151.0 (C4), 149.3 (C4), 135.7 (C4), 133.3 (C4), 131.9 (C4), 129.5 (C3), 128.6 (C3), 127.7 (C2), 127.2 (C3), 126.8 (C3), 126.5 (C3), 123.0 (C3), 67.0 (C2), 34.0 (C1), 24.0 (C1), 18.4 (C1).

Example 16: Synthesis of Benzyl 2-(acryloxy)benzoate (Benzyl Salicylate Acrylate) (16)

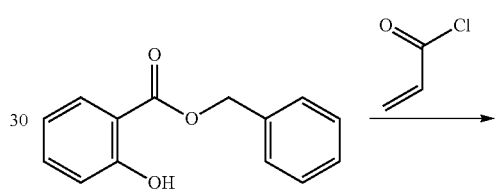

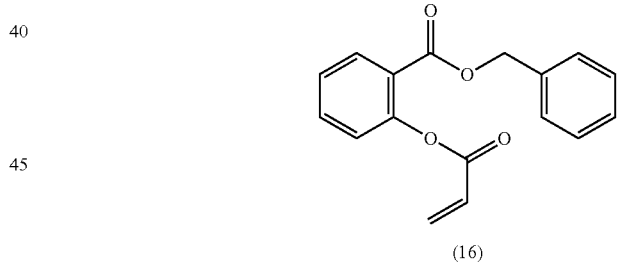

(16)

The preparation was similar to Reference Example 1, using 4.57 g (20 mmol) of benzyl salicylate, 2.00 g (22 mmol) of acryloyl chloride, as well as 2.53 g (25 mmol) of trimethylamine, and purifying the crude product by silica chromatography (eluent PE:EE=6:1), yielding 3.67 g (65%) of the title compound (16) as a transparent, colorless liquid, which had been stabilized by adding 250 ppm of BHT prior to evaporating the solvents. $^1$H NMR (400 MHz, CDCl$_3$, δ, ppm): 8.13 (dd, 1H; Ar—H) 7.59 (td, 1H; Ar—H), 7.43-7.33 (m, 6H; Ar—H), 7.19 (dd, 1H; Ar—H), 6.57 (dd, 1H; =CH$_2$), 6.28 (q, 1H; —CH=CH$_2$), 5.94 (dd, 1H; =CH$_2$), 5.32 (s, 2H; COO—CH$_2$—Ar). APT $^{13}$C NMR (100.6 MHz, CDCl$_3$, δ, ppm): 164.6 (C4, CO), 164.4 (C4, CO), 150.4 (C4), 135.6 (C4), 133.9 (C3), 132.6 (C2), 132.0 (C3), 128.5 (C3, d), 128.3 (C3), 127.4 (C3), 126.1 (C3), 123.9 (C3), 123.4 (C4), 67.0 (C2).

Example 17: Synthesis of Phenethyl 2-(methacryloxy)benzoate (Phenyethyl Salicylate Methacrylate) (17)

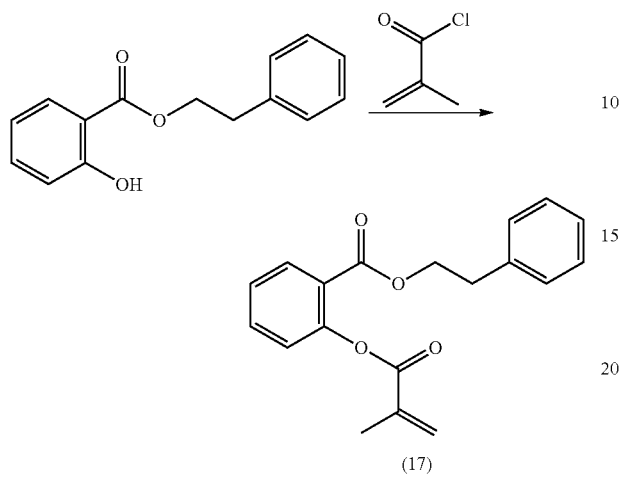

(17)

The preparation was similar to Reference Example 1, using 7.89 g (30 mmol) of phenethyl salicylate P-137, C3 and purifying the crude product by recrystallization in Et$_2$O to yield 8.00 g (81%) of the title compound (17) as white crystals that were stabilized using 250 ppm of BHT. $^1$H NMR (200 MHz, CDCl$_3$, δ, ppm): 8.02 (dd, 2H; Ar—H), 7.59 (td, 2H; Ar—H), 7.36-7.24 (m, 6H; Ar—H), 7.18 (dd, 1H; Ar—H), 6.40 (s, 1H; =CH$_2$), 5.80 (t, 1H; =CH$_2$), 4.48 (t, 2H; COO—CH$_2$—CH$_2$—Ar), 3.03 (t, 2H; COO—CH$_2$—CH$_2$Ar), 2.10 (s, 3H; CH$_2$=CH$_2$—C3). APT $^{13}$C NMR (50.3 MHz, CDCl$_3$, δ, ppm): 166.0 (C4, CO), 164.5 (C4, CO), 150.9 (C4), 137.7 (C4), 135.8 (C4), 133.8 (C3), 131.8 (C3), 129.0 (C3), 128.6 (C3), 127.6 (C2), 126.7 (C3), 126.0 (C3), 123.9 (C3), 123.7 (C4), 65.7 (C2), 35.1 (C2), 18.5 (C1).

Example 18: Synthesis of 3-methoxybenzyl 4-(methacryloyloxy)-3-methoxybenzoate (18)

Step 1: Preparation of (methacryloxy)vanillic Acid

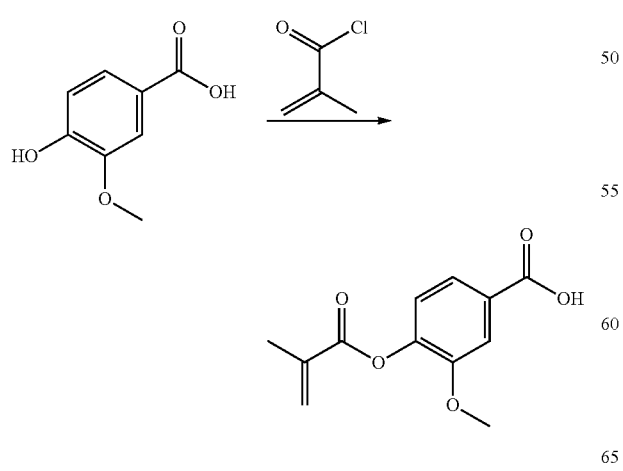

The synthesis was carried out according to Example 4, Step 1, using 20 mmol vanillic acid and 2.30 g (22 mmol) freshly distilled methacryloyl chloride, yielding 3.12 g (66%) of the product. $^1$H NMR (200 MHz, DMSO-d$_6$, δ, ppm): 13.10 (s, 1H; —COOH), 7.61-7.56 (m, 2H; Ar—H), 6.28 (s, 1H; =CH$_2$), 5.92 (s, 1H; =CH$_2$), 3.82 (s, 1H; Ar—O—CH$_3$), 1.99 (s, 3H; CH$_2$=CH$_2$—CH$_3$).

Step 2: Preparation of 4-(methacryloyloxy)-3-methoxybenzoic Acid (18)

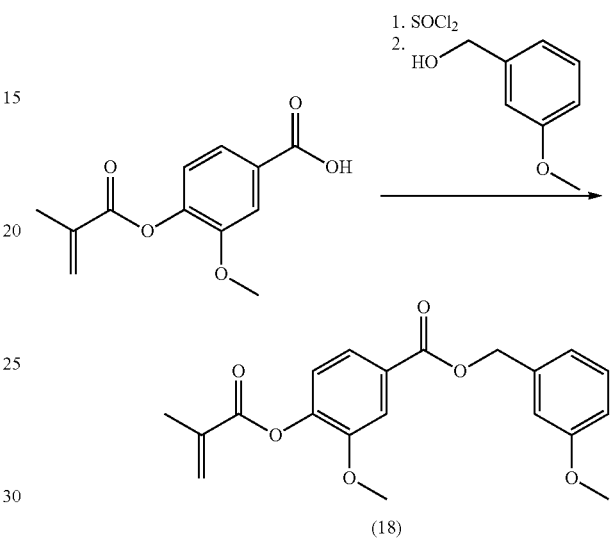

(18)

Title compound (18) was synthesized according to Example 4, Step 2. (Methacryloxy)vanillic acid (3.09 g, 15 mmol), 4-methoxy benzyl alcohol (3.00 g, 20 mmol) and pyridine (3.2 g, 40 mmol) were used. The crude product was purified by column chromatography (SiO$_2$, PE:EE=3:1) to yield 3.71 g (73%) of (18) as a transparent liquid that was stabilized with 250 ppm BHT and 100 ppm phenothiazine. $^1$H NMR (400 MHz, CDCl$_3$, δ, ppm): 7.72-7.68 (m, 2H; Ar—H), 7.41 (s, 1H; Ar—H), 7.38 (s, 1H; Ar—H), 7.13 (d, 1H; Ar—H), 6.94 (s, 1H; Ar—H), 6.92 (s, 1H; Ar—H), 6.38 (s, 1H; =CH$_2$), 5.78 (t, 1H; =CH$_2$), 5.31 (s, 2H; COO—CH—), 3.87 (s, 3H; Ar—O—CH$_3$), 3.82 (s, 3H; Ar—O—CH$_3$), 2.08 (s, 3H; CH$_2$=CH$_2$—CH$_3$).

Example 19: Synthesis of 1-phenylethyl 2-(methacryloyloxy)benzoate (19)

Step 1: Preparation of 1-phenylethyl 2-hydroxybenzoate

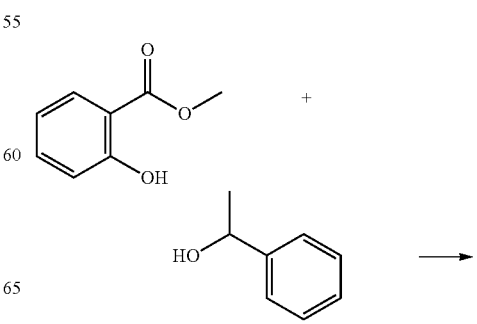

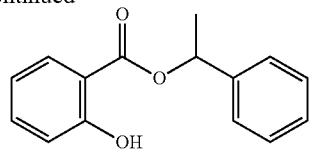

The reaction was carried out according to Example 1, Step 1. Therefore, 4.55 g (30 mmol) methyl salicylate, 3.66 g (30 mmol) 1-phenylethyl alcohol, and 1.15 g (50 mmol) metallic sodium were reacted to yield 1.30 g (18%) of the salicylate product after purification by means of column chromatography (PE:EE=6:1). H NMR (400 MHz, CDCl$_3$, δ, ppm): 10.81 (s, 1H; Ar—O$\underline{H}$), 7.97 (d, 1H; Ar—H), 7.48-7.32 (m, 6H; Ar—H), 7.00 (d, 1H; Ar—H), 6.93 (t, 1H; Ar—H), 6.17 (q, 1H; —COO—C$\underline{H}$(CH$_3$)—), 1.72 (d, 3H; —COO—CH(C$\underline{H}_3$)—).

Step 2: Preparation of 1-phenylethyl 2-(methacryloyloxy)benzoate (19)

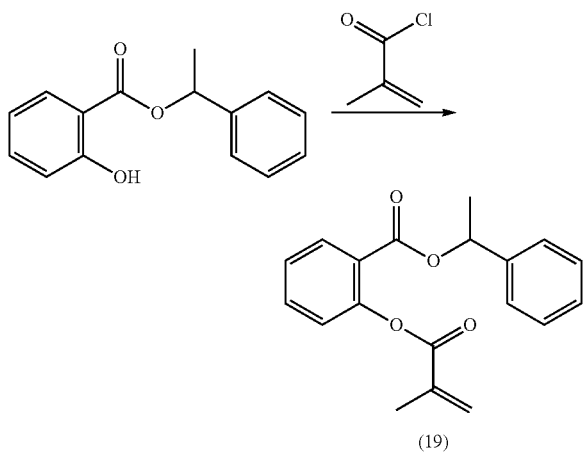

The reaction was conducted according to Reference Example 1, using 1.20 g (5 mmol) 1-phenylethyl 2-hydroxybenzoate, 0.57 g (5.5 mmol) methacryloyl chloride, and 0.81 g (8 mmol) triethylamine. After column chromatography (PE:EE=6:1) 1.10 g (71%) of the title compound (19) was isolated. $^1$H NMR (400 MHz, CDCl$_3$, δ, ppm): 8.07 (d, 1H; Ar—H), 7.58 (t, 1H; Ar—H), 7.40-7.27 (m, 6H; Ar—H), 7.14 (d, 1H; Ar—H), 6.36 (s, 1H; =C$\underline{H}_2$), 6.10 (q, 1H; —COO—C$\underline{H}$(CH$_3$)—), 5.74 (t, 1H; =C$\underline{H}_2$), 2.03 (s, 3H; CH$_2$=CH$_2$—C$\underline{H}_3$), 1.62 (d, 3H; —COO—CH(C$\underline{H}_3$)—).

Example 20: Synthesis of cycloheptyl 4-((methacryloyloxy)methyl)benzoate (20)

Step 1: Preparation of 4-((methacryloyloxy)methyl)benzoic Acid

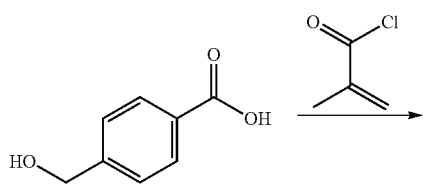

3.05 g (20 mmol) of 4-hydroxymethyl benzoic acid and 3.04 (66 mmol) triethylamine were dissolved in 50 mL of dry acetonitrile. The solution was degassed with Ar and cooled down to below 0° C. Subsequently, 2.30 g (22 mmol) of freshly distilled methacryloyl chloride were dissolved in 20 mL dry acetonitrile, degassed and added dropwise under argon atmosphere to the reaction solution. After addition, the reaction was stirred another hour at a temperature below 0° C., then warmed to room temperature and stirred overnight. On the next day, the reaction solution was stabilized with 250 ppm BHT, and the solvent was evaporated. Then, the slurry was dissolved again in CH$_2$Cl$_2$ and the organic phase was washed with 10 vol % HCl (3×25 mL) and brine (3×25 mL). The organic layer was dried over Na$_2$SO$_4$, filtrated, and stabilized with 50 ppm phenothiazine, before the solvent was removed again. The received white crude solid was purified by means of column chromatography (SiO$_2$, PE:EE=1:1) to yield 1.91 g (43%) of white crystals. $^1$H NMR (400 MHz, DMSO-d$_6$, δ, ppm): 12.97 (s, 1H; —COOH), 7.96 (d, 2H; Ar—H), 7.51 (d, 2H; Ar—H), 6.11 (s, 1H; =C$\underline{H}_2$), 5.74 (t, 1H; =C$\underline{H}_2$), 5.25 (s, 2H; Ar—C$\underline{H}_2$—OOC—), 1.92 (s, 3H; CH$_2$=CH$_2$—C$\underline{H}_3$).

Step 2: Preparation of cycloheptyl 4-((methacryloyloxy)methyl)benzoate (20)

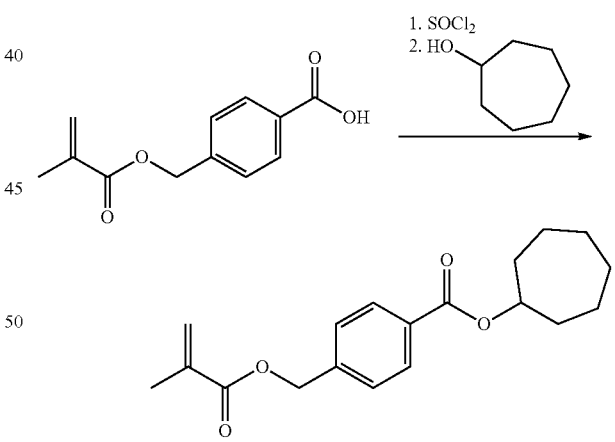

Title compound 20 was synthesized according to the synthesis protocol of Example 4, Step 2, using 1.55 g (7 mmol) 4-((methacryloyloxy)methyl)benzoic acid and 5 mL of thionyl chloride in 10 mL toluene for the first step, as well as 1.13 g (10 mmol) cycloheptanol and 1.60 g (20 mmol) pyridine in dichloromethane for the second step. The crude product was purified by column chromatography (PE:EE=6:1) to yield 0.51 g (23%) of title compound 20. $^1$H NMR (200 MHz, CDCl$_3$, δ, ppm): 8.05 (d, 2H; Ar—H), 7.44 (d, 2H; Ar—H), 6.17 (s, 1H; =C$\underline{H}_2$), 5.60 (t, 1H; =C$\underline{H}_2$), 5.23 (s, 2H; Ar—C$\underline{H}_2$—OOC—), 5.23-5.13 (m, 1H; —COO—C$\underline{H}$(CH$_2$)$_2$—), 1.97 (s, 3H; CH$_2$=CH$_2$—C$\underline{H}_3$), 2.07-1.03 (m, 14H; cycloaliphate).

Example 21: Synthesis of cyclohexylmethyl 2-(methacryloyloxy)benzoate (21)

Step 1: Preparation of cyclohexylmethyl 2-hydroxybenzoate

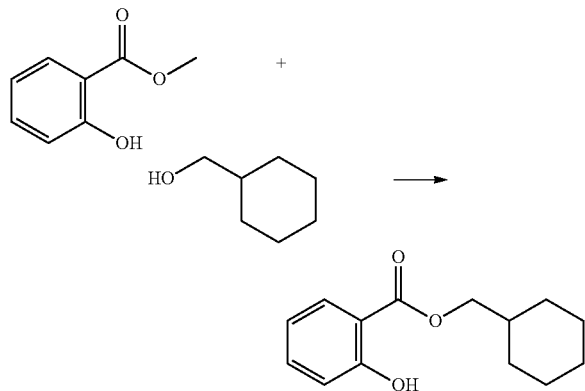

The reaction was carried out according to Example 1, Step 1. Therefore, 5.33 g (35 mmol) methyl salicylate, 4.00 g (35 mmol) cyclohexylmethanol, and 1.39 g (60 mmol) metallic sodium were reacted to yield 1.71 g (21%) of the salicylate product after purification by means of column chromatography (PE:EE=6:1). $^1$H NMR (400 MHz, CDCl$_3$, δ, ppm): 10.86 (s, 1H; Ar—O$\underline{H}$), 7.89 (dd, 1H; Ar—H), 7.46 (td, 1H; Ar—H), 7.01 (dd, 1$\overline{H}$; Ar—H), 6.89 (td, 1H; Ar—H), 4.19 (d, 1H; —COO—C$\underline{H}$—), 1.86-1.74 (m, 6H; cycloaliphate), 1.42-0.97 (m, 5H; cycloaliphate).

Step 2: Preparation of cyclohexylmethyl 2-(methacryloyloxy)benzoate (21)

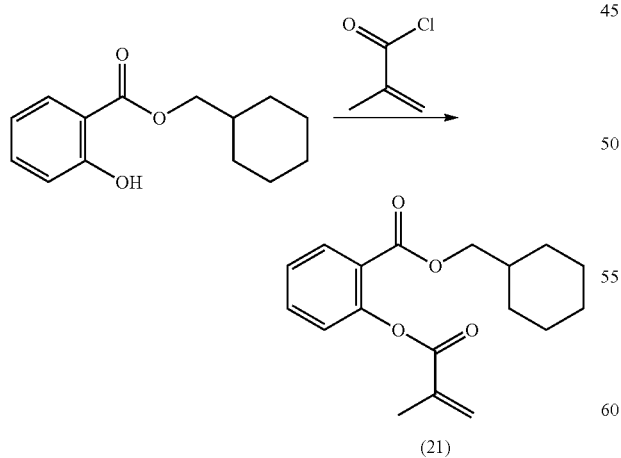

(21)

The reaction was conducted according to Reference Example 1, using 1.05 g (4.5 mmol) cyclohexylmethyl 2-hydroxybenzoate, 0.57 g (5.5 mmol) methacryloyl chloride, and 0.91 g (9 mmol) triethylamine. After column chromatography (PE:EE=6:1) 0.98 g (72%) of title compound 21 was isolated. $^1$H NMR (200 MHz, CDCl$_3$, δ, ppm): 8.06 (d, 1H; Ar—H), 7.57 (t, 1H; Ar—H), 7.33 (t, 1H; Ar—H), 7.16 (d, 1H; Ar—H), 6.40 (s, 1H; =C$\underline{H}_2$), 5.79 (t, 1H; =C$\underline{H}_2$), 4.08 (d, 2H; —COO—C$\underline{H}_2$—), 2.10 (s, 3H; CH$_2$=CH$_2$—C$\underline{H}_3$), 1.80-1.60 (m, 6H; cycloaliphate), 1.35-0.97 (m, 5H; cycloaliphate).

Example 22: Melting Point Measurements

When used as reactive diluents in curable formulations, it is desirable that the polymerizable monomers disclosed herein be in the liquid state at the processing temperature. This implies that the lower limit of the processing window of reactive diluents is defined either by viscosity (if still liquid) or by the melting point of the substance. For high temperature application the upper limit for melting points is empirically defined by 90° C.

Therefore, monomers being solid at room temperature were analyzed using an OptiMelt melting point apparatus from Stanford Research Systems using a heating rate of 1K/mm. The melting point interval was determined by an optical sensor. Additionally, STA (simultaneous thermal analyzer) measurements were performed on a DSC apparatus STA 449F1 Jupiter from Netzsch, which covers a temperature range from −50° C. to 400° C., using a heating rate of 10K/mm. For the purposes herein, the DSC data were used to determine the melting points of the synthesized compounds. Due to the rather high heating rate, the onset of melting was used as the point of reference.

In the following Table 1, the results of both melting point determinations are listed for the examples of the disclosure, as synthesized above, and five reference examples.

TABLE 1

| | Melting points ("—" liquid at room temperature) | |
|---|---|---|
| Example | m$_p$ (Optimelt) [° C.] | m$_p$ (onset, STA plot) [° C.] |
| 1 | — | — |
| 2 | — | — |
| 3 | — | — |
| 4 | — | — |
| 5 | — | — |
| 6 | — | — |
| 7 | — | — |
| 8 | — | — |
| 9 | 43-45 | 45 |
| 10 | 79-81 | 81 |
| 11 | — | — |
| 12 | — | — |
| 13 | — | — |
| 14 | 23-25 | 25 |
| 15 | — | — |
| 16 | — | — |
| 17 | 65-66 | 64 |
| 18 | — | — |
| 19 | — | — |
| 20 | — | — |
| Ref1 | 99-100 | 99 |
| Ref2 | — | — |
| Ref3 | — | — |
| Ref4 | — | — |
| Ref5 | — | — |

The results in Table 1 show that one reference example and four examples of the present disclosure are solids at room temperature. The other tested substances are liquids.

Ref1 exhibits a melting point of 99-100° C., which is about 10° C. above the upper defined limit. Such a high melting point likely precludes Ref1, and possibly other aryl salicylate (meth)acrylates, from being used as reactive monomer(s) in high temperature lithography-based photopolymerization processes.

Example 9 and 10 representing the bridged bicyclic esters, i.e. fenchyl and (iso)bornyl salicylate methacrylate, are solid at room temperature. However, (9) possesses a rather low melting point (45° C.), while (10) exhibits a significantly higher melting point of −80° C., which is still well below the upper boundary. The fact that all other cycloaliphatic examples of the present disclosure, including the meta- and para-methacryloxy derivatives, are liquids at room temperature shows the impact of the cycloaliphatic group attached to the ester on the aggregation state of the respective compounds.

Concerning benzylic and phenethylic salicylate methacrylates, Examples (14) and (17) are solids at room temperature. However, (14) shows a melting point around room temperature. Derived from observation, crystallization of compound (14) only occurs in the refrigerator, while it maintains its liquid aggregate at 20° C. for days. Thus, (14) can be used as monomer without reservation. The phenethylic salicylate methacrylate (17) with its melting point of 65° C. also meets the desired properties for being used as reactive diluent. All the other benzylic examples, including different substitution pattern, yield liquid substances at room temperature and can therefore be considered as reactive diluent monomers in photopolymerization.

From these results, the skilled artisan may conclude that the vast majority of other polymerizable monomers according to the present disclosure, comprising optionally substituted cycloalkyl radicals, cycloalkyl radicals with aliphatic linker, and benzylic or phenethylic as ester moieties $R_1$, will be liquid or comparatively low melting compounds, too.

Example 23: Presence or Absence of Odor

As already mentioned above, salicylates usually have a characteristic camphor-like smell resulting from rather high volatilities already at room temperature, which is why they have been used for a long time as flavorings and scents. Consequently, a simple detection of the presence or absence of odor may serve as a first investigation of the volatilities of the examples of the present disclosure and the reference examples.

To this end, 100±5 mg of the polymerizable monomers (1) to (20) of the disclosure and of Ref1-5 were each weighed into a 10 mL vial. The vial was closed with a cap and was left to stand at room temperature for 30 min. Subsequently, the cap was removed from the vial and a possible development of odor in the sample was detected by smelling the sample with the nose. The results listed in Table 3 were rated as follows:

A: no smell detected
B: faint to medium smell detected
C: strong smell detected

TABLE 2

| Odor detection | |
|---|---|
| Example | Rating |
| 1 | A |
| 2 | A |
| 3 | A |
| 4 | A |
| 5 | A |

TABLE 2-continued

| Odor detection | |
|---|---|
| Example | Rating |
| 6 | A |
| 7 | A |
| 8 | A |
| 9 | A |
| 10 | A |
| 11 | A |
| 12 | A |
| 13 | A |
| 14 | A |
| 15 | A |
| 16 | A |
| 17 | A |
| 18 | A |
| 19 | A |
| 20 | A |
| Ref1 | A |
| Ref2 | B |
| Ref3 | A |
| Ref4 | C |
| Ref5 | C |

As can be seen from the results in Table 2, all examples of the present disclosure, (1) to (20), Ref1, and Ref3 exhibited an absence of odor so that a very low volatility may be assumed. For Ref2, a slightly sweet scent rated "B" was noted, and for low-molecular-weight monomers Ref4 and Ref5, a strong odor rated "C" was noted, which is typical for highly volatile compounds. Thus, Ref2, Ref4, and Ref5 are less suitable for applications at elevated temperatures.

Example 24: Volatility and Thermal Stability

Volatility and thermal stability were tested by means of simultaneous thermal analysis (STA), which represents a combination of thermogravimetry (TG) and differential-scanning calorimetry (DSC). In order to determine the volatility and thermal stability of the examples, STA measurements were performed on an STA 449F1 Jupiter from Netzsch covering a temperature range from −50° C. to 400° C. using a heating rate of 10 K/min. The temperatures at which 5% mass loss or 10% mass loss, respectively, are detected for the monomers were taken as a measure for volatility. Thermal stability was derived from the recorded DSC data, i.e. the temperature at which release of energy triggered by thermal polymerization of the monomers is detected. Herein, the temperature at the onset of exothermic thermal polymerization is taken as a measure for thermal stability. Additionally, the mass loss of the reactive diluents at a constant temperature of 90° C. was observed over a time period of 2 h. In this case, a mass loss less than 1% was established to identify monomers most suitable as reactive diluents for high temperature applications. The results are listed in the following Table 3.

TABLE 3

Volatility and thermal stability ("—" not observed, "n.d." not determined)

| Example | 5% mass loss [° C.] | 10% mass loss [° C.] | Onset of thermal polymerization [° C.] | Mass loss at 90° C. after 2 h [%] |
|---|---|---|---|---|
| 1 | n.d. | n.d. | n.d. | 0.60 |
| 2 | 164 | 179 | — | 0.90 |
| 3 | 179 | 194 | — | 0.42 |

TABLE 3-continued

Volatility and thermal stability ("—" not observed, "n.d." not determined)

| Example | 5% mass loss [° C.] | 10% mass loss [° C.] | Onset of thermal polymerization [° C.] | Mass loss at 90° C. after 2 h [%] |
|---|---|---|---|---|
| 4 | n.d. | n.d. | n.d. | 0.13 |
| 5 | 190 | 209 | — | 0.40 |
| 6 | 171 | 187 | — | 0.82 |
| 7 | 172 | 186 | 225 | 0.43 |
| 8 | n.d. | n.d. | n.d. | 0.08 |
| 9 | 177 | 191 | — | 0.68 |
| 10 | 176 | 192 | — | 0.86 |
| 11 | n.d. | n.d. | n.d. | 0.43 |
| 12 | n.d. | n.d. | n.d. | n.d. |
| 13 | 185 | 200 | — | 0.05 |
| 14 | 195 | 210 | — | 0.18 |
| 15 | 214 | 230 | — | 0.56 |
| 16 | 184 | 198 | — | 0.23 |
| 17 | 196 | 210 | — | 0.21 |
| 18 | n.d. | n.d. | n.d. | 0.22 |
| 19 | n.d. | n.d. | n.d. | 0.42 |
| 20 | n.d. | n.d. | n.d. | 0.80 |
| Ref1 | 178 | 191 | — | 0.96 |
| Ref2 | 119 | 132 | — | 47.99 |
| Ref3 | n.d. | n.d. | n.d. | 0.89 |
| Ref4 | 91 | 104 | — | 80.30 |
| Ref5 | n.d. | n.d. | n.d. | >95 (after 85 min) |

Table 3 shows that the commercially available Ref4 exhibited a mass loss of more than 80% after 2 h at 90° C., which makes this compound unsuitable for high temperature applications. The same holds true for Ref5, which exhibited a mass loss of more than 95%. Methylsalicylate methacrylate (Ref2) is also rather volatile due to its short aliphatic side chain. Ref3 exhibited a mass loss at 90° C. of only 0.89% due to its relatively long aliphatic chain reducing its volatility. However, such acyclic aliphatic chains usually result in (photo)polymers having rather poor thermomechanical properties. Advantageously, polymerizable monomers (1) to (20) according to the disclosure, as well as Ref1, also exhibited mass losses after 2 h at 90° C. of less than 1%. However, while Ref1 is still in the solid state, all monomers of the present disclosure were already liquid at this temperature. The only monomer for which an onset of thermal polymerization was detected was example (7). The onset of thermal polymerization was detected at a temperature as high as 225° C., which is much higher than the range of 90-120° C. usually set as the processing temperatures of high temperature lithography-based photopolymerization processes. All other examples were thermally stable and evaporated before thermal polymerization occurred. Consequently, all polymerizable monomers (1) to (20) of the present disclosure are well suited as reactive, low volatile monomers in such processes.

Example 25: Viscosity

The main reason for adding a reactive diluent to a resin formulation is to lower its viscosity, thus improving the processability of the resin. Therefore, rheology measurements of the neat monomers were performed covering a temperature range from 25° C. to 100° C. The measurements were performed on an Anton Paar MCR 301 apparatus equipped with a CTD 450 oven and a CP-25-1 measuring system, using a gap distance between stamp (cone) and bottom plate of 48 m and a constant shear rate of 50 s$^{-1}$.

TABLE 4

Viscosities at varying temperatures ("—" still in solid state at given temperature)

| Example | η at 25° C. [mPa·s] | η at 40° C. [mPa·s] | η at 50° C. [mPa·s] | η at 70° C. [mPa·s] | η at 90° C. [mPa·s] | η at 100° C. [mPa·s] |
|---|---|---|---|---|---|---|
| 2 | 217 | 57 | 29 | 11 | 6 | 5 |
| 3 | 1350 | 195 | 72 | 20 | 9 | 6 |
| 4 | 645 | 135 | 62 | 20 | 13 | 10 |
| 5 | 1160 | 191 | 79 | 23 | 10 | 7 |
| 6 | 1330 | 225 | 95 | 28 | 13 | 9 |
| 7 | 610 | 112 | 49 | 15 | 7 | 5 |
| 8 | 1850 | 259 | 104 | 28 | 11 | 8 |
| 9 | — | — | 85 | 25 | 11 | 8 |
| 10 | — | — | — | — | 9 | 7 |
| 11 | 58 | 23 | 14 | 7 | 4 | 3 |
| 12 | 92 | 36 | 22 | 10 | 6 | 5 |
| 13 | 70 | 24 | 14 | 7 | 5 | 4 |
| 14 | 90 | 31 | 19 | 9 | 5 | 4 |
| 15 | 123 | 43 | 25 | 11 | 6 | 5 |
| 16 | 90 | 31 | 18 | 9 | 5 | 4 |
| 17 | — | — | — | 17 | 11 | 9 |
| 18 | 5450 | 360 | 226 | 52 | 20 | |
| 19 | 325 | 82 | 40 | 15 | 7 | 6 |
| Ref1 | — | — | — | — | — | 6 |
| Ref2 | 24 | 11 | 8 | 4 | 2 | 2 |
| Ref3 | 37 | 16 | 10 | 5 | 3 | 2 |
| Ref4 | 7 | 5 | 4 | 3 | 2 | 2 |
| Ref5 | 2 | 2 | 2 | 1 | 1 | 1 |

While the Reference Examples (Ref2), (Ref4), and (Ref5) show low viscosities at 25° C. which decrease with increasing temperatures, these compounds show significant mass losses at elevated temperatures, which precludes their use for high temperature applications. (Ref1), having a melting point of 99-100° C., is solid at temperatures below 100'C. At 100° C., however, it shows a viscosity of the melt of 6 mPa·s. (Ref3) on the other hand, can already act as reactive diluent at room temperature. Nevertheless, the long branched aliphatic side chain is possibly expected to yield photopolymers with poor thermomechanical properties.

Among the examples of the present disclosure, examples (2) to (8) comprising a cycloaliphatic ring directly linked to the respective (meth)acryloylbenzoic acid are liquid at room temperature, exhibiting viscosities between 0.2 and 1.8 Pa·s at 25° C., which do not meet the definition of a reactive diluents (<40 mPa·s). Of particular note is that (2) with the unsubstituted cyclohexyl ring, as well as the acrylate derivative (7), and the meta-derivative (4) show lower viscosity values. Raising the temperature leads to an exponential drop of viscosity, resulting in viscosities below 40 mPa·s at 70° C. and ~10 mPa·s at 90° C., which is perfectly suitable for use as a reactive diluent. The latter also holds true for all other examples tested, i.e. the bridged cycloaliphatic salicylate methacrylates (9) and (10) that are solids at room temperature, but clearly have the potential to act as reactive diluent in the molten state. Interestingly enough, cycloaliphatic examples (11) and (12) show viscosities below 100 mPa·s at 25° C., approaching viscosities below 40 mPa·s after being slightly warmed up. Seemingly, this can be attributed to the short C1 and C2 alkyl-linker that connects the cycloaliphatic ring with the benzoate.

Regarding benzylic derivatives (13) to (16), similar findings were observed. While the phenylic salicylate methacrylate (Ref1) possesses a high melting point, the benzylic examples are liquids at 25° C. with viscosities slightly higher (15), but mostly lower than 100 mPa·s (examples (13), (14) and (16)). At 40° C. they already meet the requirements in terms of viscosity for reactive diluent applications, providing a large process window for e.g. stereolithography, inkjet or coating application. Finally, phenethylic example (17) shows low viscosities immediately after melting at 65° C.

Summarizing, it can be stated that all examples of the present disclosure readily meet the requirements for use as a reactive diluent.

Example 26: Homopolymerization and Photoreactivity

In order to guarantee sufficient photoreactivities of the polymerizable monomers, photo-differential scanning calorimetry (photo-DSC) measurements were carried out for a selection of the synthesized substances. To this end, the monomers were mixed with 1 wt % of a commercially available photoinitiator (TPO-L, ethyl (2,4,6-trimethylbenzoyl) phenyl-phosphinate) in an ultrasonic bath at 50° C. (or above the melting temperature) for 15 min. Then, 10±1 mg of the respective monomer were accurately weighed into an aluminum DSC pan and put into a DSC 204 F1 device from Netzsch using an autosampler, coupled with a broadband UV-light source (320-500 nm) from an Exfo OmniCure™ series 2000. The sample was irradiated under $N_2$ atmosphere ($N_2$ flow: 20 mL/min) using an intensity of 1 $W/cm^2$ at the exit of the light guide, which corresponds to about 20 $mW/cm^2$ on the sample surface, for 5 min. After the measurement, some of cured samples were dissolved in $CDCl_3$ and $^1H$ NMR spectra were recorded by means of a BRUKER Avance DRX-400 FT-NMR spectrometer. The double bond conversions (DBC; in %) of the respective monomers were calculated on the basis of the corresponding integrated double bond peak areas and are listed in the following Tables 6 to 8, together with the respective values for $t_{max}$ and $t_{95}$, the times (in s) until the maximum polymerization temperatures or 95% of the conversions, respectively, were reached.

TABLE 5

Photo-DSC at 90° C.

| Example | $t_{max}$ [s] | $t_{95}$ [s] | DBC [%] |
|---|---|---|---|
| 3 | 8.3 | 35.4 | 87 |
| 6 | 9.3 | 47.5 | 94 |
| 7 | 3.1 | 23.7 | >99 |
| 9 | 7.1 | 38.2 | 81 |
| 10 | 8.0 | 40.2 | 85 |

As can be seen from Table 5, the novel methacrylates (3), (6), (9), and (10) showed quite similar results, namely values for $t_{max}$, ranging between approx. 7 and 9 s, $t_{95}$, ranging between 35 and 48 s, and DBC, being higher than 80%, the highest value for DBC, 94%, being reached by (6). Generally, these results confirm good photoreactivities of the novel methacrylates. The highest photoreactivity, however, was achieved by (7), exhibiting a $t_{max}$ of 3.1 s, a $t_{95}$ of 23.7 s, and a DBC >99%, which was not surprising, since acrylates typically possess higher photoreactivities than methacrylates.

In order to be able to measure the photoreactivity of higher melting compound Ref1, phenyl salicylate methacrylate, further measurements were conducted at 100° C., comparing the photoreactivities of Ref1 with that of compound (3) as a representative cycloaliphatic salicylate methacrylate.

TABLE 6

Photo-DSC at 100° C.

| Example | $t_{max}$ [s] | $t_{95}$ [s] | DBC [%] |
|---|---|---|---|
| 3 | 6.5 | 25.9 | 92 |
| Ref1 | 16.3 | 67.0 | 92 |

As shown in Table 6, (3) shows much higher photoreactivity than Ref1. The DBCs of both substances were identical, though (92%). These results show that (3), the representative of the novel cycloaliphatic salicylate methacrylates, possesses a clearly higher photoreactivity than Ref1.

The high mass loss of Reference Examples Ref2, Ref4, and Ref5 at 90° C. necessitated a lower curing temperature in the photo-DSC measurements. The temperature of choice was 70° C., since evaporation of the reference examples was expected to be acceptable for the short time of the measurement. For comparison, (3) and (11) were used as representatives for the cycloaliphatic salicylate methacrylates, with (11) possessing a C1 alkyl-linker between the ester and the cycloaliphatic ring. Moreover, a variety of benzylic and phenethylic derivatives (13) to (17) were irradiated using an Omnicure LX400 LED light source with a wavelength of 365 nm set to an intensity of 100%.

TABLE 7

Photo-DSC at 70° C.

| Example | $t_{max}$ [s] | $t_{95}$ [s] |
|---|---|---|
| 3 | 8.6 | 36.1 |
| 11 | 13.0 | 74.3 |
| 13 | 15.4 | 41.3 |
| 14 | 9.0 | 77.6 |
| 15 | 12.3 | 41.4 |
| 16 | 7.4 | 39.0 |
| 17 | 15.0 | 45.2 |
| Ref2 | 53.0 | 70.0 |
| Ref4 | 21.0 | 38.4 |
| Ref5 | 13.0 | 74.3 |

Table 7 shows that (3), exhibiting a $t_{max}$ of 8.6 s and a $t_{95}$ of 36.1 s, polymerized much faster than Ref2 (53 s/70 s), Ref4 (21 s/38 s), and Ref5 (13 s/74 s). However, the second cycloaliphatic representative (11) exhibits a reactivity in the range of Ref5. Concerning the benzylic and phenethylic monomers, (13) and (17), having a $t_{max}$ of 15 s and a $t_{95}$ between 40 and 45 s, are in the range of Ref4 and clearly outperform Ref2 and Ref5 in terms of photoreactivity. The acrylate representative (16) within the structures with benzylic side groups has the highest reactivity. Finally, examples (14) and (15) also perform well in terms of photoreactivity.

Although compounds (2), (4), (5), (8), and (12) were not tested in the photo-DSC test series, they showed excellent photoreactivity when test specimens were homopolymerized for DMA measurements. Therefore, a high photoreactivity can be stated for all examples of the present disclosure.

Example 27: Homopolymerization and Dynamic Mechanical Analysis (DMA)

DMA measurements of homopolymerizates of the neat monomers were conducted to investigate their heat deflection and glass transition temperatures ($T_g$). To this end, each monomer was mixed with 1 wt % of photoinitiator (TPO-L), heated up to at least 70° C. or 10° C. above the melting temperature, respectively, and cured in a Uvitron International INTELLI-RAY 600 UV-oven using a 320-500 nm Hg broadband UV lamp (600 W; UV-A: 125 mW/cm$^2$; Vis: 125 mW/cm$^2$). DMA measurements of the photopolymers thus obtained were conducted using a TA Instrument 2980 in 3-point bending mode set to an amplitude of 10 µm, a static force of 0.050 N and an auto-tension of 125%. The temperature program for each measurement was set to from −50° C. to 200° C. and a heating rate of 3 K/min. Table 8 lists the resulting values for the storage moduli at 20° C., $G'_{(20°)}$, the glass transition temperatures measured at the maximum of the tan δ plot, $T_g$, and the temperatures at which G' reached 1000 MPa, $T_{1000}$.

TABLE 8

Dynamic mechanical analysis

| Photopolymer of Example | $G'_{(20)}$ [MPa] | $T_g$ [° C.] | $T_{1000}$ [° C.] |
|---|---|---|---|
| 2 | 2197 | 118 | 85 |
| 3 | 2779 | 112 | 85 |
| 4 | 2726 | 113 | 85 |
| 5 | 2746 | 114 | 68 |
| 6 | 2477 | 129 | 100 |
| 7 | 2027 | 111 | 72 |
| 8 | 2130 | 138 | 100 |
| 9 | 2267 | 154 | 105 |
| 10 | 2576 | 148 | 116 |
| 11 | 2654 | 123 | 97 |
| 12 | 1850 | 77 | 47 |
| 13 | 3101 | 90 | 71 |
| 14 | 3257 | 108 | 79 |
| 15 | 2353 | 69 | 36 |
| 16 | 2355 | 67 | 51 |
| 17 | 2958 | 81 | 63 |
| Ref2 | 2437 | 87 | 57 |
| Ref3 | 1080 | 59 | 22 |
| Ref4 | 1540 | 149 | 75 |
| Ref5 | 2198 | 78 | 59 |

As well-known from industrial practice, the volatile Ref4 produces very good thermomechanical properties, in particular high glass transition temperatures. Nevertheless, the homopolymers of the cycloaliphatic examples (2) to (11) performed very well in this regard, all exceeding a $T_g$ of 110° C. Especially, (9) and (10) can clearly compete with Ref4, exhibiting $T_g$s~150° C. (12) already leads to photopolymers with lower $T_g$, since the longer C2 alkyl spacer between the ester and the cycloaliphatic moiety likely leads to softer material.

By contrast, rather volatile Ref2, methyl salicylate methacrylate, comprising a very short methyl ester radical, produced a polymer having a $T_g$ of only 87° C., which is an acceptable value, though. Further, longer aliphatic chains may be beneficial for lowering volatility, but at the same time may lower the glass transition and heat deflection temperatures. This was confirmed by the results of Ref3, 2-ethylhexyl salicylate methacrylate, having produced a $T_g$ as low as 59° C. and the by far lowest $T_{1000}$ value of 22° C., which is significantly too low for a use of such polymers as components, for example, orthodontic applications. Ref1 was expected to show a high $T_g$ and good thermomechanical properties. Repeated attempts of molding specimens were not successful, though. The reason for that was the high brittleness of the photopolymers obtained using Ref1, which consistently resulted in broken samples. Most volatile monomer example Ref5 yields a photopolymer with a fair $T_g$ of 78° C.

Analyzing the benzylic and phenethylic (meth)acryloxy benzoates (13) to (17), it can be seen that the $T_g$s are lower than those of the cycloaliphatic (meth)acryloxy benzoate, usually not exceeding 100° C. Nevertheless, (13), (14), and (17) show $T_g$s higher than 80° C., which is still higher than e.g. Ref3 and Ref5. Example (15), with the methacrylate group in meta-position, shows a rather low $T_g$ of 69° C., which can likely be attributed to the isopropyl moiety on the aromatic ring. The polymer of (16) results in the material with the lowest $T_g$ (67° C.), which is not surprising since poly(acrylates) typically yield materials with poorer thermomechanical performance than poly(methacrylates). Examples (15) and (16) clearly outperform the noncyclic branched aliphatic methacryloxy benzoate (Ref3) by $T_g$ and especially by $T_{1000}$ value.

As a conclusion, it can be stated that all tested homopolymerized examples of the present disclosure showed good thermomechanical properties, in particular quite high glass transition temperatures and $T_{1000}$ values.

Example 28: Use as Reactive Diluents

To show the usefulness of the polymerizable monomers of the present disclosure as reactive diluents, (3) and (13) were used as representative examples and mixed, as reactive diluents, with highly viscous, commercially available resins. As exemplary resins, BOMAR XR-741MS, a low molecular weight, difunctional aliphatic polyester urethane methacrylate available from the Dymax ("Bomar"), and Miramer UA5216, an aliphatic difunctional acrylate having a number average molecular weight of 30.000 Da available from Miwon (without isobornyl acrylate) ("Miwon") were used. These resins were tested as such (Comparative Examples 1 and 2) and in admixture (at 90° C.) with 30 wt % of (3) or (13) as a reactive diluent each (Examples (29) to (32)), and subsequently polymerized to give crosslinked polymers in the absence (Comparative Examples 3 and 4) or presence (Examples (33) to (36)) of polymerizable monomer (3) or (13) as a reactive diluent.

Example 37: Viscosities of Photoresins

To investigate the diluting effect of the polymerizable monomer used as a reactive diluent in a viscous resin, rheology measurements of the above resins were performed covering a temperature range from 25° C. to 100° C. The measurements were again conducted using an Anton Paar MCR 301 having a CTD 450 oven and a CP-25-1 measuring system. The measurements were carried out using a gap distance between stamp (cone) and bottom plate of 48 m and a constant shear rate of 50 s$^{-1}$.

TABLE 9

Viscosities at varying temperatures

| Example | Resin | η at 25° C. [Pa · s] | η at 50° C. [Pa · s] | η at 70° C. [Pa · s] | η at 90° C. [Pa · s] |
|---|---|---|---|---|---|
| Comp. Ex. 1 | Bomar | 29,070 | 167.7 | 12.2 | 1.8 |
| 29 | Bomar + (3) | 1,250 | 16.2 | 1.6 | 0.3 |
| 30 | Bomar + (13) | 124.6 | 3.9 | 0.6 | 0.2 |
| Comp. Ex. 2 | Miwon | 5,300 | 99.6 | 28.0 | 12.0 |
| 31 | Miwon + (3) | 734 | 78.7 | 20.0 | 6.7 |
| 32 | Miwon + (13) | 343.3 | 58.5 | 15.8 | 5.5 |

As shown in Table 9, the neat Bomar resin of Comparative Example 1 starts at a very high viscosity of more than 29,000 Pa·s, virtually behaving like a solid at room temperature (25° C.). At 50° C., a viscosity of approx. 170 Pa·s was measured while, at 70° C., the viscosity approached a desirable value of about 10 Pa·s. At 90° C., the viscosity of the neat Bomar was 1.8 Pa·s. By adding 30 wt % of (3) to the Bomar resin in Example (29), the initial viscosity at room temperature radically drops to 1,250 Pa·s. At 50° C., the diluting effect already resulted in a viscosity of approx. 16 Pa·s, which further decreased to excellent values of 1.6 and 0.3 Pa·s at 70° C. and 90° C., respectively. Adding 30 w % of (13) to Bomar in Example (30) lowers the viscosity at 25° C. to 124.6 Pa·s that is further decreasing to 3.9 Pa·s at 50° C. and even drops below 1 Pa·s exceeding a temperature of 70° C.

Similar effects could be observed for the modified Miwon resin (without isobornyl acrylate) in Comparative Example 2. Starting at a viscosity of 5,300 Pa·s at 25° C., an increase in temperature to 50° C. already decreased the viscosity to approx. 100 Pa·s. A further increase to 70° C. and 90° C., respectively resulted in viscosities of 28 Pa·s and 12 Pa·s. Mixing the modified Miwon resin with 30 wt % of (3) in example (31), again resulted in a significant decrease of the viscosity at room temperature. When the temperature was raised to 50° C., 70° C., and 90° C., respectively, the viscosities of the mixture were also clearly lower than that of the neat resin. The same applies for the addition of 30 wt % of (13) in example (32) that even leads to lower viscosities compared to example (31) covering the whole temperature range.

As a conclusion, examples (3) and (13) of the disclosure represent a powerful tool to dilute highly viscous commercial resins to improve their processability.

Example 38: DMA of Photopolymers

To determine the thermomechanical properties of the crosslinked photopolymers resulting from the cured resins, the four mixtures of examples (33) to (36) and Comparative Examples 1 and 2 were mixed with 1 wt % of photoinitiator (TPO-L). The specimens were polymerized in the same way as described in Example 27. Due to the low glass transition temperatures resulting from curing the Miwon resin, the temperature program of the measurements was set to from −70° C. to 100° C. and a heating rate of 3 K/min. Table 11 again lists the obtained values for the storage moduli at 20° C., $G'_{(20°)}$, the glass transition temperatures measured at the maximum of the tan δ plot, $T_g$, and the temperatures at which G' reached 1000 MPa, $T_{1000}$.

TABLE 10

Dynamic mechanical analysis of the crosslinked photopolymers

| Example | Polymer | $G'_{(20)}$ [MPa] | $T_g$ [° C.] | $T_{1000}$ [° C.] |
|---|---|---|---|---|
| Comp. Ex. 3 | Bomar | 2750 | 128 | 79 |
| 33 | Bomar + (3) | 2340 | 119 | 68 |
| 34 | Bomar + (13) | 3424 | 110 | 81 |
| Comp. Ex. 4 | Miwon | 5 | −18 | −42 |
| 35 | Miwon + (3) | 63 | −16/52 | −22 |
| 36 | Miwon + (13) | 22 | 21 | −22 |

As shown in Table 10, the neat Bomar resin of Comparative Example 3 produced a high $T_g$ (128° C.) as well as high values for $G'_{(20°)}$ (2750 MPa) and $T_{1000}$ (79° C.). Adding 30 wt % of (3) as a reactive diluent in Example (33) only slightly lowered the $T_g$ of the resulting photopolymer to 119° C. A similar minor decrease of about 10% was observed for the $T_{1000}$ value. As expected, however, the addition of (3) also resulted in a lower value for $G'_{(20°)}$. Mixing 30 wt % of (13) to Bomar in example (34) lowers the $T_g$ to 110° C., which is 18° C. below the neat Bomar photopolymer and hence still an acceptable value. Summarizing, the addition of (3) and (13) as exemplary reactive diluents to a resin producing high heat deflection temperatures had only a minor impact on the thermomechanical properties of the material, but considerably improved its processability.

On the other hand, the photopolymer resulting from the neat modified Miwon resin in Comparative Example 4 already exhibited rather poor thermomechanical properties at room temperature, i.e. a very soft nature, when the specimen was bent with the fingers. This observation was confirmed by the values determined by DMA as listed in Table 10 above. In this case, the addition of polymerizable monomers (3) and (13) as a reactive diluent resulted in a significant increase of all properties investigated. With regard to $T_g$ of example (35), it must be noted that two tan δ maxima were detected: one at −16° C. resulting from the flexible chains of Miwon and another one at 52° C. Example (36), on the other hand, shows a significant increase of the $T_g$ (21° C.) and the other thermomechanical properties. However, the photopolymer containing repeating units derived from the reactive diluents (3) or (13) is much stiffer at room temperature than the polymer resulting from neat Miwon.

From the properties of the novel polymerizable monomers (1) to (21) according to the present invention as listed in Tables 2 to 11 above and the tendencies which may be derived therefrom, one may unambiguously deduce that all of these monomers will be suitable as reactive diluents for a wide scope of high viscosity resins and result in advantageous thermomechanical properties of the polymers obtained by (photo)polymerizing the same.

Altogether, the above-discussed examples, reference and comparative examples clearly document the suitability of cycloalkyl as well as benzylic and phenethylic (meth)acryloxybenzoates according to the present disclosure, represented by general formulas (I), (II) and (III), as polymerizable monomers and reactive diluents for high viscosity resins to be polymerized, preferably using a high temperature lithography-based photopolymerization process, to yield optionally crosslinked (photo)polymers having favorable thermomechanical properties for a possible use as orthodontic appliances.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by some embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, some methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by some embodiments and optional features, modification and variation of the concepts herein disclosed may be resorted to by those skilled in the art, and that such modifications and variations are considered to be within the scope of this invention as defined by the appended claims.

Statements Regarding Chemical Compounds and Nomenclature

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

As used herein, a broken line in a chemical structure is used to indicate a bond to the rest of the molecule. For example, ⸺ in

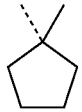

is used to designate the 1-position as the point of attachment of 1-methylcyclopentate to the rest of the molecule.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 3-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkyl groups can also carry alkyl groups. Cycloalkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, isopropyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms.

Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-member aromatic rings, including heterocyclic aromatic rings. The term heteroaryl specifically refers to aryl groups having at least one 5-, 6-, 7- or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group derived from an alkyl group as defined herein. The invention includes compounds having one or more alkylene groups. Alkylene groups in some compounds function as attaching and/or spacer groups. Compounds of the invention may have substituted and/or unsubstituted $C_1$-$C_2$ alkylene, $C_1$-$C_{10}$ alkylene and $C_1$-$C_5$ alkylene groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as attaching and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the invention include substituted and/or unsubstituted $C_3$-$C_3$ arylene, $C_3$-$C_2$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the invention include substituted and/or unsubstituted $C_3$-$C_3$ heteroarylene, $C_3$-$C_2$ heteroarylene, $C_1$-$C_0$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the invention include substituted and/or unsubstituted $C_2$-$C_2$ alkenylene, $C_2$-$C_0$ alkenylene and $C_2$-$C_5$ alkenylene groups.

As used herein, the terms "cycloalkenylene" and "cycloalkenylene group" are used synonymously and refer to a divalent group derived from a cycloalkenyl group as defined herein. The invention includes compounds having one or more cycloalkenylene groups. Cycloalkenylene groups in some compounds function as attaching and/or spacer groups. Compounds of the invention include substituted and/or unsubstituted $C_3$-$C_{20}$ cycloalkenylene, $C_3$-$C_{10}$ cycloalkenylene and $C_3$-$C_5$ cycloalkenylene groups.

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as attaching and/or spacer groups. Compounds of the invention include substituted and/or unsubstituted $C_2$-$C_2$ alkynylene, $C_2$-$C_{10}$ alkynylene and $C_2$-$C_5$ alkynylene groups.

As used herein, the term "halo" refers to a halogen group such as a fluoro (—F), chloro (—Cl), bromo (—Br) or iodo (—I)

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)n-alkoxy wherein n is an integer from 1 to 10, preferably 1 to 4, and more preferably for some embodiments 1 to 3.

As to any of the groups described herein that contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;
pseudohalides, including —CN, —OCN (cyanate), —NCO (isocyanate), —SCN (thiocyanate) and —NCS (isothiocyanate);

—COOR, where R is a hydrogen or an alkyl group or an aryl group and more specifically where R is a methyl, ethyl, propyl, butyl, or phenyl group all of which groups are optionally substituted;

—COR, where R is a hydrogen or an alkyl group or an aryl group and more specifically where R is a methyl, ethyl, propyl, butyl, or phenyl group all of which groups are optionally substituted;

—CON(R)$_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—OCON(R)$_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—N(R)$_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—SO$_2$R, or —SOR, where R is an alkyl group or an aryl group and more specifically where R is a methyl, ethyl, propyl, butyl, or phenyl group, all of which are optionally substituted;

—OCOOR, where R is an alkyl group or an aryl group;

—SO$_2$N(R)$_2$, where each R, independently of each other R, is a hydrogen, or an alkyl group, or an aryl group all of which are optionally substituted and wherein R and R can form a ring that can contain one or more double bonds and can contain one or more additional carbon atoms; and —OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, the compounds of this invention include all stereochemical isomers arising from the substitution of these compounds.

What is claimed is:

1. A method of using a (meth)acryloyloxy-substituted benzoic acid ester of general formula (III):

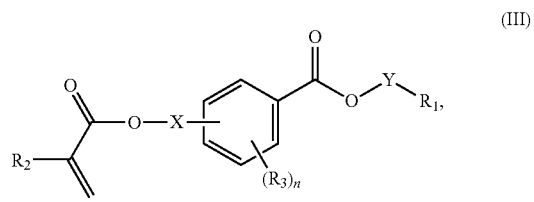

wherein,
R$_1$ is C$_3$-C$_{10}$ cycloalkyl or C$_6$-C$_{10}$ aryl, wherein the C$_3$-C$_{10}$ cycloalkyl and C$_6$-C$_{10}$ aryl are unsubstituted or substituted with one or more substituents selected from C$_1$-C$_6$ alkyl and C$_1$-C$_6$ alkoxy;
R$_2$ is H or CH$_3$;
the R$_3$'s are each independently C$_1$-C$_6$ alkyl or C$_1$-C$_6$ alkoxy;
n is an integer from 0 to 4; and
X and Y are each independently absent or C$_1$-C$_3$ alkylene, with the proviso that, when R$_1$ is C$_6$-C$_{10}$ aryl, Y is C$_1$-C$_3$ alkylene;
as a reactive diluent in a process for polymerizing a curable composition comprising at least one polymerizable species, the process comprising the steps of providing the curable composition, mixing the curable composition with the reactive diluent, and polymerizing the mixture to form a crosslinked polymer,
wherein the curable composition comprises at least one photopolymerization initiator and is irradiated to initiate polymerization in the polymerization step, wherein the curable composition is heated to a predetermined elevated process temperature in the range of 90° C. to 120° C. before being irradiated with light having a suitable wavelength to be absorbed by the photoinitiator, thereby causing cleavage of the photoinitiator to induce polymerization of the curable composition to obtain the crosslinked polymer;
wherein the (meth)acryloyloxy-substituted benzoic acid ester is a 2- or 3-substituted benzoic acid ester having the (meth)acryloyloxy substituted at a meta- or ortho-position of the benzoic acid ester;
wherein the C$_1$-C$_6$ alkyl groups comprise linear, branched and cyclic alkyl groups;
wherein the C$_1$-C$_3$ alkylene groups comprise linear, branched and cyclic alkylene groups; and
wherein the process for polymerizing the curable composition is part of a 3D printing process.

2. The method of claim 1, wherein in formula (III) R$_1$ represents unsubstituted or substituted C$_5$-C$_{10}$ cycloalkyl or unsubstituted or substituted phenyl.

3. The method of claim 1, wherein in formula (III) X and Y are each independently absent or C$_1$-C$_2$ alkylene.

4. The method of claim 1, wherein X is absent in formula (III).

5. The method of claim 1, wherein formula (III) is characterized by at least one or more of the following characteristics:

$C_3$-$C_{10}$ cycloalkyl and $C_6$-$C_{10}$ aryl of $R_1$ are each unsubstituted or substituted by one or more substituents selected from $C_1$-$C_3$ alkyl and $C_1$-$C_3$ alkoxy;

each $R_3$ is independently $C_1$-$C_3$ alkyl or $C_1$-$C_3$ alkoxy; and n is 0 or 1.

6. The method of claim 5, wherein in formula (III) $R_1$ is unsubstituted phenyl.

7. The method of claim 5, wherein in formula (III) $R_1$ is selected from the group consisting of:

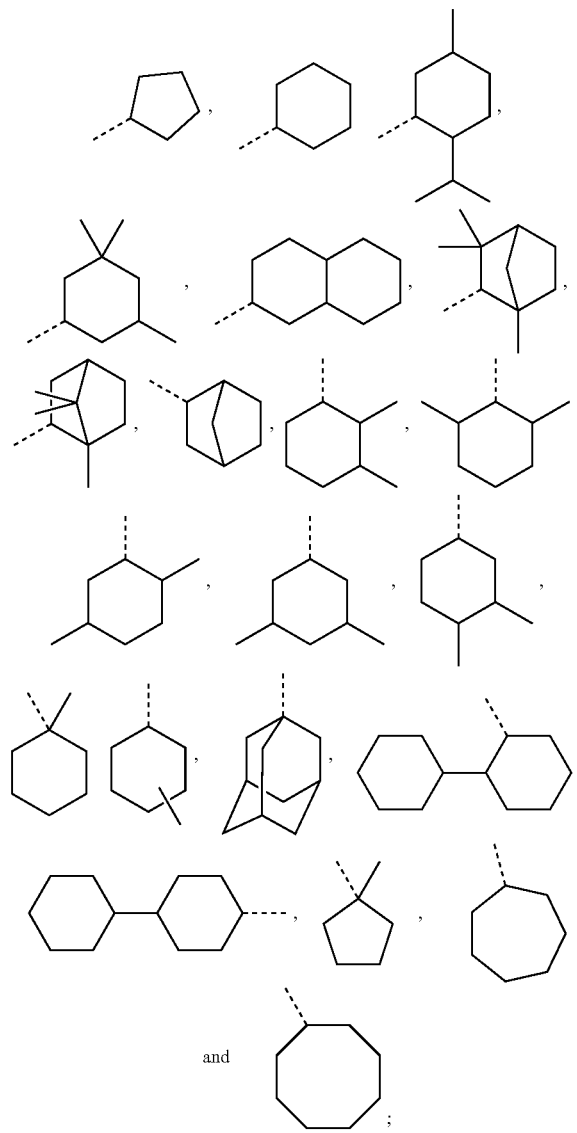

wherein the dotted lines represent the position of the bond to Y and the benzoate carboxyl group, respectively.

8. The method of claim 7, wherein in formula (III) $R_1$ is selected from the group consisting of:

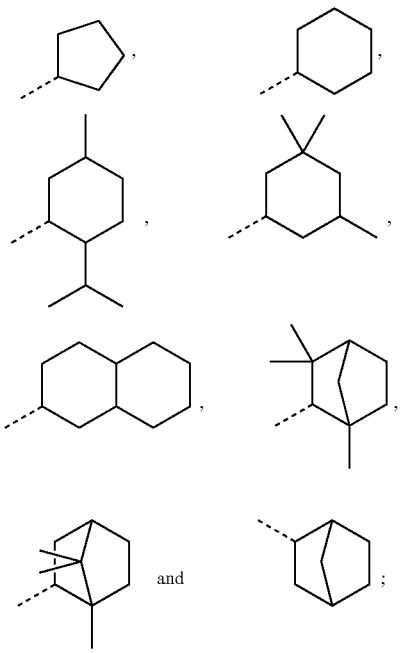

wherein the dotted lines represent the position of the bond to Y and the benzoate carboxyl group, respectively.

9. The method of claim 1, wherein in formula (III)—Y—$R_1$ is selected from the following structures:

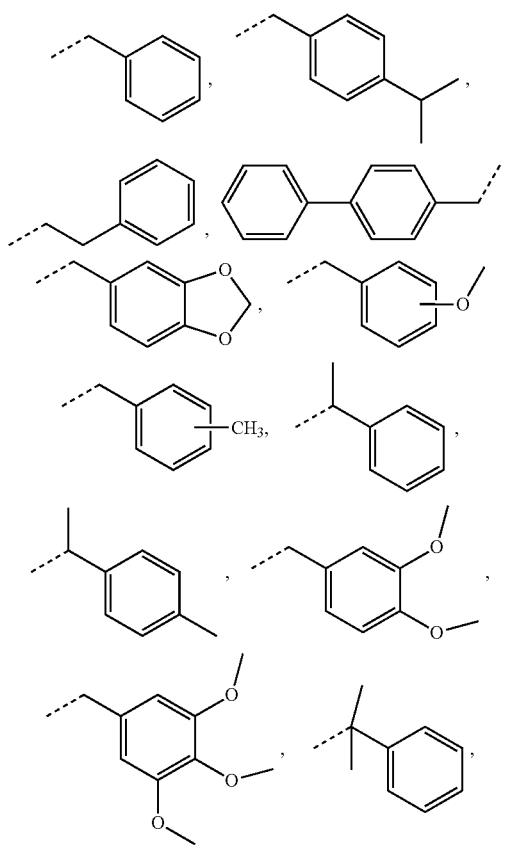

109
-continued

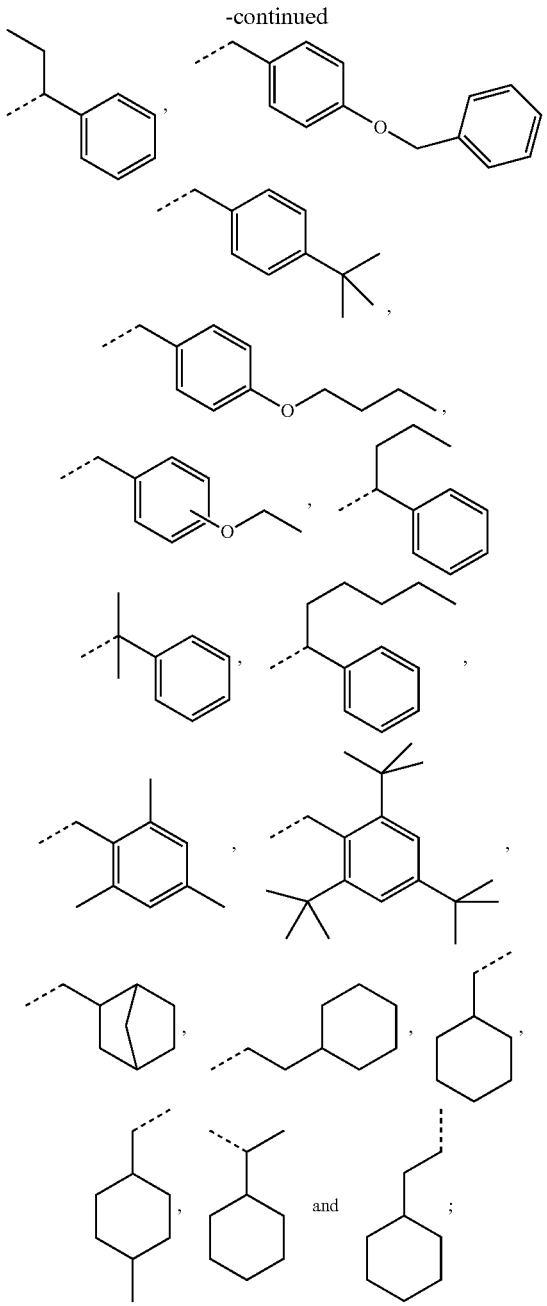

wherein the dotted lines each represent the position of the bond to the benzoate carboxyl group.

10. The method of claim 1, wherein the (meth)acryloyloxy-substituted benzoic acid ester of the general formula (III) is selected from the following chemical compounds:
2-(methacryloyloxy)benzoic acid cyclopentyl ester (Structure 1);
2-(methacryloyloxy)benzoic acid cyclohexyl ester (Structure 2);
2-(methacryloyloxy)benzoic acid-2-isopropyl-5-methylcyclohexyl ester (Structure 3);
3-(methacryloyloxy)benzoic acid-2-isopropyl-5-methylcyclohexyl ester (Structure 4);
2-(methacryloyloxy)benzoic acid-3,3,5-trimethylcyclohexyl ester (Structure 6);
2-(acryloyloxy)benzoic acid-3,3,5-trimethylcyclohexyl ester (Structure 7);

110

2-(methacryloyloxy)benzoic acid decahydronaphthalen-2-yl ester (Structure 8);
2-(methacryloyloxy)benzoic acid-1,3,3-trimethyl-2-bicyclo[2.2.1]heptanyl ester (Structure 9);
2-(methacryloyloxy)benzoic acid-1,7,7-trimethyl-2-bicyclo[2.2.1]heptanyl ester (Structure 10);
2-(methacryloyloxy)benzoic acid-bicyclo[2.2.1]heptan-2-yl methyl ester (Structure 11);
2-(methacryloyloxy)benzoic acid-2-cyclohexylethyl ester (Structure 12);
2-(methacryloyloxy)benzoic acid benzyl ester (Structure 13);
3-(methacryloyloxy)benzoic acid-4-isopropylbenzyl ester (Structure 15);
2-(acryloyloxy)benzoic acid benzyl ester (Structure 16);
2-(methacryloyloxy)benzoic acid phenethyl ester (Structure 17);
4-(methacryloyloxy)-3-methoxybenzoic acid-3-methoxybenzyl ester (Structure 18);
2-(methacryloyloxy)benzoic acid-1-phenylethyl ester (Structure 19); and
2-(methacryloyloxy)benzoic acid cyclohexyl methyl ester (Structure 21).

11. The method of claim 1, wherein the step of mixing the curable composition with the reactive diluent is performed after heating at least one of:
(a) the curable composition; and
(b) the reactive diluent.

12. The method of claim 1, wherein the curable composition comprises one or more further components selected from the group consisting of polymerization inhibitors, solvents, fillers, antioxidants, pigments, dyes, surface modifiers and mixtures thereof.

13. The method of claim 1, wherein the curable composition comprises at least one polyvalent monomer as the at least polymerizable species and is polymerized to form the crosslinked polymer.

14. An orthodontic device comprising a crosslinked polymer comprising meta- or ortho-substituted benzoic acid ester derivatives of formula (IV) as repeating units:

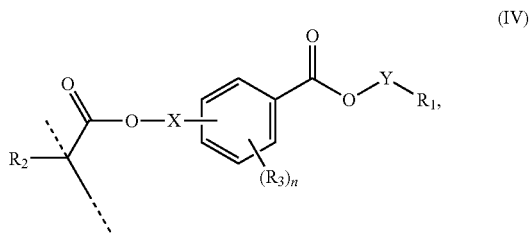

(IV)

wherein:
the dotted lines each represent a bond to another carbon atom in the polymer chain;
$R_1$ is $C_3$-$C_{10}$ cycloalkyl or $C_6$-$C_{10}$ aryl, wherein the $C_3$-$C_{10}$ cycloalkyl and $C_6$-$C_{10}$ aryl are unsubstituted or substituted with one or more substituents selected from $C_1$-$C_6$ alkyl and $C_1$-$C_6$ alkoxy;
$R_2$ is H or $CH_3$;
Each $R_3$ is independently $C_1$-$C_6$ alkyl or $C_1$-$C_6$ alkoxy;
n is an integer from 0 to 4;
X and Y are each independently absent or $C_1$-$C_3$ alkylene, with the proviso that, when $R_1$ is $C_6$-$C_{10}$ aryl, Y is $C_1$-$C_3$ alkylene;

the C$_1$-C$_6$ alkyl groups comprise linear, branched and cyclic alkyl groups, and the C$_1$-C$_3$ alkylene groups comprise linear, branched and cyclic alkylene group.

15. The orthodontic device of claim 14, wherein the orthodontic device is an aligner, expander or spacer.

16. The orthodontic device of claim 14, wherein the orthodontic device comprises a plurality of tooth receiving cavities configured to reposition teeth from a first configuration toward a second configuration.

17. The orthodontic device of claim 14, wherein the orthodontic device is one of a plurality of orthodontic devices configured to reposition teeth from an initial configuration toward a target configuration.

18. The orthodontic device of claim 14, wherein the orthodontic device is one of a plurality of orthodontic devices configured to reposition teeth from an initial configuration toward a target configuration according to a treatment plan.

19. The orthodontic device of claim 14, wherein the polymer has viscoelastic behavior in the temperature range from 20° C. to 40° C.

20. The orthodontic device of claim 14, comprising a three-dimensional structure, wherein the three-dimensional structure has at least one dimension less than or equal to 5 μm.

21. The orthodontic device of claim 14, comprising a three-dimensional structure, wherein the three-dimensional structure has at least one dimension within a range from about 5 μm to about 50 μm.

22. The orthodontic device of claim 14, comprising a strength that varies by no more than 25% along all directions.

23. The orthodontic device of claim 14, wherein the orthodontic appliance is fabricated using direct fabrication.

24. The orthodontic device of claim 23, wherein the direct fabrication produces the orthodontic appliance in a time interval less than or equal to 1 hour.

25. The orthodontic device of claim 14, comprising multiple materials.

26. The orthodontic device of claim 25, wherein the orthodontic appliance is fabricated using multi-material direct fabrication.

27. The orthodontic device of claim 14, comprising at least one rigid portion, the at least one rigid portion comprising a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, or a polytrimethylene terephthalate.

28. The orthodontic device of claim 14, comprising at least one elastic portion, the at least one elastic portion comprising a styrenic block copolymer, a silicone rubber, an elastomeric alloy, a thermoplastic elastomer, a thermoplastic vulcanizate elastomer, a polyurethane elastomer, a block copolymer elastomer, a polyolefin blend elastomer, a thermoplastic co-polyester elastomer, and/or a thermoplastic polyamide elastomer.

29. The orthodontic device of claim 14, wherein the polymer is characterized by a tensile stress-strain curve that displays a yield point after which the polymer continues to elongate, but there is no increase in stress.

30. An orthodontic appliance obtained by a 3-D printing process, the orthodontic appliance comprising a polymeric material derived from a composition comprising a (meth)acryloyloxy-substituted benzoic acid ester having one of the following structures:

(Structure 1)

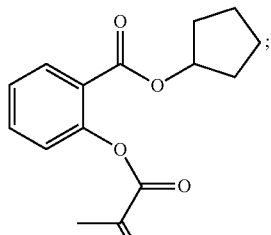

(1)

2-(methacryloyloxy)benzoic acid cyclopentyl ester (Structure 2)

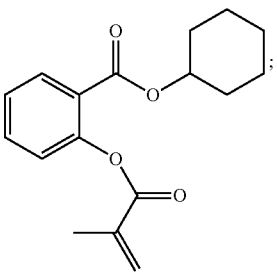

(2)

2-(methacryloyloxy)benzoic acid cyclohexyl ester (Structure 3)

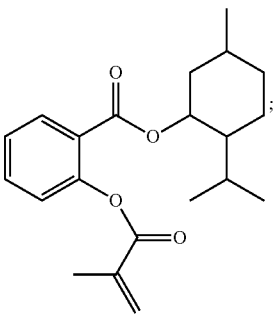

(3)

2-(methacryloyloxy)benzoic acid-2-isopropyl-5-methylcyclohexyl ester

-continued (Structure 4)

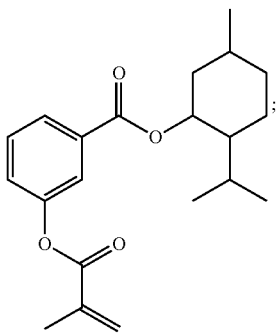

3-(methacryloyloxy)benzoic acid-
2-isopropyl-5-methylcyclohexyl
ester (Structure 6)

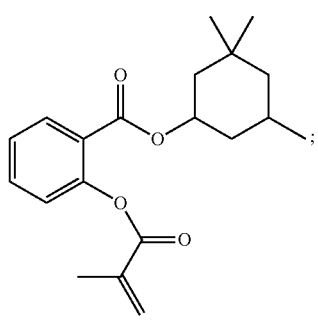

2-(methacryloyloxy)benzoic
acid-3,3,5-trimethylcyclohexyl ester (Structure 7)

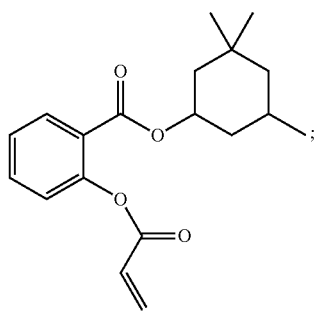

2-(Acryloyloxy)benzoic
acid-3,3,5-trimethylcyclohexyl ester (Structure 8)

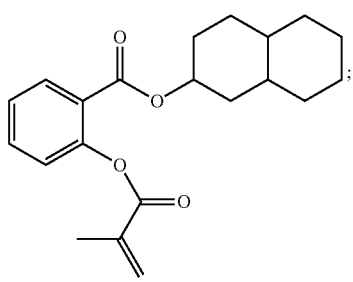

2-(methacryloyloxy)benzoic
acid decahydronaphthalen-2-yl ester (Structure 9)

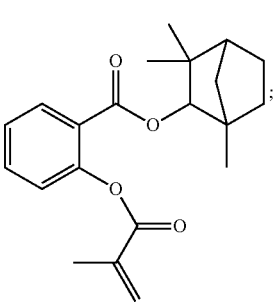

2-(methacryloyloxy)benzoic
acid-1,3,3-trimethyl-2-bicyclo
[2.2.1]heptanyl ester (Structure 10)

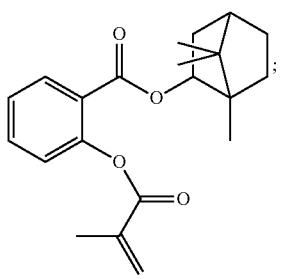

2-(methacryloyloxy)benzoic
acid-1,7,7-trimethyl-2-bicyclo
[2.2.1]heptanyl ester (Structure 11)

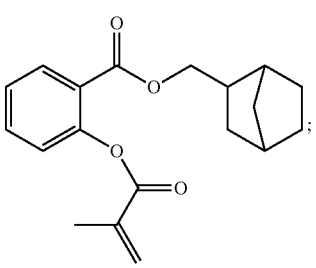

2-(methacryloyloxy)benzoic
acid-bicyclo[2.2.1]heptan-2-
ylmethyl ester (Structure 12)

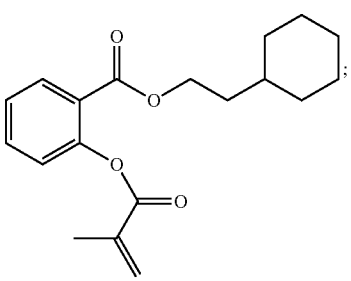

2-(methacryloyloxy)benzoic
acid-2-cyclohexylethyl ester

-continued (Structure 13)

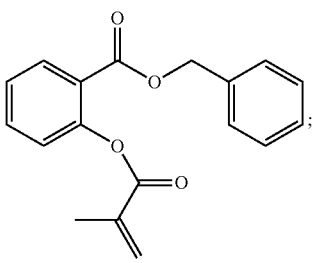

2-(methacryloyloxy)benzoic
acid benzyl ester (Structure 15)

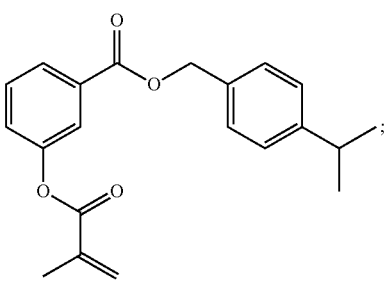

3-(methacryloyloxy)benzoic
acid-4-isopropylbenzyl ester (Structure 16)

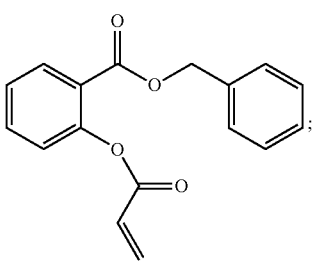

2-(acryloyloxy)benzoic
acid benzyl ester (Structure 17)

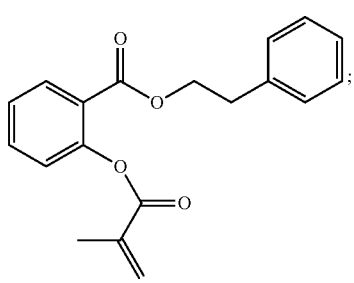

2-(methacryloyloxy)benzoic
acid phenethyl ester

-continued (Structure 18)

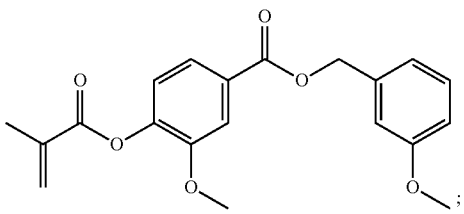

4-(methacryloyloxy)-3-methoxybenzoic
acid-3-methoxybenzyl ester (Structure 19)

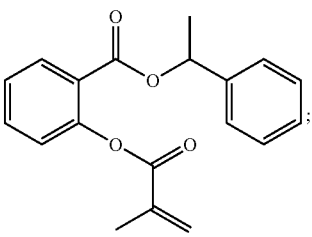

2-(methacryloyloxy)benzoic acid-1-
phenylethyl ester (Structure 21)

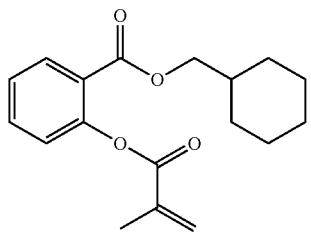

2-(methacryloyloxy)benzoic acid
cyclohexyl methyl ester wherein the polymeric material has viscoelastic behavior in the temperature range from 20° C. to 40° C.

31. A method of using a (meth)acryloyloxy-substituted benzoic acid ester of general formula (III):

(III)

wherein,
$R_1$ is $C_3$-$C_{10}$ cycloalkyl or $C_6$-$C_{10}$ aryl, wherein the $C_3$-$C_{10}$ cycloalkyl and $C_6$-$C_{10}$ aryl are unsubstituted or substituted with one or more substituents selected from $C_1$-$C_6$ alkyl and $C_1$-$C_6$ alkoxy;
$R_2$ is H or $CH_3$;
the $R_3$'s are each independently $C_1$-$C_6$ alkyl or $C_1$-$C_6$ alkoxy;
n is an integer from 0 to 4; and
X and Y are each independently absent or $C_1$-$C_3$ alkylene, with the proviso that, when $R_1$ is $C_6$-$C_{10}$ aryl, Y is $C_1$-$C_3$ alkylene;

as a reactive diluent in a process for polymerizing a curable composition comprising at least one polymerizable species, the process comprising the steps of providing the curable composition, mixing the curable composition with the reactive diluent, and polymerizing the mixture to form a crosslinked polymer, wherein the step of mixing the curable composition with the reactive diluent is performed after heating at least one of:
(a) the curable composition; and
(b) the reactive diluent;
wherein the curable composition comprises at least one photopolymerization initiator and is irradiated to initiate polymerization in the polymerization step;
wherein the $C_1$-$C_6$ alkyl groups comprise linear, branched and cyclic alkyl groups; and
wherein the $C_1$-$C_3$ alkylene groups comprise linear, branched and cyclic alkylene groups.

\* \* \* \* \*